US010106184B2

(12) United States Patent
Johnson et al.

(10) Patent No.: US 10,106,184 B2
(45) Date of Patent: Oct. 23, 2018

(54) CART PUSHER, MATEABLE CARTS, AND RELATED SYSTEMS, METHODS, AND DEVICES

(71) Applicant: Dane Technologies, Inc., Brooklyn Park, MN (US)

(72) Inventors: Dan Johnson, Medina, MN (US); Andrew Dvorak, Minnetonka, MN (US)

(73) Assignee: Dane Technologies, Inc., Brooklyn Park, MN (US)

( * ) Notice: Subject to any disclaimer, the term of this patent is extended or adjusted under 35 U.S.C. 154(b) by 0 days.

(21) Appl. No.: 15/600,435

(22) Filed: May 19, 2017

(65) Prior Publication Data

US 2018/0009459 A1   Jan. 11, 2018

Related U.S. Application Data

(63) Continuation-in-part of application No. 15/003,439, filed on Jan. 21, 2016, now Pat. No. 9,701,329.

(60) Provisional application No. 62/106,082, filed on Jan. 21, 2015, provisional application No. 62/127,657, filed on Mar. 3, 2015.

(51) Int. Cl.
*B62B 3/14* (2006.01)

(52) U.S. Cl.
CPC .......... *B62B 3/1404* (2013.01); *B62B 3/1412* (2013.01); *B62B 3/1424* (2013.01); *B62B 3/1476* (2013.01); *B62B 3/1492* (2013.01)

(58) Field of Classification Search
CPC ......... B62B 3/02; B62B 3/008; B62B 3/1404; B62B 3/1408; B62B 3/1412; B62B 3/1424; B62B 3/1476; B62B 3/1492; B62B 5/0026; B62B 5/0033; B62B 5/004; B62B 5/0046; B62B 5/005; B62D 51/04; B62D 51/005; B62D 51/008; A61G 5/04–5/048
See application file for complete search history.

(56) References Cited

U.S. PATENT DOCUMENTS 8,430,189 B2 * 4/2013 Tallino ................... A61G 5/047
180/11

* cited by examiner

*Primary Examiner* — Erez Gurari
(74) *Attorney, Agent, or Firm* — Davis, Brown, Koehn, Shors & Roberts, P.C.; Sean D. Solberg

(57) ABSTRACT

Various embodiments herein relate to powered pusher devices configured to push wheeled objects from one location to another. Further embodiments relate to wheeled objects such as carts for transporting items from one location to another. Other embodiments relate to platform powered pushers that can be coupled to a family of various wheeled objects.

20 Claims, 40 Drawing Sheets

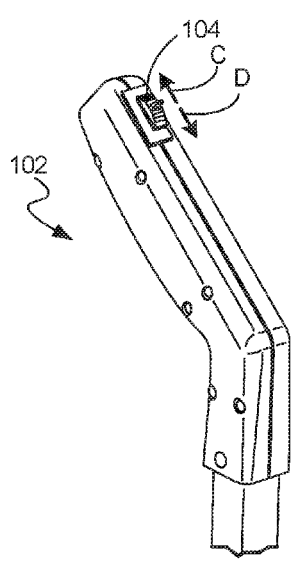 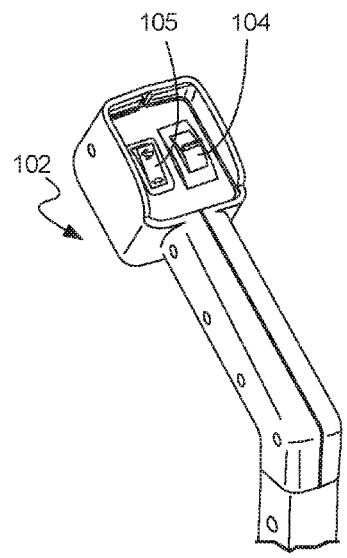 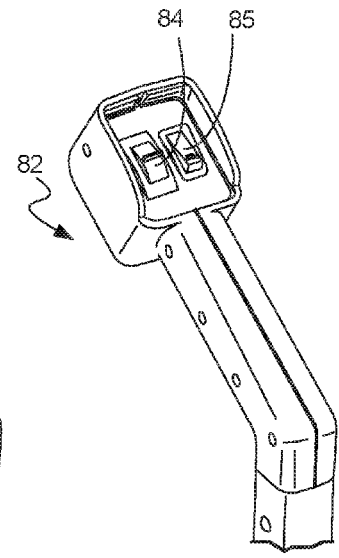
Fig. 7A　　　Fig. 7B　　　Fig. 7C
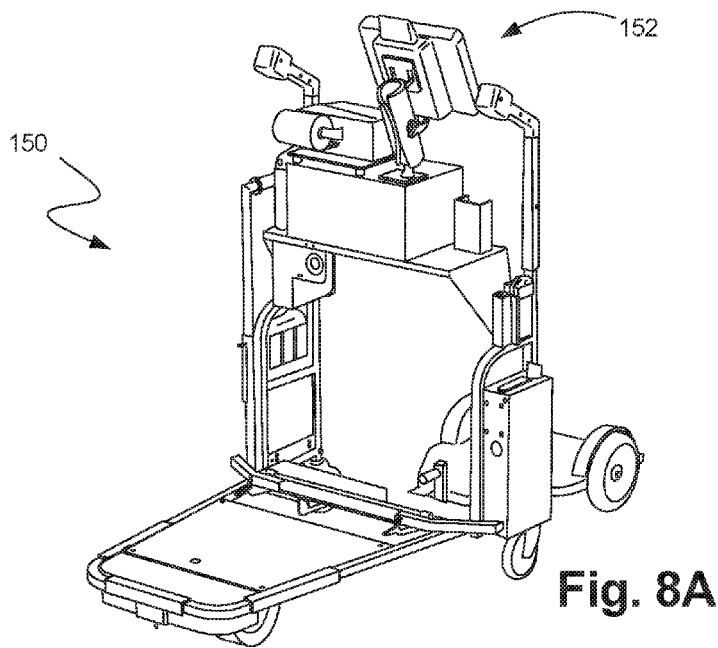
Fig. 8A

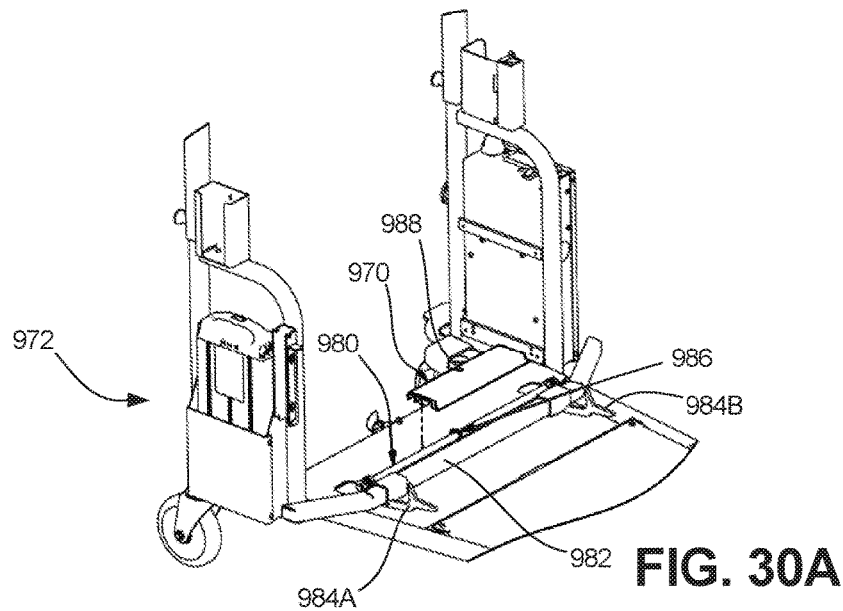
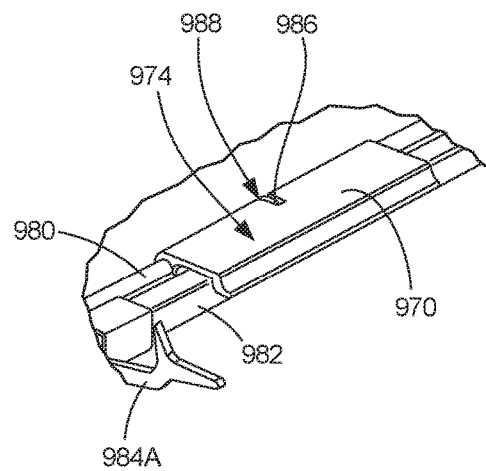
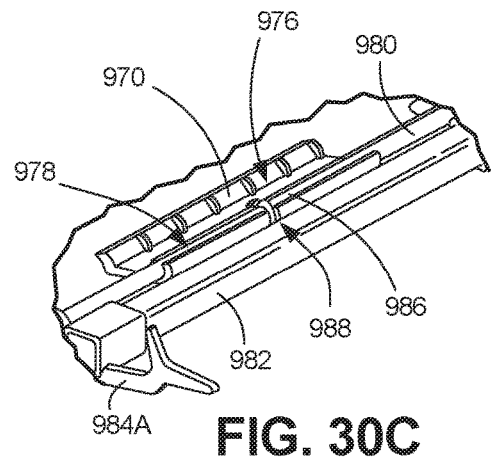

CART PUSHER, MATEABLE CARTS, AND RELATED SYSTEMS, METHODS, AND DEVICES

CROSS-REFERENCE TO RELATED APPLICATION(S)

This application claims priority as a continuation-in-part application to U.S. application Ser. No. 15/003,439, filed Jan. 21, 2016 and entitled "Cart Pusher, Mateable Carts, and Related Systems, Methods, and Devices," which claims priority to U.S. Provisional Patent Application 62/106,082, filed Jan. 21, 2015 and entitled "Cart Pusher," and further claims priority to U.S. Provisional Patent Application 62/127,657, filed Mar. 3, 2015 and entitled "Cart Pusher, Mateable Carts, and Related Systems, Methods, and Devices," all of which are hereby incorporated herein by reference in their entireties.

FIELD OF THE INVENTION

Various embodiments disclosed herein relate to powered pushing systems and devices for pushing carts and other wheeled objects. Other embodiments relate to carts, including flatbed carts and shelf carts that can be moved around manually or with the assistance of a powered pusher. Further embodiments relate to self-propelled carts.

BACKGROUND OF THE INVENTION

Carts and other wheeled objects have been used in retail, warehouse, and other environments in significant volume for years. In those situations in which a large number of carts need to be moved from one location to another or when a user (such as a customer or warehouse employee) wants to collect and/or move products or other items, a powered cart pusher can be necessary or at least very helpful. In addition, as the carts become more popular and new uses and specific needs develop, the carts have become more sophisticated and/or specifically designed to accommodate certain items and/or operate in certain environments.

There is a need in the art for improved pushing devices and carts.

BRIEF SUMMARY OF THE INVENTION

Discussed herein are various powered pusher embodiments, along with various wheeled object embodiments.

In Example 1, a wheeled cart comprises a base, four swivel wheels, wherein each swivel wheel is disposed at a corner of the base, and a guidance channel disposed beneath the base and adjacent to an end of the base, wherein the guidance channel comprises a space sized to receive a front end of a pusher.

Example 2 relates to the wheeled cart according to Example 1, wherein the guidance channel comprises two guidance rails attached to an underside of the base, wherein the two guidance rails define the space sized to receive a front end of a pusher.

Example 3 relates to the wheeled cart according to Example 2, wherein the two guidance rails are angled in relation to each other such that a distal portion of the guidance channel is narrower than a proximal portion of the guidance channel.

In Example 4, a powered cart moving system comprises a powered pushing device, a wheeled user platform coupleable to the powered pushing device, and at least one hitch assembly, wherein the at least one hitch assembly comprises a distal coupling component and a proximal coupling component. The powered pushing device has a base, a left control handle coupled to a left portion of the base, a right control handle coupled to a right portion of the base, a pair of rear swivel wheels disposed under a proximal portion of the base, a pair of front fixed wheels disposed under the base, wherein the fixed front wheels are disposed proximally from a front end of the base, and a motor operably coupled to the pair of front fixed wheels.

Example 5 relates to the wheeled cart according to Example 4, wherein a first hitch assembly of the at least one hitch assembly comprises a first distal coupling component structured and arranged to be coupleable to the wheeled user platform and a first proximal coupling component structured and arranged to be coupleable to a first wheeled cart.

Example 6 relates to the wheeled cart according to Example 5, wherein a second hitch assembly of the at least one hitch assembly comprises a second distal coupling component structured and arranged to be coupleable to the first wheeled cart and a second proximal coupling component structure and arranged to be coupleable to a second wheeled cart.

Example 7 relates to the wheeled cart according to Example 6, wherein a third hitch assembly of the at least one hitch assembly comprises a third distal coupling component structured and arranged to be coupleable to the second wheeled cart and a third proximal coupling component structure and arranged to be coupleable to a third wheeled cart.

Example 8 relates to the wheeled cart according to Example 4, wherein the base is structured and arranged to be positionable under and coupleable to a fourth wheeled cart.

Example 9 relates to the wheeled cart according to Example 4, wherein the base is structured and arranged to be positionable under and coupleable to a first wheeled cart.

Example 10 relates to the wheeled cart according to Example 9, wherein the at least one hitch assembly comprises, a first hitch assembly comprising a first distal coupling component structured and arranged to be coupleable to the wheeled user platform and a first proximal coupling component structured and arranged to be coupleable to a second wheeled cart, and a second hitch assembly comprising a second distal coupling component structured and arranged to be coupleable to the second wheeled cart and a second proximal coupling component structure and arranged to be coupleable to a third wheeled cart.

In Example 11, a wheeled cart comprises a base, four swivel wheels, wherein each swivel wheel is disposed at a corner of the base, a shelving frame coupled to the base, wherein the shelving frame comprises at least two shelves, and a set of steps removably attached to the shelving frame, wherein the set of steps is constructed and arranged to be positioned in relationship with the cart such that a user can access an upper shelf of the at least two shelves.

In Example 12, a wheeled cart comprises a base, four swivel wheels, wherein each swivel wheel is disposed at a corner of the base, a guidance channel disposed beneath the base and adjacent to an end of the base, wherein the guidance channel comprises a space sized to receive a front end of a pusher, and a ramp disposed within the guidance channel, wherein the ramp is disposed at an angle in relation to the base such that a distal portion of the ramp is positioned closer to the base than a proximal portion of the ramp.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 7A is a perspective view of a control handle grip, according to one embodiment.

FIG. 7B is a perspective view of a left control handle grip, according to one embodiment.

FIG. 7C is a perspective view of a right control handle grip, according to one embodiment.

FIG. 8A is a front perspective view of a pusher, according to another embodiment.

FIG. 30A is a perspective view of an adaptor insert coupled to a pusher, according to one embodiment.

FIG. 30B is an expanded perspective view of the adaptor insert coupled to the pusher of FIG. 30A, according to one embodiment.

FIG. 30C is another expanded perspective view of the adaptor insert coupled to the pusher of FIG. 30A, according to one embodiment.

DETAILED DESCRIPTION

Certain embodiments disclosed herein relate to powered pushers for use in interchangeably coupling with and pushing various types of carts and other wheeled devices, including stackable wheeled devices, such as flatbed carts, wheelchairs, etc. Other embodiments relate to carts, including some pushable carts that can be coupled to certain of the powered pushers disclosed herein. Further implementations relate to systems including at least one powered pusher and various different carts and other wheeled objects—such as a family of such carts and/or devices—that can interchangeably couple with and be pushed by the powered pusher.

Certain implementations relate to a powered pusher—including, for example, a battery-powered pusher—that connects to wheeled devices. For example, some pusher embodiments can connect to certain wheeled carts by sliding under and latching with them. One example of such a powered pusher 10 is best depicted in FIGS. 1, 2A, 2B, and 2C. According to one exemplary implementation, the powered pusher 10 can be used with known flatbed carts such as those used in stores such as, for instance, IKEA®.

Figure 1:
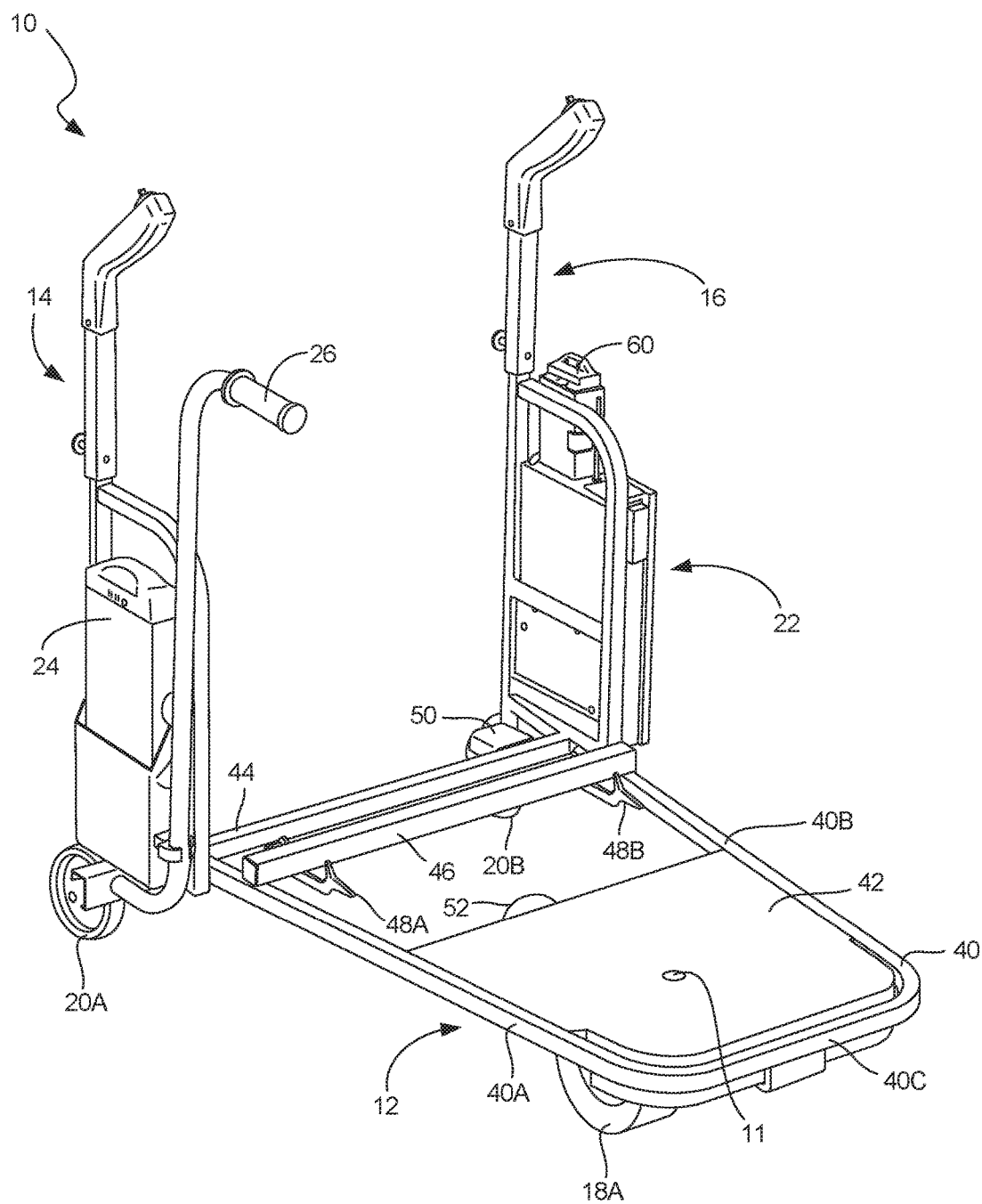
FIG. 1 is a front perspective view of a pusher, according to one embodiment.
Figure 2A:
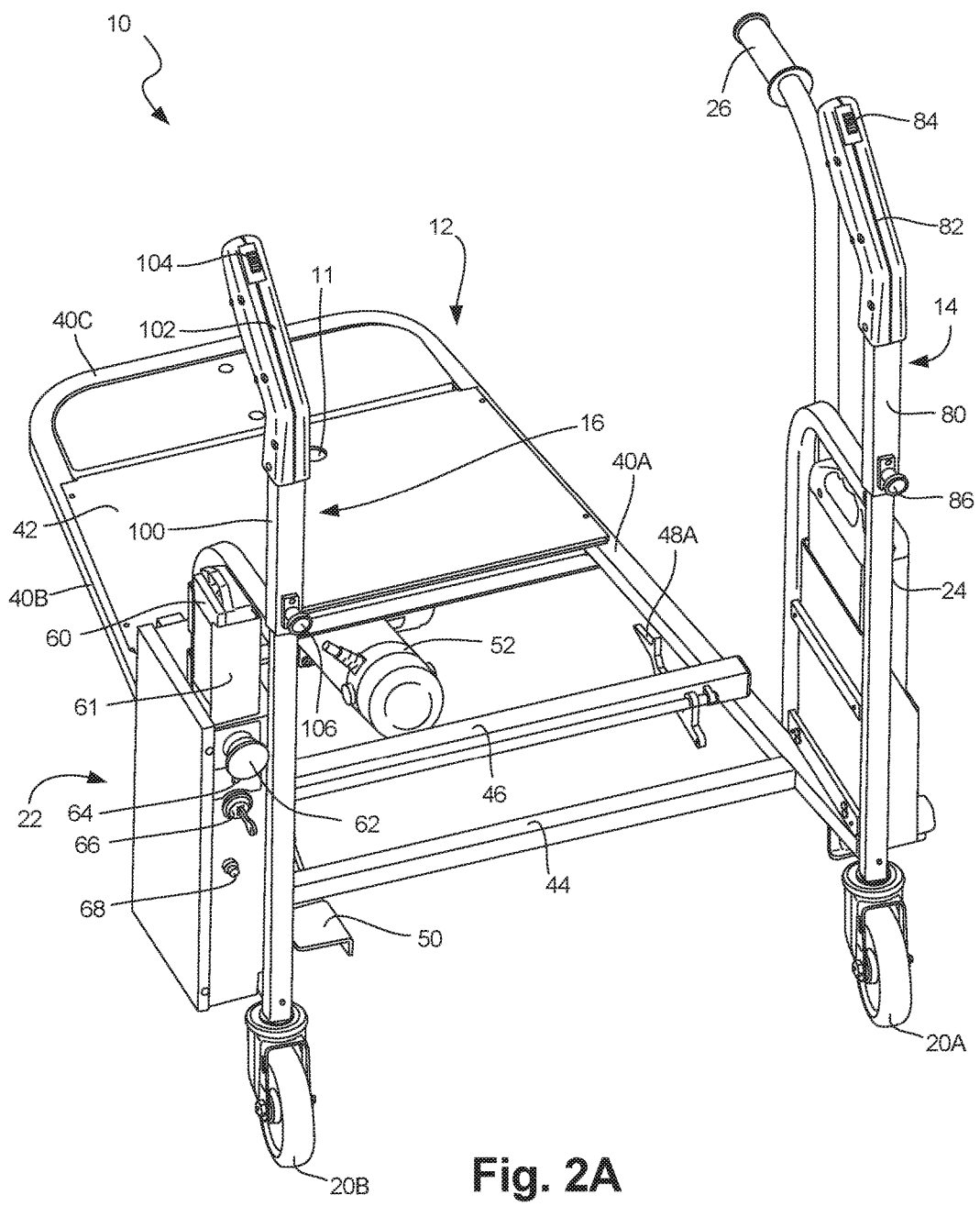
FIG. 2A is a rear perspective view of the pusher of FIG. 1, according to one embodiment.
Figure 2B:
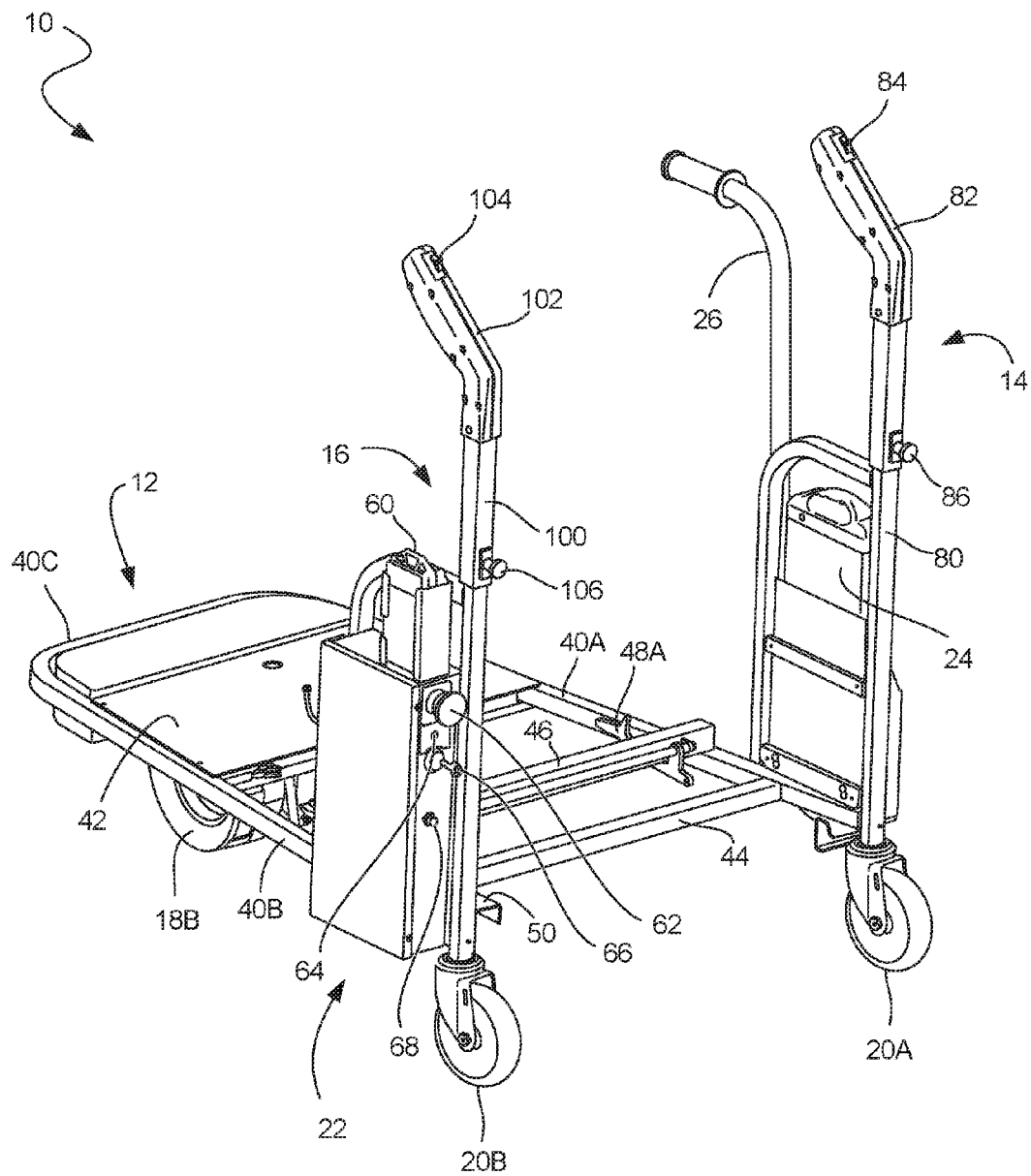
FIG. 2B is another rear perspective view of the pusher of FIG. 1, according to one embodiment.
Figure 2C:
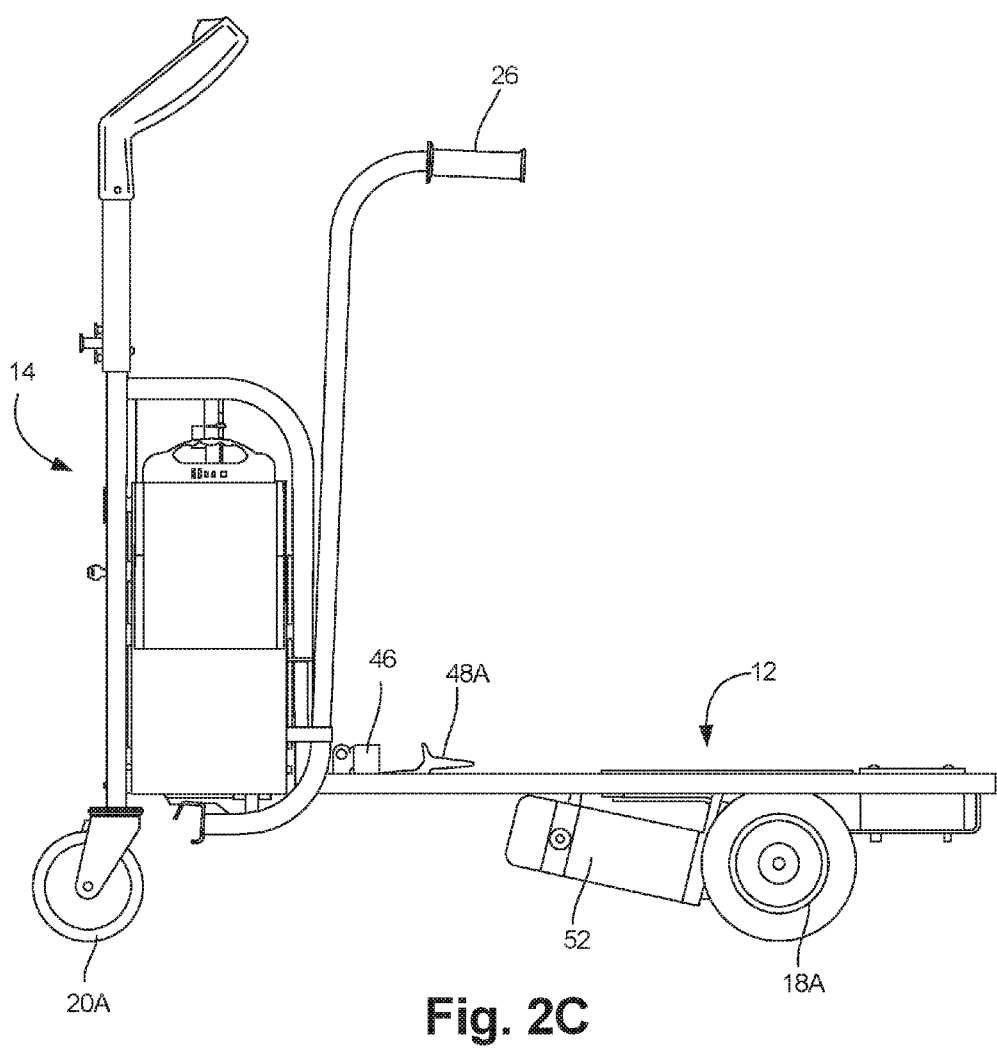
FIG. 2C is a side view of the pusher of FIG. 1, according to one embodiment.

As best shown in FIGS. 1, 2A, 2B, and 2C, the powered pusher 10 in this exemplary implementation has a base 12, a right control handle 14, a left control handle 16, four wheels 18A, 18B, 20A, 20B—including two front wheels 18A, 18B, and two back wheels 20A, 20B—a controller 22, a battery 24, a guide handle 26, and a motor 52 coupled to the front wheels 18A, 18B. The base 12 has a front base bar 40 with a right portion 40A, a left portion 40B, and a front portion 40C. Further, the base 12 has a base cover 42 coupled to the front base bar 40, a rear base bar 44, a latch bar 46, two latches 48A, 48B on the latch bar 46 (as best shown in FIGS. 1 and 2C), and a latch release lever 50 (as best shown in FIG. 2A). The controller 22 has a processor (not shown), an optional remote controller 60, an emergency shut-off switch 62, a status display 64, an actuation switch or button 66, and a remote programming button 68. As best shown in FIGS. 2A and 2B, the right control handle 14 has a right handle support 80, a right height adjustment pin 86, a right grip 82, and a right throttle 84 on or adjacent to the grip 82. Similarly, the left control handle 16 has a left handle support 100, a left height adjustment pin 106, a left grip 102, and a left throttle 104 on or adjacent to the grip 102.

According to one embodiment, the pusher 10 is a flatbed pusher 10 having a flatbed base 12. That is, the base 12 has a minimal height above the ground or floor on which the pusher 10 is positioned. According to one embodiment, the base 12 has a height of no more than about 7.5 inches. In a further embodiment, the base 12 has a height of no more than about 6.5 inches. In yet another embodiment, the base 12 has a height of no more than about 9 inches. The base 12, in accordance with one implementation, can have a height ranging from about 6.5 inches to about 12 inches. It is understood that the base 12 can have any height that allows the base 12 to be positioned under the wheeled object to be pushed by the pusher 10. One advantage of the short flatbed base 12 is the ability to position that base 12 under the cart or wheeled object when the pusher 10 is being coupled to that cart or object, as will be described in further detail below.

In one embodiment, the control handles 14, 16 can be used by a user to control the movement and positioning or "steer" the pusher 10. In one specific exemplary implementation, when the user is positioned behind—or proximal to—the pusher 10, the user can steer or control the direction of the pusher 10 as it moves forward or backward by pushing the control handles 14, 16 in the opposite direction of the desired direction of travel. That is, if the user desires to steer the pusher 10 to the right, then the user would push the handles 14, 16 to the left, and if the user desires to steer the pusher 10 to the left, then the user would push the handles 14, 16 to the right.

The adjustment pins 86, 106 can be used to adjust the height of the control handles 14, 16. That is, a user can remove the pins 86, 106 and adjust the height of the associated handles 14, 16 to match the height of the user, and then reinsert the pins 86, 106 to retain the handles 14, 16 at their new, adjusted height, thereby enhancing ease of use.

Figure 2D:
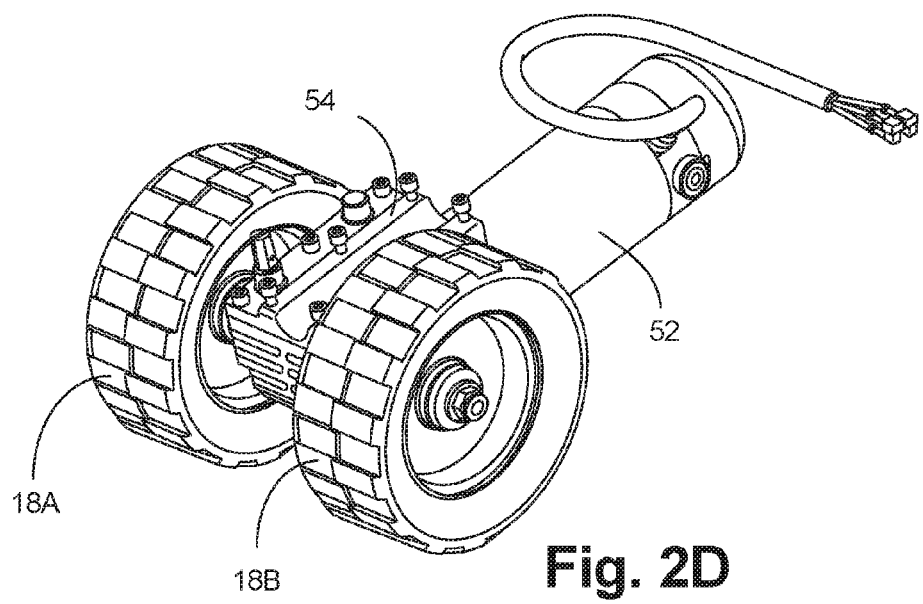
FIG. 2D is a perspective view of a motor and front wheels, according to one embodiment.

According to one embodiment, as best shown in FIG. 2D, the motor 52 is disposed under the base cover 42 and is coupled to the gear box 54, which is coupled to the wheels 18A, 18B. In one implementation, the motor is a known 450 watt two pole motor. Alternatively, the motor is a 650 watt four pole motor. In a further alternative, the motor is a 1,000 watt motor.

According to one embodiment, the pusher 10 has a two-position gear release (not shown) that can be accessed via the opening 11 in the base 12. If the pusher 10, 150 were to malfunction or stop working for any reason, the pusher 10, 150 can be moved to another location—such as, for example, a repair room or area—by moving the gear release (not shown) to the released position. That is, the user can insert a tool—such as a socket wrench or other appropriate tool—through the opening 11 in the base 12 and couple the tool to the gear release (not shown) and move the release to the released position. The pusher 10 cannot be caused to move forward or backward using the motor when the gear release is in the released position. Once the pusher 10 is repaired, the user can use the tool to move the release to the engaged position.

In one embodiment, the battery 24 is a 24-volt lithium ion battery. Alternatively, the battery 24 can be a 12-volt or 36-volt battery. Further, the battery 24 can be either a lithium battery or some other known type of battery. In a further embodiment, the battery 24 can be any battery that can provide sufficient energy to a pusher 10 to perform within the parameters described herein. In certain implementations, the battery 24 is any battery that provides at least approximately 3.5 hours of use of the pusher 10. Alternatively, the battery 24 provides at least approximately 5 hours of use of the pusher 10. In one embodiment, the battery 24 has a built-in energy level meter that provides an approximate amount of energy remaining in the battery. According to certain embodiments, each pusher 10 has at least two batteries 24 available such that one can be charging while the other is in user. When one battery 24 is used until it has no further energy, it can be removed from the pusher 10 and replaced with another battery 24 so that the first battery 24 can be recharged. Alternatively, the pusher 10 can have a battery 24 that is not removable and instead is charged while still connected to the pusher 10.

Figure 3:
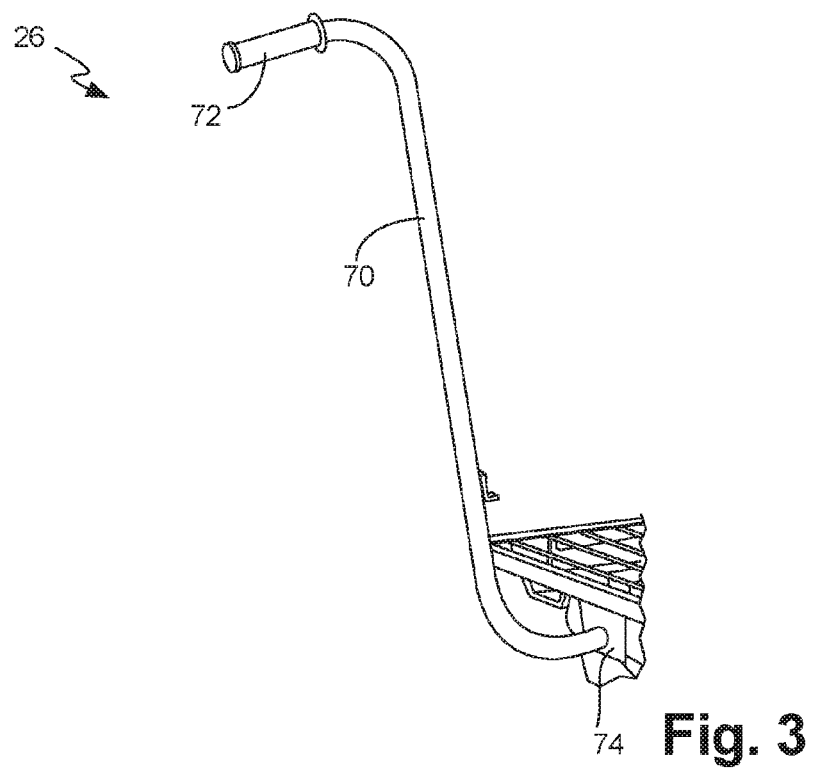
FIG. 3 is a perspective view of a guide handle, according to one embodiment.

As best shown in FIGS. 1 and 3, the guide handle 26, in accordance with one implementation, can be used by a user to guide or control the pusher 10 while the user is positioned at the side or in front of the pusher 10, instead of behind the pusher 10. In certain circumstances, the pusher 10 may be coupled to a cart that is loaded with items that are too long to fit entirely on the cart. In such circumstances, the items on the cart may extend proximally past the end of the cart and past the back end of the pusher 10 into the space typically occupied by the user who is controlling the pusher 10. Thus, those circumstances may prevent the user from standing behind the pusher 10, forcing the user to control the pusher 10 from another location. In such a situation, the user can stand next to or adjacent to the pusher 10 and use the guide handle 26 and, in certain embodiments, the remote control unit 60 described elsewhere herein.

The guide handle 26, according to one embodiment as best shown in FIG. 3, has a guide handle support 70, a guide handle grip 72, and a handle coupling component 74 that is configured to couple to some portion of one of the carts that is coupled to the pusher 10. According to one embodiment, the guide handle 26 is coupled to the cart that is coupled to the pusher 10. In one embodiment in which the pusher 10 is coupled to more than one cart, the handle 26 is typically coupled to the front-most or distal-most cart. In one implementation, the coupling component 74 is a bracket 74 that fits over and couples to a bar on the cart such that the bracket 74 can be easily coupled to and removed from the bar as best shown in FIGS. 3 and 10A-10C. The coupling component 74 can couple to a bar on the distal end of the cart or on the side of the cart and thereby can provide the user with a way to guide the cart(s) and pusher 10. Once the guide handle 26 is coupled to the cart, the user can use the handle 26 to help control the direction of or steer the cart(s) and pusher 10 by urging the handle 26 in the direction that the user desires to steer the cart(s) and pusher 10. In certain embodiments, the user can use the remote control unit 60 in combination with the guide handle 26 to steer the cart(s) and pusher 10. In one alternative, the guide handle 26 can be configured to be coupled directly to a portion of the pusher 10, especially in those situations in which the pusher 10 is coupled to a single cart or wheeled object.

In accordance with one embodiment, as best shown in FIGS. 1, 2A, 2C, 4A, 4B, and 4C, the latch bar 46 having two latches 48A, 48B is used to couple the pusher 10 to a cart or other wheeled object. As best shown in FIG. 2A, the two latches 48A, 48B are coupled to the latch bar 46 such that the latches are configured to move between a latching/ latched position (as best shown in FIGS. 2A, 2C, 4A, and 4C) and an unlatching position (not shown) in which the latches 48A, 48B are positioned closer the floor or ground the pusher 10 is positioned on. The latches 48A, 48B are tensioned (or "spring-loaded") such that they are urged toward the latching/latched position (in the direction of arrow A in FIG. 4C) unless or until a user depresses the latch release lever or pedal 50, thereby urging the latches 48A, 48B toward the unlatching position (in the direction of arrow B in FIG. 4C).

Figure 4A:
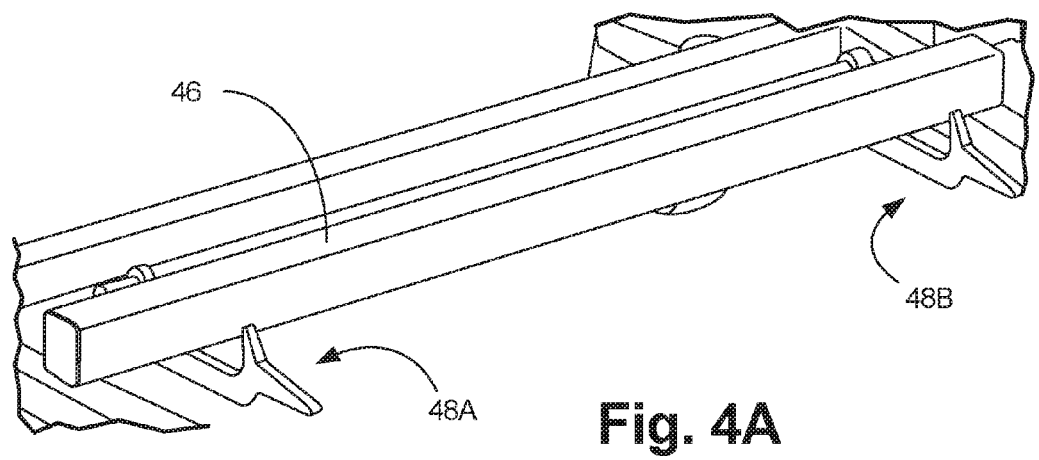
FIG. 4A is a front perspective view of a latching bar and associated latches, according to one embodiment.
Figure 4B:
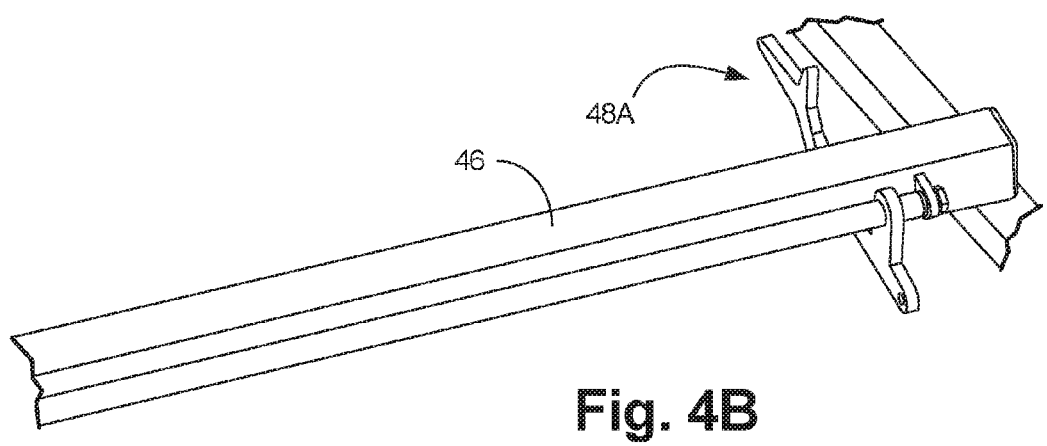
FIG. 4B is a rear perspective view of the latching bar and associated latches of FIG. 4A, according to one embodiment.
Figure 4C:
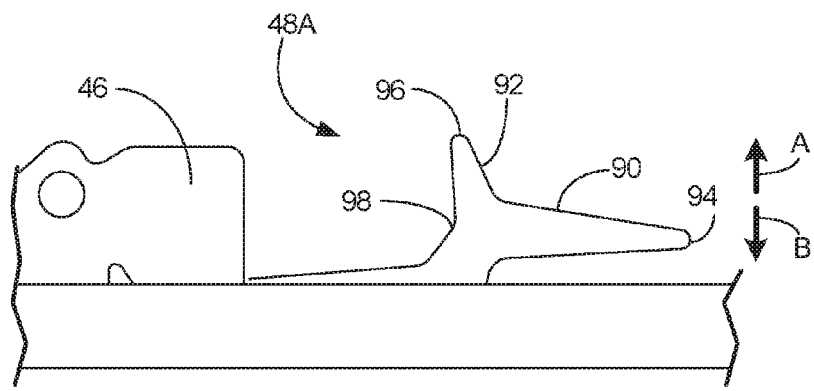
FIG. 4C is a side view of the latching bar and associated latches of FIG. 4A, according to one embodiment.

As best shown in FIG. 4C (in which only latch 48A is shown, but it is understood that latch 48B is substantially the same), both latches 48A, 48B, in one implementation, both have a distal projection 90 and an upward projection 92. The distal projection 90 has a narrow tip 94 and a thickness that progressively increases from the tip 94 to the upward projection 92. In use, as the pusher 10 is advanced toward a cart or other wheeled object for coupling thereto and the base 12 is positioned beneath the object, the two latches 48A, 48B advance toward the coupling bar or other similar coupling component (not shown) on the wheeled object. As the two latches 48A, 48B make contact with the coupling bar, the narrow tip 92 causes the distal portion of the distal projection 90 to be positioned beneath the coupling bar. And as the two latches 48A, 48B move forward, the increasing thickness of the projection 90 causes the top portion of the distal projections 90 to make contact with the coupling bar such that the latches 48A, 48B are urged downward (in the direction of arrow B) as the latches 48A, 48B are urged forward. This urging of the latches 48A, 48B downward as they are urged forward continues as the upward projections 92 make contact with the coupling bar. The slope of the distal projection 90 and the upward projection 92 allow for this urging of the latches 48A, 48B downward (in the direction of arrow B) as the latches 48A, 48B are urged forward. Once the tip 96 of the upward projection 92 moves past the coupling bar, the latches 48A, 48B are no longer restrained along the top of the distal projection 90 or upward projection 92 by the coupling bar, so the latches 48A, 48B move back toward the latched position (in the direction of arrow A). At this point, the coupling bar is retained proximal to the latches 48A, 48B by the back surface 98 of the upward projection 92. In this fashion, the pusher 10 is coupled via the latches 48A, 48B to the target wheeled object. In this configuration according to one implementation, the latches 48A, 48B allow for automatic coupling of the wheeled object to the pusher 10 such that all a user has to do if position the pusher 10 such that the base 12 is urged toward and under the object until the latches 48A, 48B make contact with the corresponding coupling component on the wheeled object. When the user is ready to uncouple the pusher 10 from the wheeled object, the user can depress the latch release pedal 50 (as best shown in FIG. 2A) with the user's foot, which causes the two latches 48A, 48B to move downward (in the direction of arrow B), thereby freeing the coupling bar of the wheeled object and allowing the pusher 10 to move proximally away from and uncouple from the wheeled object.

Figure 5:
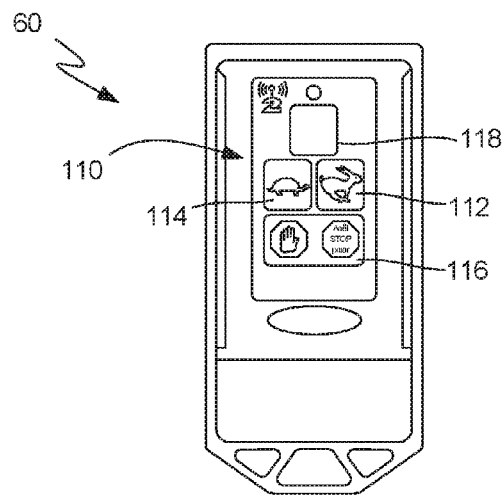
FIG. 5 is a front view of a remote control unit, according to one embodiment.

FIG. 5 depicts the optional remote control unit (also referred to as a "remote controller" or "remote") 60, according to one embodiment, which is also depicted in its "stored" configuration in FIGS. 1, 2A, and 2B. In the stored configuration, the remote unit 60 is positioned in a receptacle 61 in the pusher 10, as best shown in FIG. 2A. The remote unit 60 is in wireless communication with the controller 22 on the pusher 10 via any known form of wireless communication. The controller 60 has an interface 110 that includes control buttons that a user can utilize to operate the pusher 10 remotely. More specifically, the interface 110 has various actuation components or buttons that the user can utilize to cause the pusher 10 to move or stop. In one embodiment, the interface 110 has two buttons for two different speeds: a fast speed button 112 and a slow speed button 114. According to certain implementations, the user can press and hold the fast speed button 112 to cause the pusher 10 to move at a predetermined speed, or the user can press and hold the slow speed button 114 to cause the push to move at a predetermined speed that is slower than the predetermined fast speed. In one embodiment, the fast speed button 112 and slow speed button 114 are configured solely for actuating forward movement of the pusher 10, not backward or reverse movement. Alternatively, the buttons 112, 114 or additional buttons can be used to move the pusher 10 forward or backward in a fast speed or a slow speed. The interface 110 can also have a stop button 116 that the user can press to actuate the controller 22 to cause the pusher 10 to stop, including in an emergency situation. In some implementations, the interface 110 also has a horn button 118 that can be pressed to cause the controller to actuate an audible horn sound to provide a warning to people nearby. In one implementation, only one button of the remote unit 60 is usable at a time. In certain embodiments, the pusher 10 will briefly coast when the control buttons of the interface 110 are released by the user. Further, it is understood that the remote unit 60 can have any known button or other actuation component for actuating the controller to cause any known action to be performed by the pusher 10.

Returning to FIGS. 2A and 2B, the actuation switch or button 66 in this specific exemplary embodiment is a three-position actuation key 66 that can be used to put the pusher 10 in the "manual" mode, the "wireless" mode, or the "off" mode. The key 66 can be physically moved between three different positions that correspond to these three different modes. Alternatively, the actuation switch or button 66 can be a button, a switch, or any other known actuation component.

In a further alternative, the controller 22 can also have a coded keypad (not shown) that requires a user to enter a predetermined code in order to be able to put the pusher 10 in any of the above operational modes. This predetermined code prevents non-qualified people from attempting to operate the pusher 10.

The status display 64 (as best shown in FIGS. 2A and 2B), according to one embodiment, is a status light 64 that will display a solid green light when the pusher 10 is turned on and operating properly. In one implementation, if the emergency shut off button 62 is depressed or some portion of the pusher 10 is not functioning properly, the status light 64 will flash in a coded fashion and/or display a code that indicates the cause of the malfunction. Alternatively, it is understood that the status display 64 can be any type of known display for providing information to user about the status of the pusher 10.

According to one implementation, the emergency shut-off switch 62 (as best shown in FIGS. 2A and 2B) is a button 62 that can be depressed by a user to stop the pusher 10, including in case of an emergency. In accordance with one embodiment, depressing the button 62 causes the pusher 10 to stop quickly. One implementation of the button 62 remains depressed and in the "shut-off" mode until a user pulls the button 62 back to its unactuated position.

In one embodiment, as discussed above, the right grip 82 has a right throttle 84 and the left grip 102 has a left throttle 104. FIG. 7A depicts the left grip 102 with the left throttle 104 in further detail. It is understood that the right grip 82 and right throttle 84 are substantially the same as the left grip 102 and throttle 104 as depicted in FIG. 7A. According to one implementation, the left throttle 104 is a throttle lever 104 that has a center position, a forward position in which the lever 104 is urged upward as shown by Arrow C toward the top of the grip 102, and a backward position in which the lever 104 is urged downward as shown by Arrow D toward the bottom of the grip 102. A user can use her or his thumb (or any digit) to move the lever 104 between the three positions. The center position is the default position in which the pusher 10 is at rest. When the lever 104 is moved into the forward position, the lever 104 actuates the controller 22 to cause the pusher 10 to move forward. In contrast, when the lever 104 is moved into the backward position, the lever 104 actuates the controller 22 to cause the pusher 10 to move backward. It is understood that, in this embodiment, the right throttle 84 has the same three positions and works in the same manner.

Alternatively, as shown in FIGS. 7B and 7C, the left grip 102 can have a left throttle 104 and a fast/slow switch 105 (as shown in FIG. 7B) and the right grip 82 can have a right throttle 84 and a horn switch 85. According to one embodiment, the throttles 84, 104 operate in a fashion similar to that described above with respect to FIG. 7A. The fast/slow switch 105 can be used by the user to select between the fast mode and the slow mode by simply actuating the appropriate portion of the switch 105 as shown in the figure. The horn switch 85 can be used by the user to actuate the horn by simply actuating the appropriate portion of the switch 105 as shown in the figure. In this alternative embodiment, the throttles 84, 104 are positioned on the grips 82, 102 such that they are disposed closer to the center of the pusher 10 in relation to the switches 105, 85. Alternatively, the throttles 84, 104 and switches 85, 105 can be configured in any positions in relation to each other. In a further alternative, the grips 82, 102 can have any known actuation mechanisms or buttons for operating the pusher 10.

In accordance with one implementation, the throttle levers 84, 104 control acceleration and braking. That is, the pusher 10 speed and direction (forward or backward) are controlled by actuation of the throttle levers 84, 104 as described above—either by urging the throttle 84, 104 to the forward position or to the backward position. In certain exemplary embodiments, when the user removes her or his finger or decreases the amount of pressure applied to the lever 84, 104, the lever 84, 104 is configured to return to the center position. That is, each lever 84, 104 is tensioned such that the lever 84, 104 is urged toward the center position when no force is being applied by a user to move it toward the forward or backward position. According to certain implementations, the pusher 10 is actuated by the controller 22 to begin braking when the lever 84, 104 moves back toward the center position. Thus, in this implementation, the braking force can be controlled for quick or gradual stops. That is, if the user releases the lever 84, 104 or allows it to return to the center position slowly, the controller 22 is actuated to bring the pusher 10 to a gradual stop. In contrast, if the user releases the lever 84, 104 or allows it to return to the center position quickly, the controller 22 is actuated to bring the pusher 10 to a fast stop.

In accordance with one implementation, the two back wheels 20A, 20B are swivel wheels 20A, 20B while the two front wheels 18A, 18B are fixed wheels 18A, 18B. That is, the two back swivel wheels 20A, 20B rotate 360 degrees on their swivel couplings (also referred to as "swivel casters") (not shown) that couple the wheels 20A, 20B to the base 12, while the two front wheels 18A, 18B have fixed couplings (also referred to as "fixed casters") (not shown) that couple the wheels 18A, 18B to the base 12. Further, in this embodiment, two back wheels 20A, 20B are coupled to the right 14 and left 16 handles, respectively, such that the wheels 20A, 20B are spaced apart from each other on either side of the base 12, thereby creating a predetermined distance between the two wheels 20A, 20B that is at least substantially as wide as the base 12. In contrast, the two front wheels 18A, 18B are positioned much closer together. According to one embodiment, the two front wheels 18A, 18B are 4 inches apart. Alternatively, the two front wheels 18A, 18B can be 6 inches apart. In a further alternative, the distance between the wheels can vary from 4 inches to 8 inches apart, depending on the embodiment.

Further, in certain implementations, the two front wheels 18A, 18B are not positioned at the distal end of the pusher 10. That is, the two front wheels 18A, 18B are positioned beneath the base 12 and proximally from the front portion 40C of the base bar 40 such that there is a distance between the front portion 40C and the wheels 18A, 18B. According to one implementation, the wheels 18A, 18B are positioned about 10 inches proximally from the front end of the base 12. Alternatively, the wheels 18A, 18B are positioned from about 6 inches to about 14 inches proximally from the front end of the base 12. In a further alternative, the distance between the wheels 18A, 18B and the front end of the base 12 can vary depending on the embodiment and on the types of wheeled objects to be pushed.

This wheel configuration (2 closely-spaced, more centrally-positioned front fixed wheels 18A, 18B and two rear swivel wheels 20A, 20B) provides great maneuverability in the form of a small turning radius and easy directional control. The small turning radius results from a turning axis at the two fixed front wheels 18A, 18B positioned beneath the base 12 that allows the pusher 10 to be rotated 360 degrees on that turning axis. The location of the two front wheels 18A, 18B beneath the base 12 and spaced proximally from the front end of the base 12 results in the turning axis being positioned at a more central position of the pusher 10, thereby resulting in the pusher 10 being capable of rotating around a more centrally located turning axis, thereby reducing the turning radius of the pusher 10. In contrast, any cart, pusher, or other wheeled object with swivel wheels at one end of the object and fixed wheels positioned at the other end (rather than being positioned at a more central position) has a turning axis at that end of the object (rather than closer to the center or middle of the object), thus resulting in an inherently larger turning radius. One example of a wheeled object with a turning axis at the end (and thus a larger turning radius) is the standard shopping cart. In this exemplary embodiment, the pusher 10 has a reduced turning radius as a result of the pusher 10 being able to rotate around a centrally located turning axis rather than a turning axis at one end of the pusher 10 or the other.

The easy directional control results from the fixed nature of the front wheels 18A, 18B. That is, the front fixed wheels 18A, 18B make it easy for a user to control the direction of the pusher 10 (and the wheeled object(s) being pushed by the pusher 10) in comparison to swivel wheels. While swivel wheels swivel easily around the swivel axis and thus result in a user having difficulty in moving any object on such swivel wheels from one point to another in a relatively straight line, fixed wheels don't create that same problem. Instead, fixed wheels facilitate easy movement of an object from location to another in a fairly direct fashion with little or none of the deviation or meandering that can be caused by swivel wheels. The standard shopping cart with its rear fixed wheels is another example of this.

As such, the combination of fixed front wheels 18A, 18B positioned close together proximally from the front of the pusher 10 beneath the base 12 and rear swivel wheels 20A, 20B results in a pusher 10 that can be maneuvered easily by a user.

Another advantage of the wheel configuration of this pusher 10 embodiment is that it can easily push many types of carts or other wheeled objects. For example, the pusher 10 can easily couple to a cart with four swivel wheels and push that cart with easy maneuverability. That is, the maneuverability capabilities described above with respect to the pusher 10 are effective when the pusher 10 is coupled to a cart or other wheeled object with four swivel wheels, because the wheel configuration of the pusher 10 provides the benefits described in detail above relating to a minimal turning radius and easy control of direction.

In the pusher 10 as shown in FIGS. 1-2B, the right and left control handles 14, 16 are coupled to the right 40A and left 40B portions of the front base bar 40, respectively, such that the handles 14, 16 spaced apart from each other on either side of the base 12, thereby creating a predetermined distance between the two handles 14, 16 that is at least substantially as wide as the base 12. Thus, the handles 14, 16 define a predetermined amount of space between the two handles 14, 16 proximal from the base 12 that allows for proximal extension between the two handles 14, 16 and proximal therefrom of any items being carried on a cart coupled to the pusher 10 (such as the cart coupled to the pusher 10 in FIG. 9, for example, which is described in additional detail below) such that the items can be positioned on the cart and extend proximally between the handles 14, 16 and proximally of the handles 14, 16 and the base 12. As such, this configuration of the pusher 10 with the spaced handles 14, 16 allows for unobstructed use of a cart (such as the cart in FIG. 9) with items extending proximally from the cart, as will be discussed in additional detail below.

In one embodiment, the device 10 can move a cart loaded with at least 440 lbs (200 kg). Alternatively, the device 10 can move a cart loaded with more than 440 lbs. In further implementations, any pusher embodiments having greater battery voltage and/or motors with greater wattage can push a cart loaded with significantly more than 440 lbs.

In accordance with certain implementations, the pusher 10 is a platform pusher 10 that can be coupled to a wide variety of different wheeled objects. That is, the pusher 10 can be the platform pusher 10 for a family of wheeled objects that can be coupled with the pusher 10 and subsequently pushed by the pusher 10. In certain embodiments, the pusher 10 can be automatically coupled to the family of wheeled objects, as will be described in further detail below. The family of wheeled objects can include the various carts disclosed or contemplated herein, including the carts as depicted in FIGS. 9A-14C. These carts and the coupling of those carts to a pusher such as pusher 10 will be described in additional detail below.

Figure 6A:
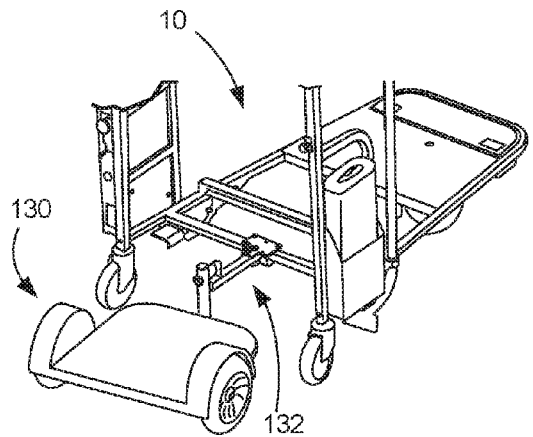
FIG. 6A is a rear perspective view of a pusher with a sulky, according to one embodiment.
Figure 6B:
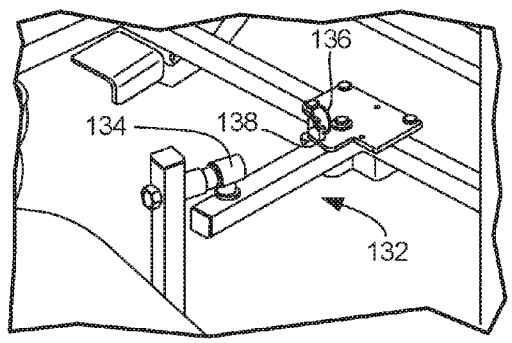
FIG. 6B is a perspective view of the hitch and coupling component for the sulky of FIG. 6A, according to one embodiment.
Figure 6C:
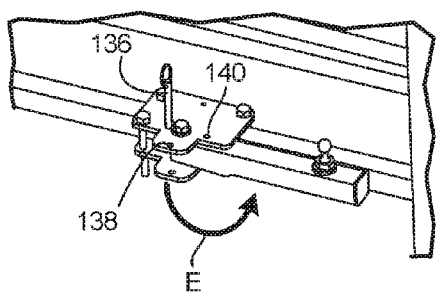
FIG. 6C is a perspective view of the hitch of FIG. 6A, according to one embodiment.

One optional component, according to certain embodiments, is a detachable wheeled user platform (also referred to herein as a "sulky") 130 as shown in FIGS. 6A-6C that can be coupled to a hitch 132 on the proximal end of the pusher 10. According to one embodiment, the sulky 130 allows the user to be positioned proximal to the pusher 10 and ride along with the pusher 10 rather than walking during use. The sulky 130 has a coupling component 134 that can be removably coupled to the pusher hitch 132. According to one embodiment, the coupling component 134 is a quick disconnecting coupling component 134 that is positioned over a ball (not shown) positioned on the end of the hitch 132 such that the coupling component 134 can be lockably coupled to the ball and easily unlocked and removed from the ball and the hitch 132 with a single movement of the coupling component 134. Alternatively, any coupling component 134 can be used with any corresponding configuration on the hitch 132.

In another implementation, the hitch 132 can be moved between an extended position and a retracted position as best shown in FIG. 6C. The hitch 132 can be moved into the retracted position when the hitch 132 is not in use. The hitch 132 is rotatably coupled to the pusher 10 such that a pin 136 is positioned through first opening 138 and through the hitch to hold it in the extended position as shown in FIG. 6B. When the user is not using the sulky 130, the user can pull up on the pin 136 and remove it from the first opening 138, thereby releasing the hitch 132 so that the hitch 132 can be rotated to the retracted position in the direction shown by Arrow E as shown in FIG. 6C. Once the hitch 132 is in the retracted position, the pin 136 can be placed in the second opening 140, thereby locking the hitch 132 in that retracted position. It is understood that a user can reverse these steps when the user wants to deploy the hitch 132 to attach the sulky 130.

An alternative pusher 150 embodiment is depicted in FIGS. 8A-8D. It is understood that this pusher 150 has components substantially similar to those components discussed above with respect to pusher 10 except as set forth below. It is further understood that the above description of the pusher 10 and related figures apply equally to the pusher 150 except as specifically stated herein. According to one implementation, this pusher 150 is configured to operate in larger environments, such as distribution centers and other such locations. Alternatively, the pusher 150 can be used in any environment.

Figure 8B:
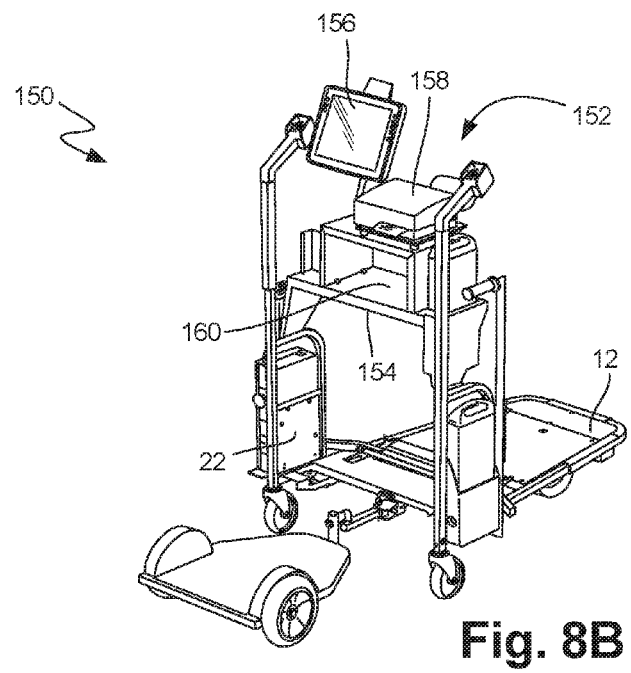
FIG. 8B is a rear perspective view of the pusher of FIG. 8A, according to one embodiment.
Figure 8C:
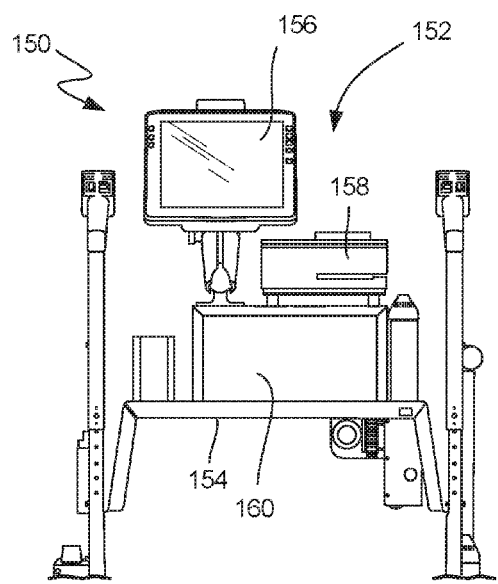
FIG. 8C is a rear view of the pusher of FIG. 8A, according to one embodiment.

As best shown in FIGS. 8B and 8C, the pusher 150 has a user console 152 that includes a console base 154, a touchpad interface 156, a printer 158, and a storage receptacle 160 positioned on the base 154. The touchpad interface 156 is coupled to the processor 22 and can be used by the user to control various functions and portions of the pusher 150. Further, the interface 156 is coupled to the printer 158 such that a user can process orders or perform other functions and print out the resulting output in paper format using the printer 158. Alternatively, the console 152 can be tailored to have any equipment or components that may be desirable depending on the specific use of the pusher 150.

Figure 8D:
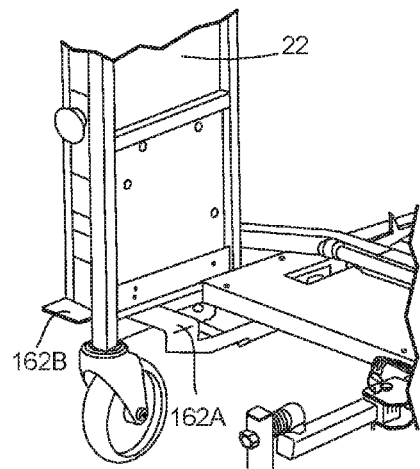
FIG. 8D is a close-up perspective view of a portion of the pusher of FIG. 8A, according to one embodiment.

According to one exemplary embodiment as best shown in FIG. 8D, the pusher 150 also has a two-pedal latch release lever 162 that includes a first pedal 162A disposed proximal to the base 12 (a position similar to the latch release pedal 50 in FIG. 2A and discussed above) and a second pedal 162B coupled to the first pedal 162A and positioned proximal to the controller 22. The second pedal 162B in this embodiment makes it easier for a user to depress the latch release lever 162 and thereby release the pusher 150 from any cart or wheeled object to which the pusher 150 is coupled in those situations in which the user is not able to stand behind or proximal to the pusher 150 (such as when products or other objects on the cart or other wheeled object are extending past the proximal end of the pusher 150).

In use, the various pusher embodiments disclosed or contemplated herein (such as pushers 10 and 150) can be used in various modes—as mentioned above—to push various wheeled objects such as carts in various retail, warehouse, and other environments. When the user is positioned behind or proximal to the pusher (such as pushers 10, 150) and uses the control handles 14, 16 and throttle levers 84, 104 to control or steer the pusher, that is called the "manual mode." Alternatively, when the user is positioned adjacent to (beside or in front of) the pusher 10, 150 and uses the guide handle 26 in combination with the remote unit 60 as discussed above, that is called the "wireless mode" (also referred to herein as the "remote mode" or "radio mode").

According to certain embodiments, when the user wants to operate the pusher 10, 150 in manual mode, the user turns the actuation key 66 to the position corresponding to the manual mode. On the other hand, if the user wants to operate in the wireless mode, the user turns the actuation key 66 to the position corresponding to the wireless mode. Further, when the user is ready to power down the pusher 10, 150, the user turns the key 66 to the off position.

In the manual mode, the user positions herself or himself behind, proximal to, or to the side of the pusher 10, 150, turns the actuation key 66 to the manual mode position, and controls the pusher 10, 150 with the control handles 14, 16, the throttle levers 84, 104, and the other components of the pusher 10, 150 that are physically accessible when the user is in that position. In certain embodiments, the user can couple the sulky 130 to the pusher 10, 150 and operate in manual mode while positioned on the sulky 130. Alternatively, the user can operate the pusher 10, 150 in manual mode without the sulky 130.

In the manual mode, the user uses the control handles 14, 16 to control the pusher 10, 150 as described in further detail above. That is, the user can cause the pusher 10, 150 to move forward or backward using the throttle levers 84, 104. In one embodiment, either lever 84, 104 can be used at any given time, and the user can switch from using one to the other during operation of the pusher 10, 150. That is, whichever throttle lever 84, 104 is used first by the user—either the right lever 84 or the left lever 104—will be the "active lever" that is in communication with the controller 22 until that first lever is returned to its center position. Once the first lever is returned to its center position, then either lever 84, 104 can be actuated to become the "active lever." Both levers 84, 104 control the pusher 10, 150 in the same way with respect to acceleration and braking, as described in further detail above.

Further, in manual mode, in one embodiment as described above, the user can steer or direct the pusher 10, 150 to turn in one direction or the other by pushing the control handles 14, 16 in the opposite direction. Alternatively, the user can steer the pusher 10, 150 by pushing the handles 14, 16 in the same direction as the user desires for the pusher 10, 150 to turn.

Figure 9A:
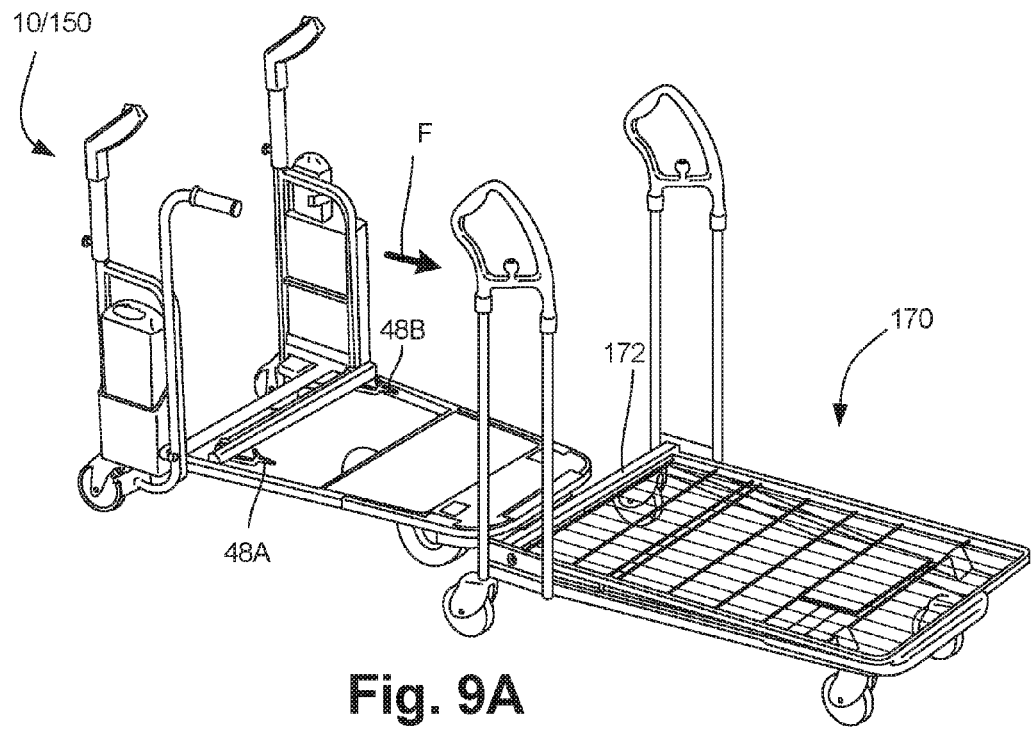
FIG. 9A is a perspective view of a pusher being coupled to a cart, according to one embodiment.
Figure 9B:
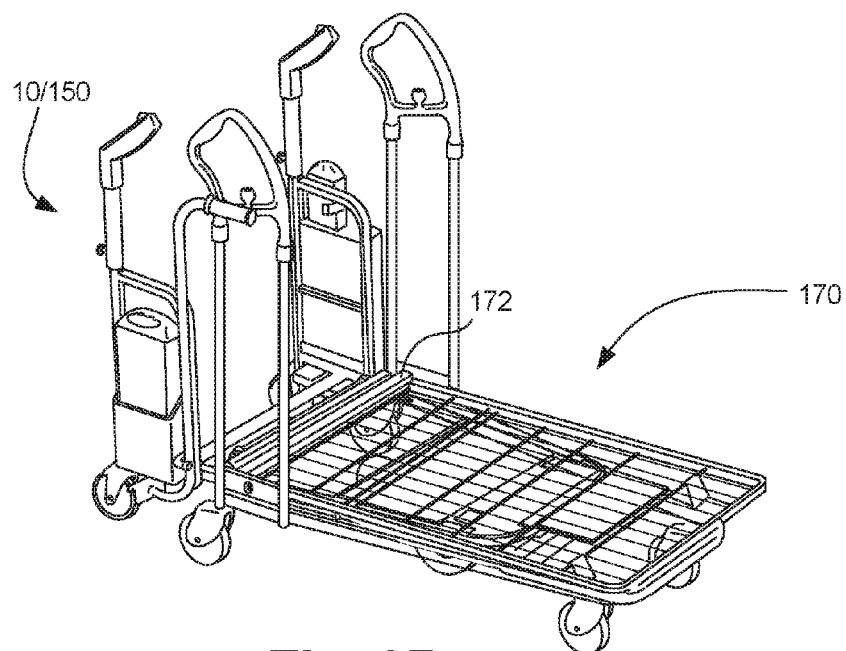
FIG. 9B is a perspective view of a pusher coupled to a cart, according to one embodiment.
Figure 9C:
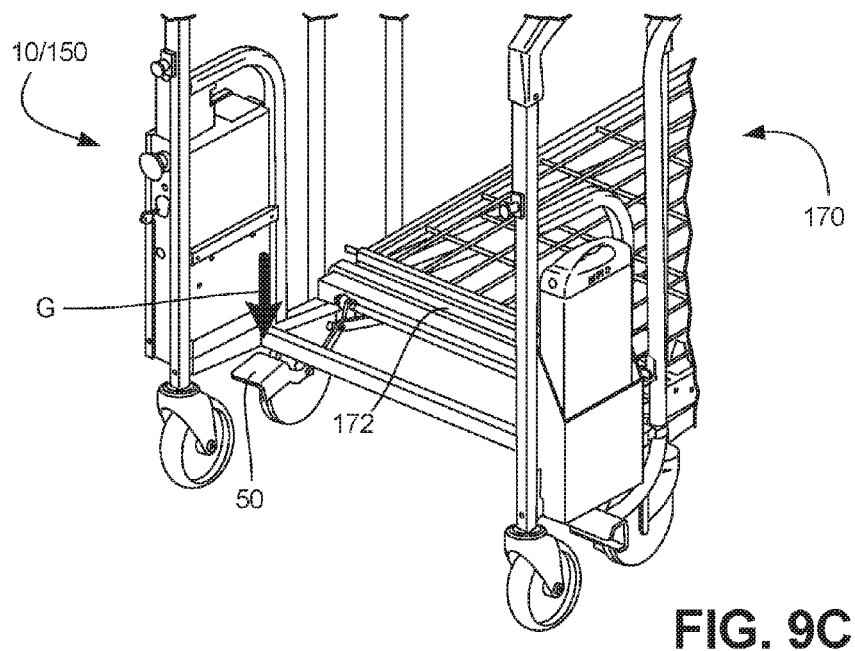
FIG. 9C is a rear perspective view of a pusher coupled to a cart, according to one embodiment.

As shown in FIG. 9A, the pusher 10, 150 can be coupled to a flatbed cart 170 (or any other cart or wheeled object) in the following manner. The user aligns the pusher 10, 150 such that the pusher 10, 150 is positioned proximal to the cart 170 and then moves the pusher 10, 150 toward the cart 170 as shown by Arrow F. As the pusher 10, 150 is urged forward as shown in FIG. 9B, the base 12 is positioned beneath the cart 170 and the latches 48A, 48B move distally past the coupling bar 172 on the cart 170, thereby causing the latches 48A, 48B to couple to the bar 172 as described in further detail above. Once the pusher 10/150 is coupled to the cart 170 in this fashion, the user can actuate the pusher 10/150 to move the cart 170 to the desired location. As shown in FIG. 9C, once the cart 170 is positioned in the desired location, the user can disconnect or uncouple the pusher 10/150 from the cart 170 by depressing the latch release lever 50 (or the dual-pedal release lever 162) in the direction shown by Arrow G. The depressing of the lever 50 (or 162) causes the latches 48A, 48B to uncouple from the bar 172, thereby releasing the pusher 10/150 from the cart. At that point, the user can back the pusher 10/150 away from the cart 170 and leave the cart 170 in the desired location.

Figure 10A:
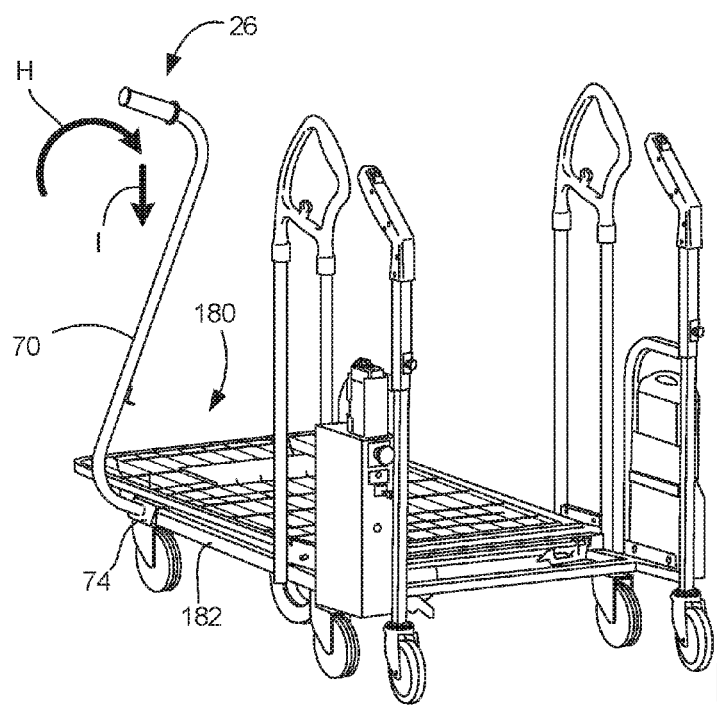
FIG. 10A is a perspective view of a guide handle being coupled to a cart, according to one embodiment.
Figure 10B:
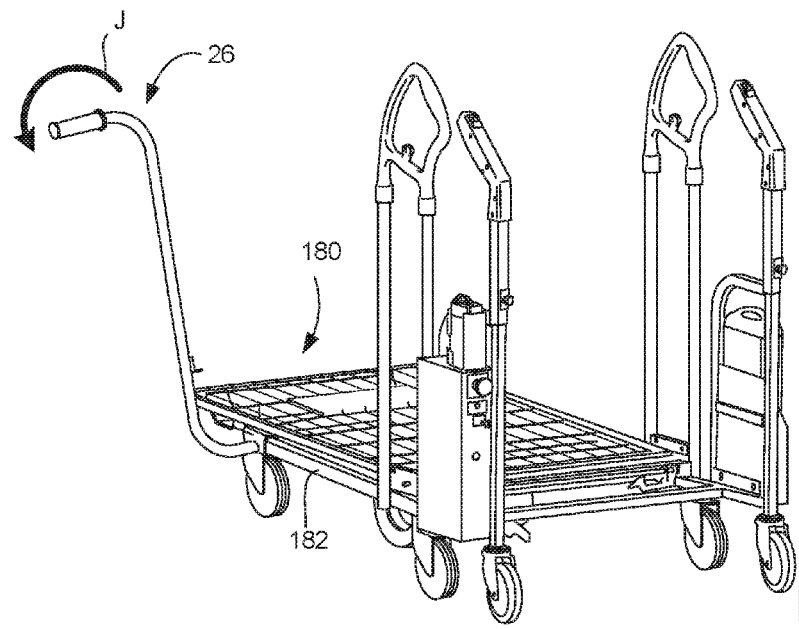
FIG. 10B is a perspective view of a guide handle coupled to a cart, according to one embodiment.

In contrast, in the wireless mode according to one embodiment, the user turns the actuation key 66 to the wireless mode position, pulls the remote unit 60 from the remote unit receptacle 61 on the pusher 10/150, and places the guide handle 26 at a desired location on a portion of a cart, such as, for example, a bar 182 on the cart 180 as shown in FIG. 10A (and as described in further detail above). More specifically, in this particular embodiment, the user positions the guide handle 26 such that the handle coupling component 74 is adjacent to and above the bar 182 and tilts the handle 26 in the direction shown in Arrow H by moving the top portion of the handle support 70 toward the cart 180 while moving the bottom portion away, thereby optimally positioning the coupling component 74 for coupling with the bar 182. Once the coupling component 74 is optimally positioned as described, the handle 26 is moved downward in the direction shown by Arrow I, thereby putting the coupling component 74 into contact with the bar 182. Once the coupling component 74 is in contact with the bar 182 such that the bar 182 is positioned in the coupling component 74, the handle 26 is allowed to tilt back to its natural, coupled position as shown in FIG. 10B. That is, the handle 26 is allowed to tilt back in the direction shown by Arrow J, thereby completing the coupling of the handle 26 to the bar 182 on the cart 180. According to one alternative embodiment, instead of using the guide handle 26 to control the direction of the pusher 10, 150, the user can use one of the control handles 14, 16 for the same purpose.

Figure 10C:
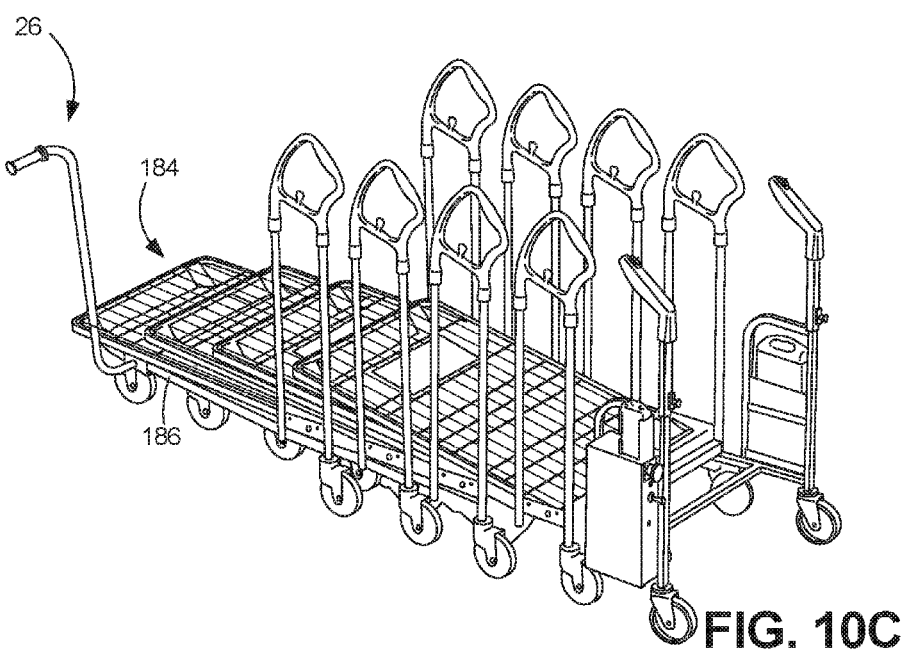
FIG. 10C is a perspective view of a guide handle coupled to the front cart of a line of carts, according to one embodiment.

Once the guide handle 26 is coupled at the desired location as described above, the user can position herself or himself adjacent to the guide handle 26 with the remote unit 60 in hand, grasp the guide handle 26, and control the cart(s) (such as cart 180) and pusher 10, 150 with the guide handle 26 and the remote unit 60 as described in additional detail above. According to one embodiment, the pusher 10, 150 will only move forward—but not backward—in the wireless mode. Alternatively, the pusher 10, 150 can move forward and backward in wireless mode. In one exemplary implementation, it is understood that the guide handle 26 can be used in those circumstances in which the pusher 10, 150 is coupled to multiple carts, as shown in FIG. 10C. In this situation, according to certain embodiments, the user couples the guide handle 26 to the cart 184 in the distal-most position of the line of carts as shown in the figure using the same or similar steps to those set forth above for coupling to the bar 186. Regardless of where the guide handle 26 is coupled, when the user has completed the desired task with the pusher 10, 150 in the wireless mode, the user can return the pusher 10, 150 to its original status by removing the guide handle 26 and placing it in its base position (as shown in FIG. 1, for example) by reversing the steps described above for coupling the handle 26 to the cart (such as cart 180 or cart 184). Then the user can shut down the remote unit 60, place it back in the remote unit receptacle 61, and turn the actuation key 66 to the off mode position.

As discussed above, the various power pusher implementations disclosed and contemplated herein can be configured to be interchangeably coupleable to a number of different carts and other wheeled devices. For example, according to another embodiment as shown in FIGS. 11A and 11B, a power pusher 500 can be configured to be coupleable to a shelf cart such as the shelf cart 502.

Figure 11A:
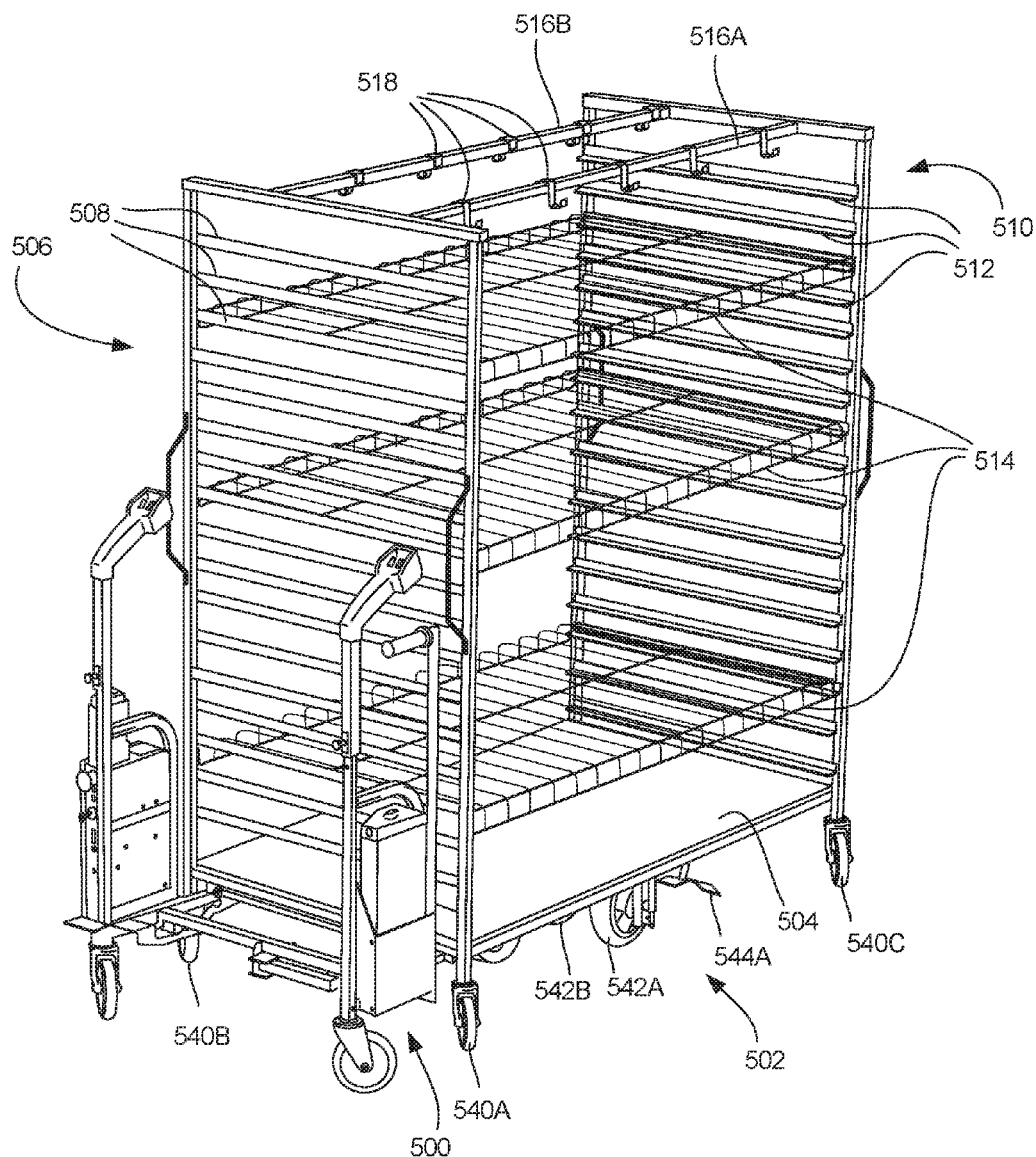
FIG. 11A is a rear perspective view of a pusher coupled to a shelf cart, according to one embodiment.
Figure 11B:
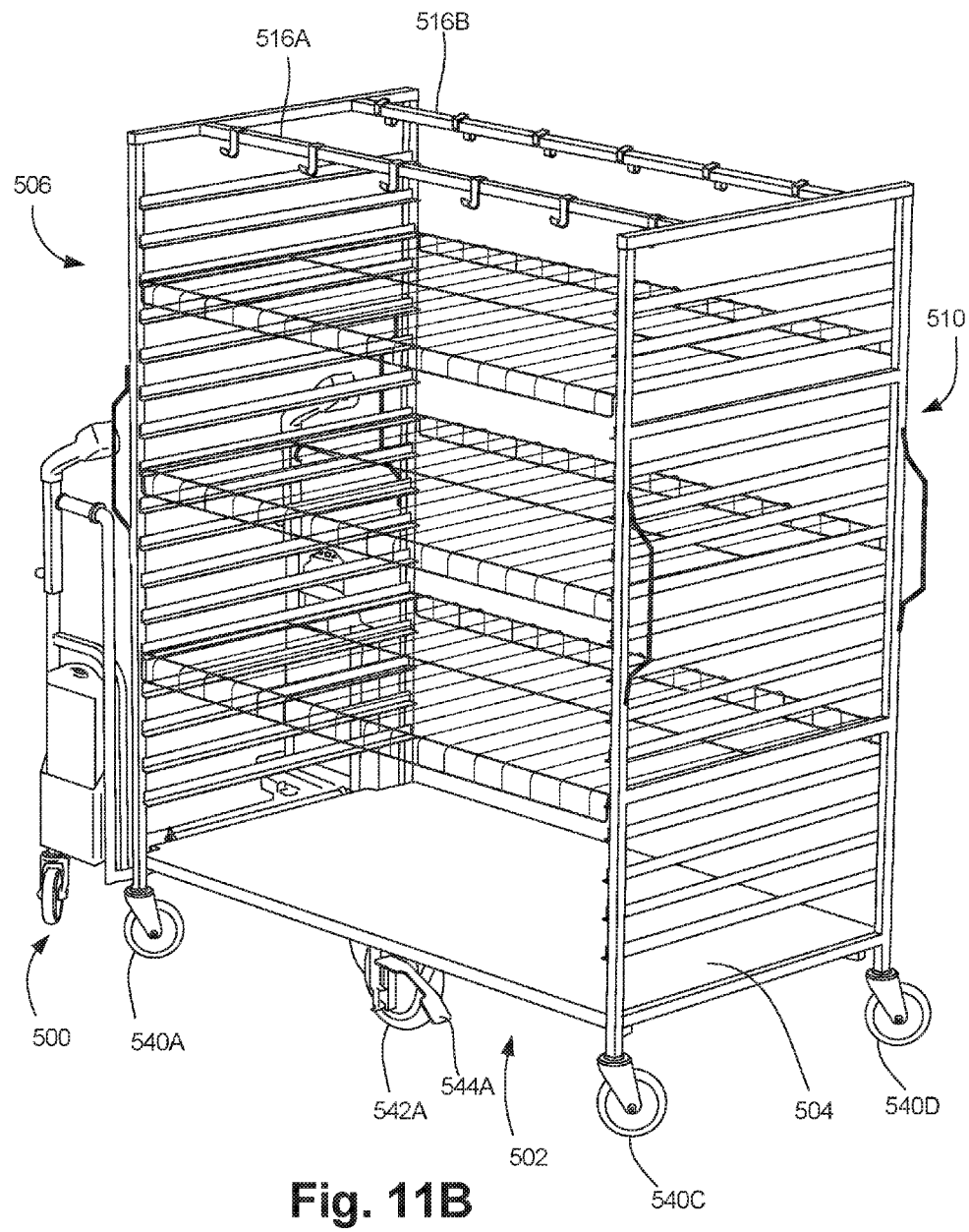
FIG. 11B is a front perspective view of the pusher coupled to the shelf cart of FIG. 11A, according to one embodiment.
Figure 12A:
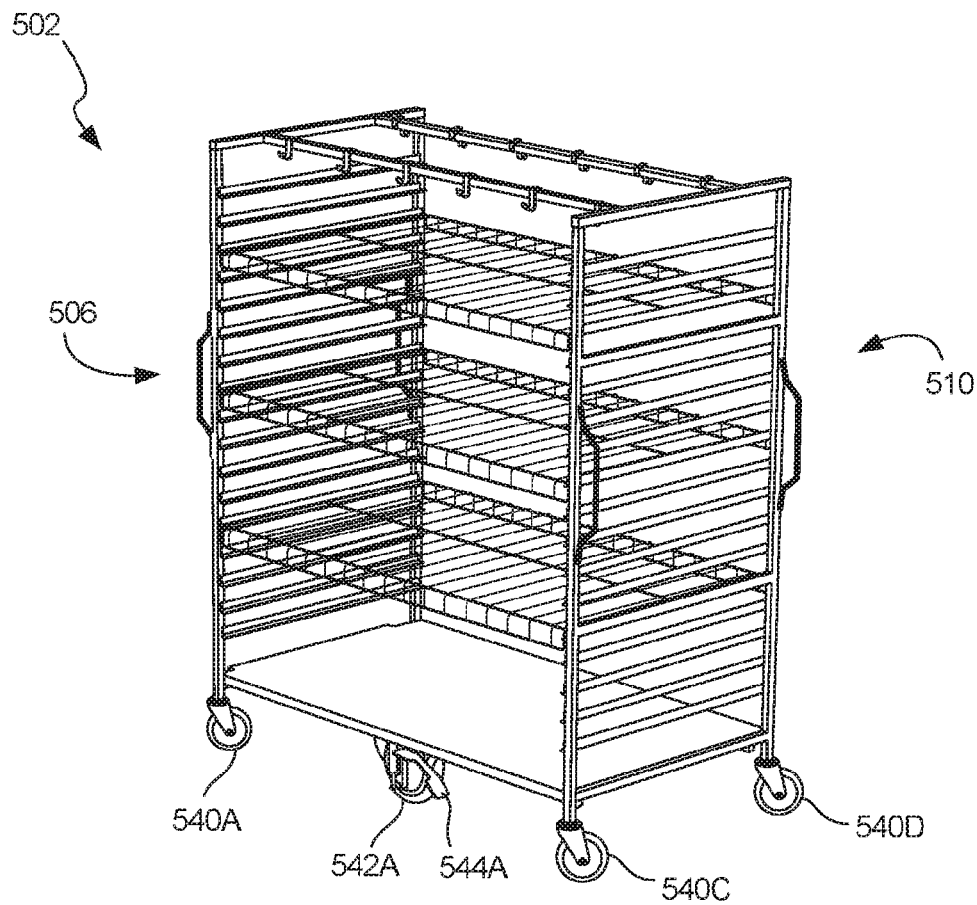
FIG. 12A is a perspective view of a shelf cart, according to one embodiment.
Figure 12B:
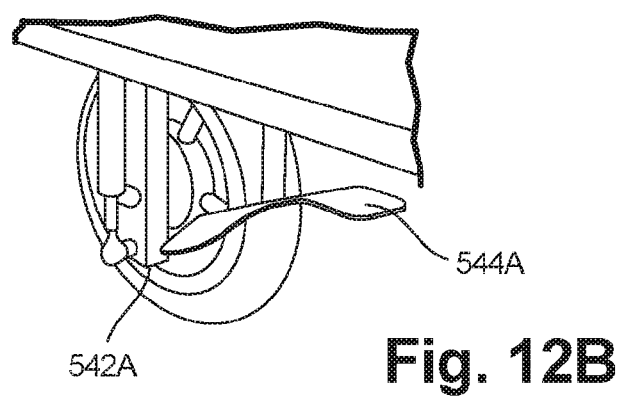
FIG. 12B is a close-up perspective view of a portion of the shelf cart of FIG. 12A, according to one embodiment.

In FIGS. 11A and 11B, the pusher 500 is coupled to the shelf cart 502, which is also depicted in FIGS. 12A and 12B (without the pusher 500 coupled thereto). The cart 502 has a base 504, a first end frame 506 having horizontal bars 508, and a second end frame 510 having horizontal bars 512. In this embodiment, the cart 502 has three removable shelves 514 removably coupled at each end to the appropriate horizontal bars 508, 512. It is understood that each of the shelves 514 can be moved from its current position and placed at any vertical position by coupling each end of the shelf 514 to the appropriate horizontal bars 508, 512 on the end frames 506, 510. It is further understood that any number of shelves 514 can be removably coupled to the cart 502, ranging from no shelves or one shelf 514 to as many shelves as there are corresponding horizontal bars 508, 512. The cart 502 also has two support bars 516A, 516B extending along the length of the cart 502 and coupled at each end to the first and second end frames 506, 510. According to one implementation, the support bars 516A, 516B have clips 518 or other known devices or components coupled along their lengths that can be used to hang items therefrom.

In addition, the cart 502 has four outer wheels 540A, 540B, 540C, 540D. In one embodiment, all four of the outer wheels 540A, 540B, 540C, 540D are swivel wheels that each can turn 360 degrees on its swivel. Further, the cart 502 has two central guidance wheels 542A, 542B positioned centrally under the base 504. In this exemplary implementation, the central guidance wheels 542A, 542B do not swivel, but instead are fixed. Further, the guidance wheels 542A, 542B can be moved between a retracted (also referred to as "non-deployed" or "raised") position (as best shown in FIG. 12A) in which the wheels 542A, 542B are not in contact with the floor or ground on which the cart 502 is resting and a deployed (or "lowered") position (as best shown in FIG. 12B) in which the wheels 542A, 542B have been lowered such that the wheels 542A, 542B are in contact with the floor or ground on which the cart 502 is resting. Note that there is a deployment lever 544A that is actuated by the user to move the wheels 542A, 542B between the non-deployed and deployed positions, which will be described in further detail below. In this embodiment, the cart 502 has only one deployment lever 544A. Alternatively, as will be described in additional detail below, there can be two deployment levers.

In use, the cart 502 can be pushed from one location to another manually by a user. In one embodiment, the user first actuates the deployment lever 544A to move the central guidance wheels 542A, 542B into the deployed position, thereby allowing a user to urge the cart 502 from one place to another with ease and stability due to the deployment of the central guidance wheels 542A, 542B. The inability of the central guidance wheels 542A, 542B to swivel means that when the central guidance wheels 542A, 542B are in the deployed position, the cart 502 can be urged forward in a fairly straight line without much effort by the user. In contrast, without the central guidance wheels 542A, 542B deployed, the swivel wheels 540A, 540B, 540C, 540D freely swivel during use and thus can potentially cause the cart 502 to easily veer in an undesirable direction or even cause both ends of the cart 502 to veer in different directions. On the other hand, if the user needs to move the cart 502 sideways, the user can use the deployment lever 544A to move the central guidance wheels 542A, 542B into the non-deployed position, thereby allowing the user to push the cart 502 sideways or any other direction other than a fairly straight line.

When the cart 502 is to be pushed using the power pusher 500, the pusher 500 is coupled to the cart 502 as best shown in FIGS. 11A and 11B. According to one embodiment, when the pusher 500 is coupled to the cart 502, the central guidance wheels 542A, 542B are automatically actuated to move into the non-deployed position. This automatic actuation will be described in further detail below. Alternatively, the lever 544A can be used to actuate the manual retraction of the wheels 542A, 542B. It is understood that the central guidance wheels 542A, 542B are moved into the non-deployed position in this implementation because the wheels 542A, 542B in the deployed position would cause difficulties for operation of the pusher 500 when it is coupled to the cart 502. That is, the deployed non-swiveling central guidance wheels 542A, 542B in combination with the fixed front wheels of the pusher 500 (similar to the fixed front wheels 18A, 18B described above with respect to the pusher 10) would make it difficult to make any turns using the pusher 500 coupled to the cart 502.

Figure 13A:
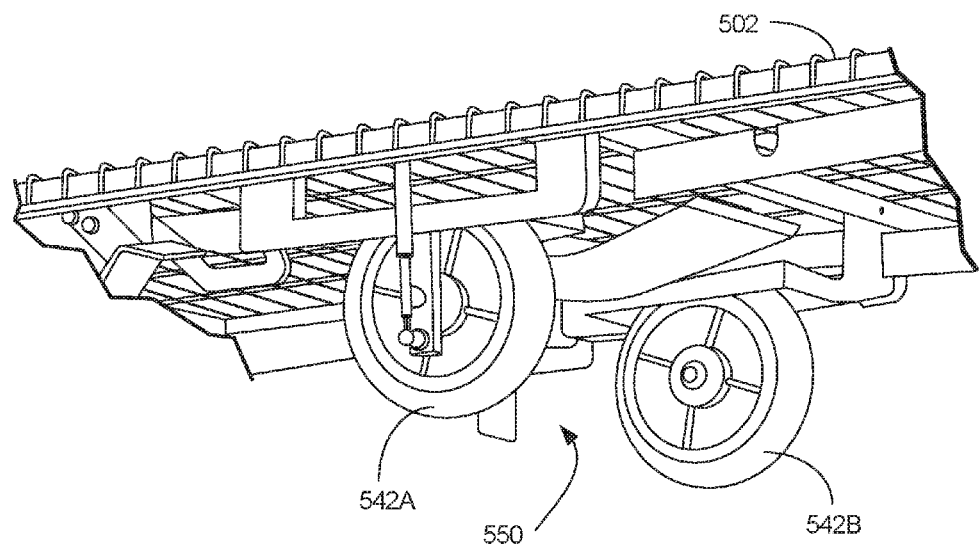
FIG. 13A is a lower perspective view of a wheel assembly coupled to the underside of a cart, according to one embodiment.
Figure 13B:
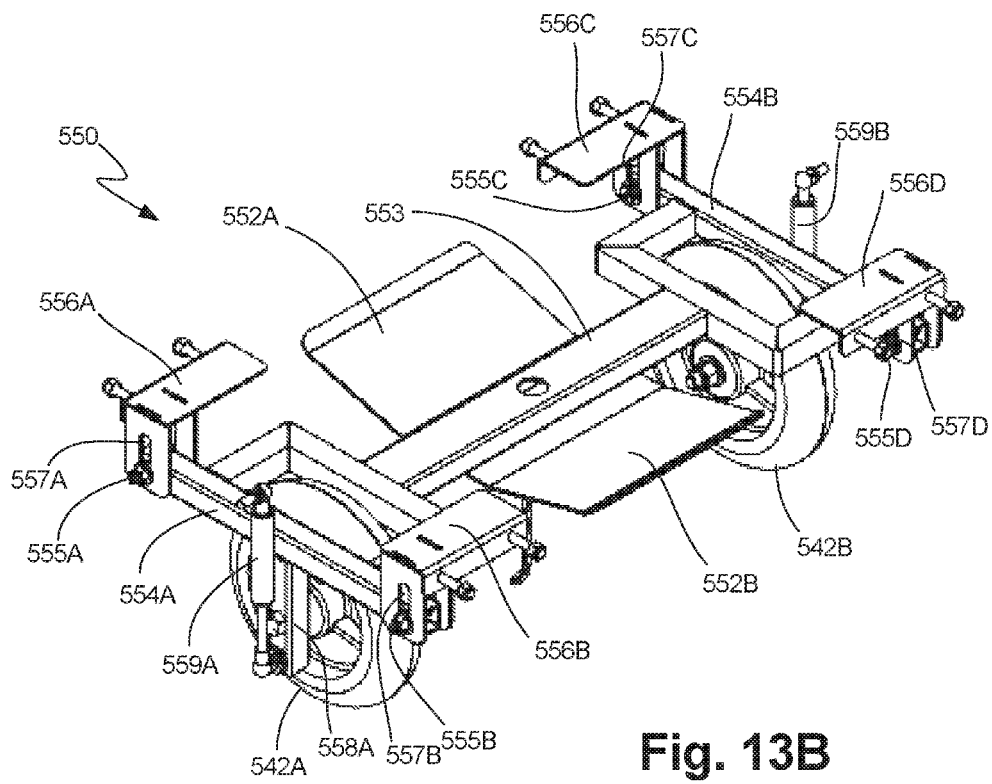
FIG. 13B is an upper perspective view of the wheel assembly of FIG. 13A, according to one embodiment.
Figure 13C:
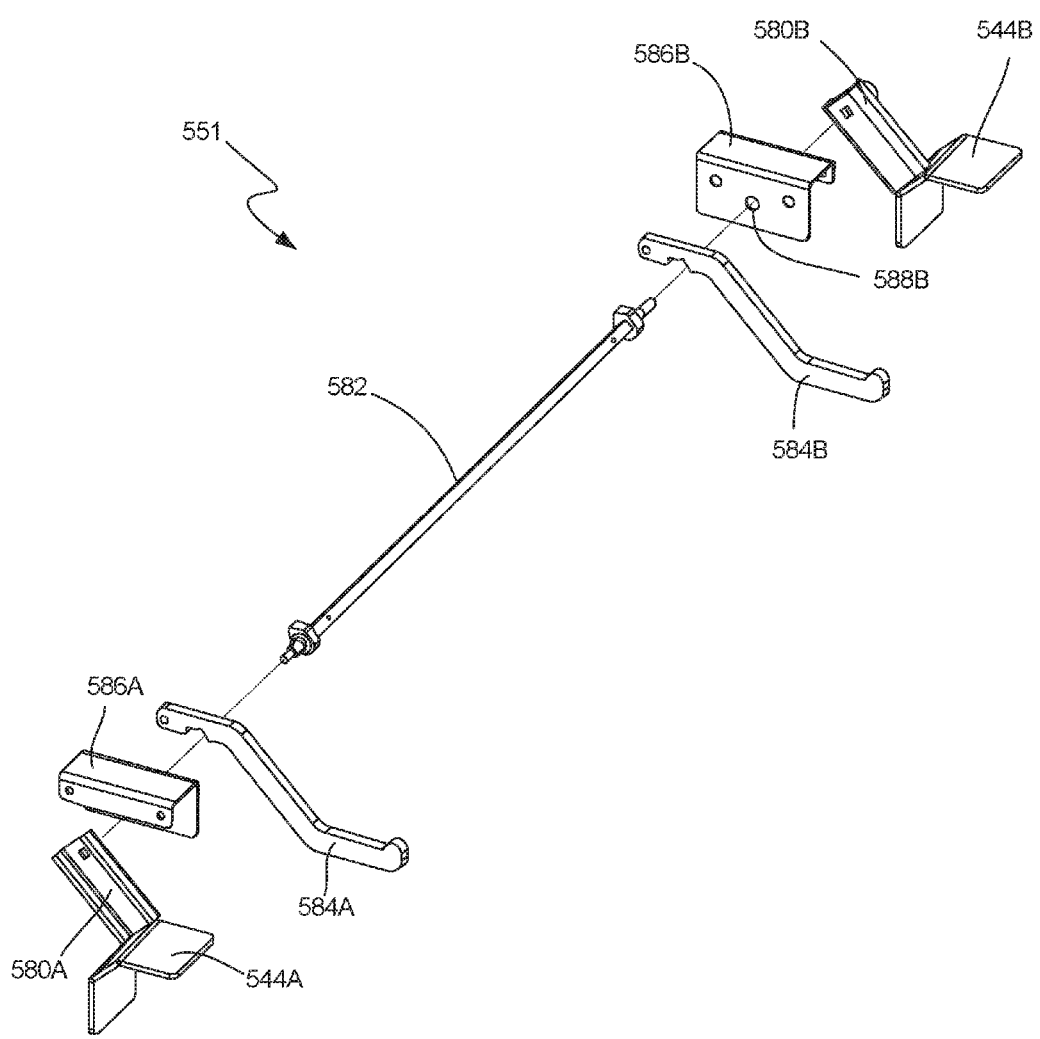
FIG. 13C is an exploded view of a portion of the wheel assembly of FIG. 13A, according to one embodiment.

The deployable central guidance wheels 542A, 542B and the associated guide wheel assembly 550 are depicted in additional detail in FIGS. 13A-13C, according to one embodiment. As discussed above, the central guidance wheels 542A, 542B can be moved between the deployed and retracted positions manually using the deployment lever 544A or automatically when a pusher 500 is coupled to the cart (such as cart 502). FIG. 13A is a depiction of the guide wheel assembly 550 coupled to the underside of a cart (such as cart 502 discussed above) according to one implementation, while FIG. 13B depicts a top perspective view of the assembly 550 without the cart. FIG. 13C depicts the manual deployment assembly 551, according to one embodiment.

As best shown in FIG. 13B, the guide wheel assembly 550 has automatic deployment plates 552A, 552B coupled to the assembly frame 553. The frame 553 has outer bars 554A, 554B, both of which have two slot bolts or pins 555A, 555B, 555C, 555D protruding from the outer bars 554A, 554B near the ends of those bars 554A, 554B. As shown in the figure, the bolts 555A, 555B, 555C, 555D are configured to be slidably positioned in the slots 557A, 557B, 557C, 557D of the cart brackets 556A, 556B, 556C, 556D that are fixedly attached to the cart (such as cart 502). The outer bars 554A, 554B are also coupled to the wheels 542A, 542B via the vertical bars 558A, 558B (only 558A is visible in FIG. 13B because of the perspective of the figure). The assembly 550 also has two tensioned components 559A, 559B that are coupled at the top of the components 559A, 559B to the cart 502 and at the bottom to the vertical bars 558A, 558B. In one embodiment, the tensioned components 559A, 559B are gas springs 559A, 559B. Alternatively, the tensioned components 559A, 559B can be any springs or other tensioned components configured to apply a steady force. The tensioned components 559A, 559B are tensioned to urge the vertical bars 558A, 558B and thus the entire wheel assembly 550 downward.

In use, the guide wheel assembly 550 provides for automatic retraction of the wheels 542A, 542B when a pusher 550 is coupled to the cart 502. That is, as the pusher 550 is advanced toward the cart 502 such that the base (like base 12 on pusher 10) is positioned underneath the cart 502, the pusher 550 makes contact with one of the automatic deployment plates 552A, 552B as the pusher 550 is coupling to the cart 502. Note that the guide wheel assembly 550 is configured such that the automatic retraction of the wheels 542A, 542B will be triggered by the pusher 550 being coupled to either end of the cart 502. That is, the pusher 550 can couple to either end of the cart 502 and still trigger automatic retraction of the wheels 542A, 542B because the assembly 550 has two deployment plates 552A, 552B. If the pusher 550 is coupled to the end of the cart 502 toward which the plate 552A is positioned, then the pusher 550 will make contact with that plate 552A and cause retraction. Alternatively, if the pusher 550 is coupled to the end of the cart 502 toward which the plate 552B is positioned, then the pusher 550 will make contact with that plate 552B and cause retraction.

The automatic retraction of the wheels 542A, 542B works in the following fashion, according to one embodiment. The tensioned components 559A, 559B ensure that the assembly 550 and thus the wheels 542A, 542B are continuously urged downward toward the floor or ground beneath the cart 502. When the pusher 550 is coupled to the cart 502, the pusher 550 contacts the appropriate plate 552A, 552B. Each plate 552A, 552B is disposed at an angle as shown in FIG. 13B such that the contact end of each plate 552A, 552B (the end of each plate 552A, 552B opposite the end coupled to the frame 553) is disposed at a position that is higher (farther away from the floor or ground) in comparison to the end coupled to the frame 553. This sloped or angled configuration of the plates 552A, 552B facilitates contact with the pusher 550 by helping to ensure that the pusher 550 contacts the underside of the plate 552A, 552B at or near the contact end of the plate 552A, 552B. Further, the angled configuration causes either plate 552A, 552B to move upward as the pusher 550 continues to be urged against the plate 552A, 552B.

Thus, if the pusher 550 is coupled to the cart 502 such that the pusher 550 contacts the plate 552A, the plate 552A is urged upward as the pusher 550 continues to be moved distally. This causes the assembly 550 to be urged upward on the side of the assembly 550 having the base plate 552A. The upward force caused by the pusher 550 is sufficient to overcome the downward force applied by the tensioned components 559A, 559B, thereby allowing the assembly 550 to move upward. This causes the outer bars 554A, 554B to move upward. In one embodiment, the ends of the bars 554A, 554B on the same side of the frame 553 as the plate 552A will move upward further than the opposite ends of those bars 554A, 554B. As the outer bars 554A, 554B move upward, the bolts 555A, 555B, 555C, 555D slide upward in the slots 557A, 557B, 557C, 557D. Further, as the outer bars 554A, 554B move upward, the vertical bars 558A, 558B move upward, thereby raising the wheels 542A, 542B as well. Thus, the end result is that the wheels 542A, 542B are urged into the retracted position such that the wheels 542A, 542B are not in contact with the ground or floor beneath the cart 502.

As best shown in FIG. 13C, the manual deployment assembly 551 has two deployment levers (also referred to as "pedals") 544A, 544B—one at each end of the assembly 551. The assembly 551 can be positioned under any cart disclosed herein (such as cart 502) in combination with the wheel assembly 550 discussed above such that the pedals 544A, 544B are positioned on opposite sides of the cart 502 along the side of the cart 502 like the pedal 544A depicted in FIG. 12A. The pedal 544A is coupled to a lever arm 580A that is fixedly coupled to an assembly rod 582 such that actuation of the pedal 544A causes rotation of the rod 582. Similarly, the pedal 544B is coupled to a lever arm 580B that is also fixedly coupled to the assembly rod 582. Both lever arms 580A, 580B are coupled to the rod 582 through an opening 588A, 588B (only 588B is depicted in FIG. 13C because of the perspective) in a hinge 586A, 586B that is fixedly coupled to the cart 502, with the arms 580A, 580B and the rod 582 being rotatable in relation to the hinges 586A, 586B. The assembly rod 582 is fixedly coupled to two arms 584A, 584B such that rotation of the rod 582 causes the arms 584A, 584B to move between a raised position and a lowered position. The two arms 584A, 584B are coupled to the wheel assembly 550 such that moving the arms 584A, 584B into the raised position will raise the wheel assembly 550 such that the wheels 542A, 542B move into the retracted position, while moving the arms 584A, 584B into the lowered position will lower the wheel assembly 550 such that the wheels 542A, 542B move into the deployed position. Alternatively, the assembly 551 can have any combination of components that will provide for raising and lower the wheel assembly 550.

In use, the manual deployment assembly 551 provides for manual retraction and deployment of the wheels 542A, 542B by providing for the deployment levers 544A, 544B that can be actuated by a user. That is, if a user wants to manually push the cart 502 from one location to another with the guide wheels 542A, 542B in the deployed position and the wheel assembly 550 is currently in the retracted position, the user can depress one of the levers 544A, 544B to cause the arms 584A, 584B to move into the lowered position, thereby causing the wheel assembly 550 to move into the deployed position. Alternatively, if the user wants to manually push the cart 502 sideways or in another direction other than a substantially straight line parallel to the length of the cart 502 and the wheel assembly 550 is currently in the deployed position, the user can depress one of the levers 544A, 544B to cause the arms 584A, 584B to move into the raised position, thereby causing the wheel assembly 550 to move into the retracted position.

It is understood that the wheels 542A, 542B, wheel assembly 550, and manual deployment assembly 551 can be incorporated into any of the cart embodiments disclosed or contemplated herein.

Figure 14A:
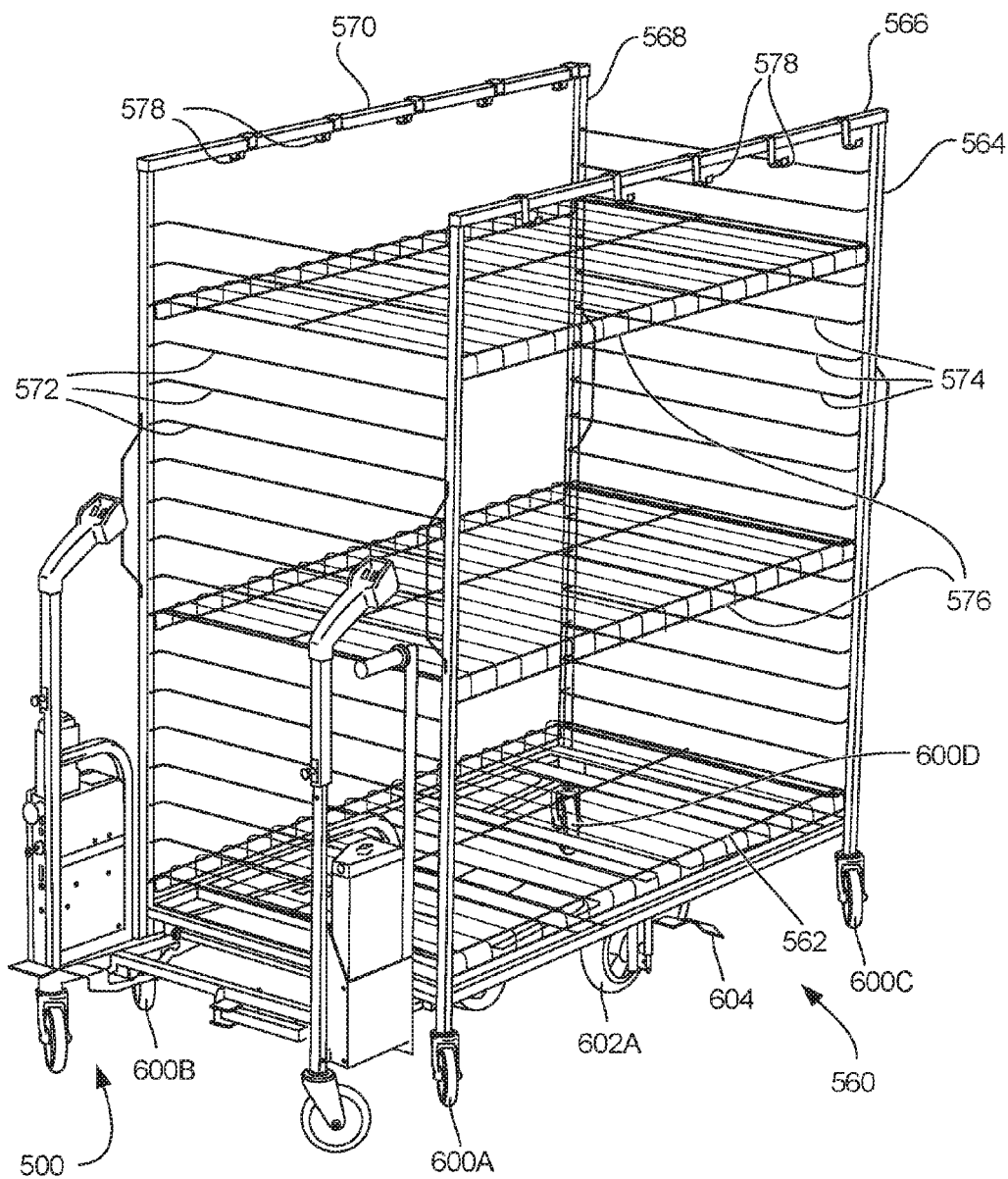
FIG. 14A is a rear perspective view of a pusher coupled to a shelf cart, according to another embodiment.
Figure 14B:
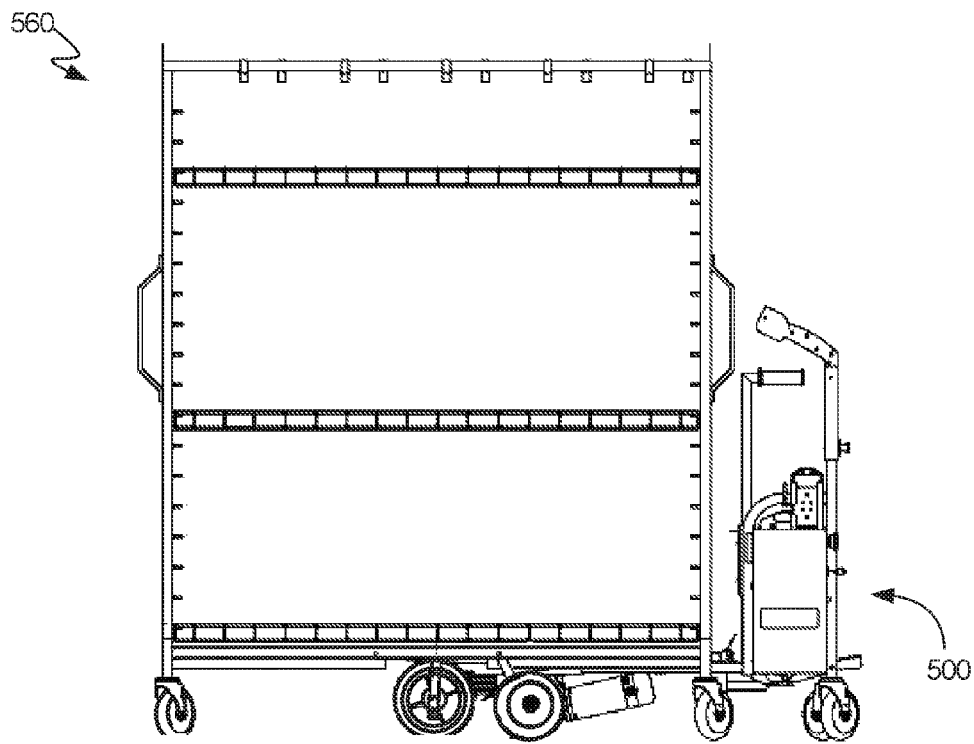
FIG. 14B is a side view of the pusher coupled to the shelf cart of FIG. 14A, according to one embodiment.
Figure 14C:
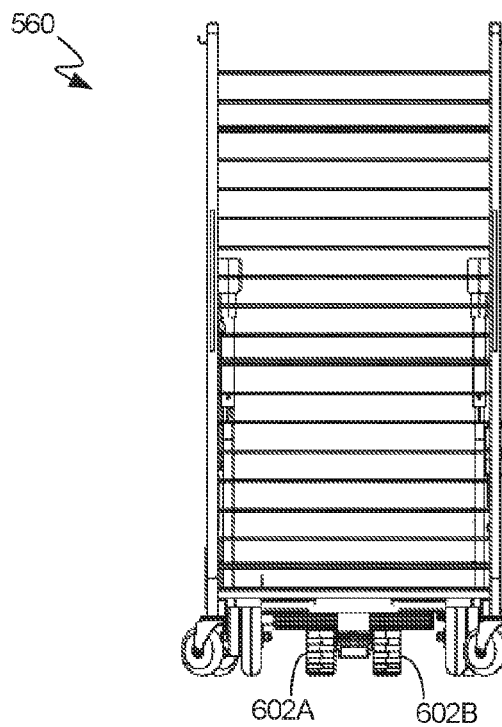
FIG. 14C is a front view of the pusher coupled to the shelf cart of FIG. 14A, according to one embodiment.

Another embodiment of a shelf cart 560 is depicted in FIGS. 14A, 14B, and 14C. In this embodiment, the pusher 500 is coupled to the shelf cart 560. Like the previous shelf cart embodiment, this cart 560 has a base 562. Unlike the previous implementation, the cart 560 has a first side frame 564 with a first support bar 566 and a second side frame 568 with a second support bar 570. In addition, the cart 560 has first and second sets of horizontal bars 572, 574, wherein each of the bars of each set 572, 574 is coupled at one end to the first side frame 564 and at the other end to the second side frame 568. In this embodiment, the cart 560 has two removable shelves 576 removably coupled at each end to the appropriate horizontal bars 572, 574. It is understood that each of the shelves 576 can be moved from its current position and placed at any vertical position by coupling each end of the shelf 576 to the appropriate horizontal bars 572, 574. It is further understood that any number of shelves 576 can be removably coupled to the cart 560, ranging from no shelves or one shelf 576 to as many shelves as there are corresponding horizontal bars 572, 574. According to one implementation, the support bars 566, 570 have clips 578 or other known devices or components coupled along their lengths that can be used to hang items therefrom.

In addition, the cart 560 has four outer wheels 600A, 600B, 600C, 600D. In one embodiment, all four of the outer wheels 600A, 600B, 600C, 600D are swivel wheels that each can turn 360 degrees on its swivel. Further, the cart 560 has two central guidance wheels 602A, 602B positioned centrally under the base 562. In this exemplary implementation, the central guidance wheels 602A, 602B do not swivel. Further, the guidance wheels 602A, 602B can be moved between a non-deployed position and a deployed position in a fashion similar to that described above with respect to the cart 502. Note that there is a deployment lever 604 that is actuated by the user to move the wheels 602A, 602B between the non-deployed and deployed positions.

Figure 15:
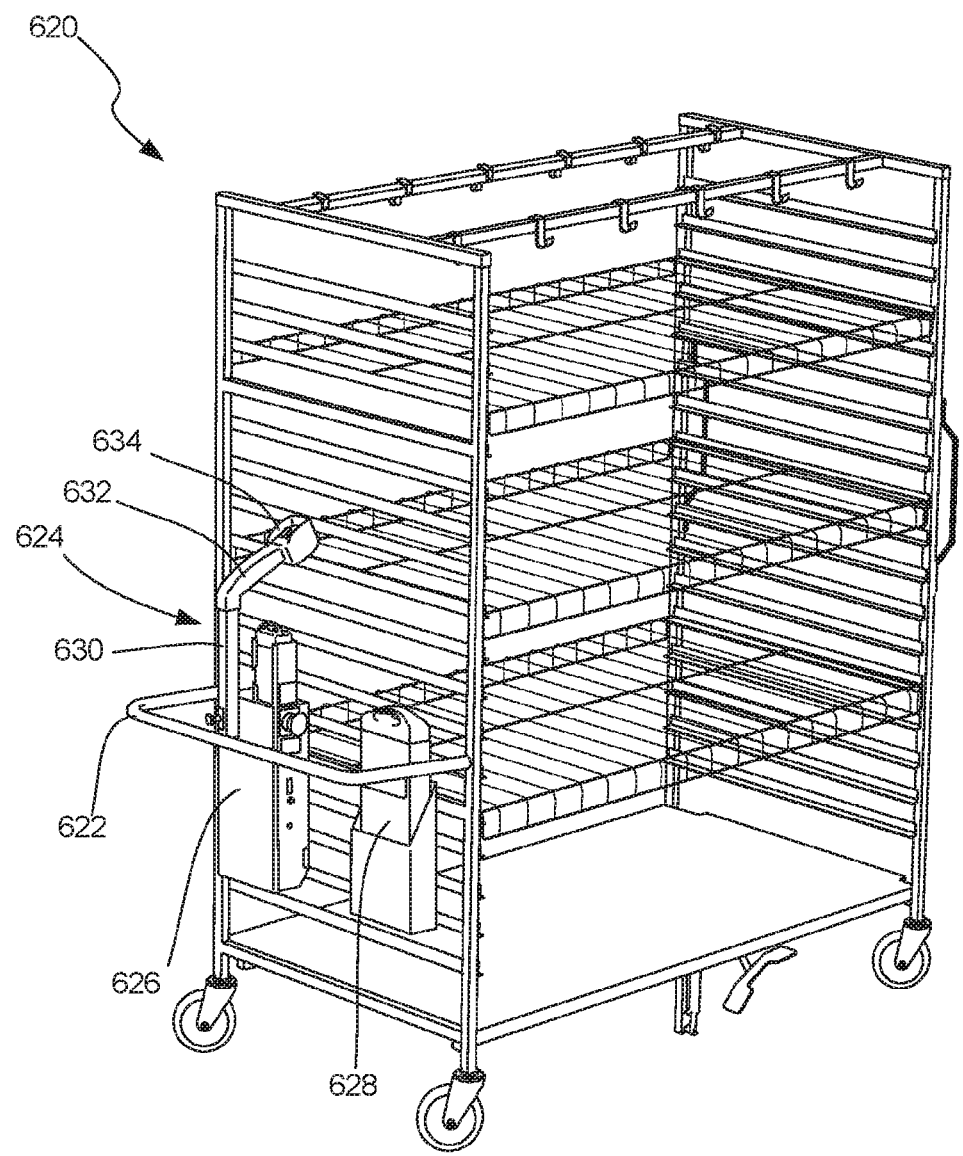
FIG. 15 is a rear perspective view of a self-propelled shelf cart, according to one embodiment.
Figure 16A:
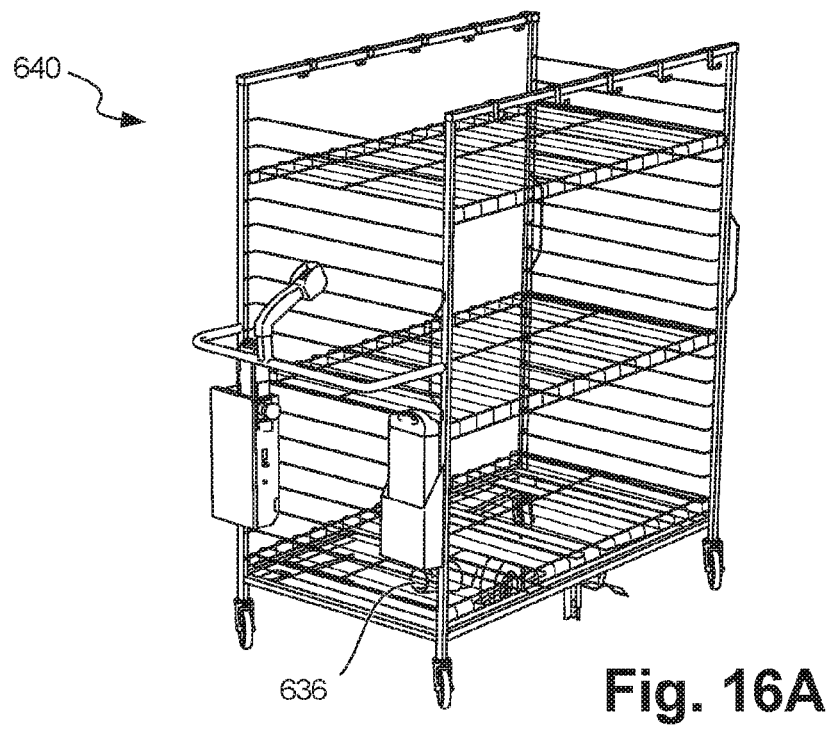
FIG. 16A is a rear perspective view of a self-propelled shelf cart, according to another embodiment.
Figure 16B:
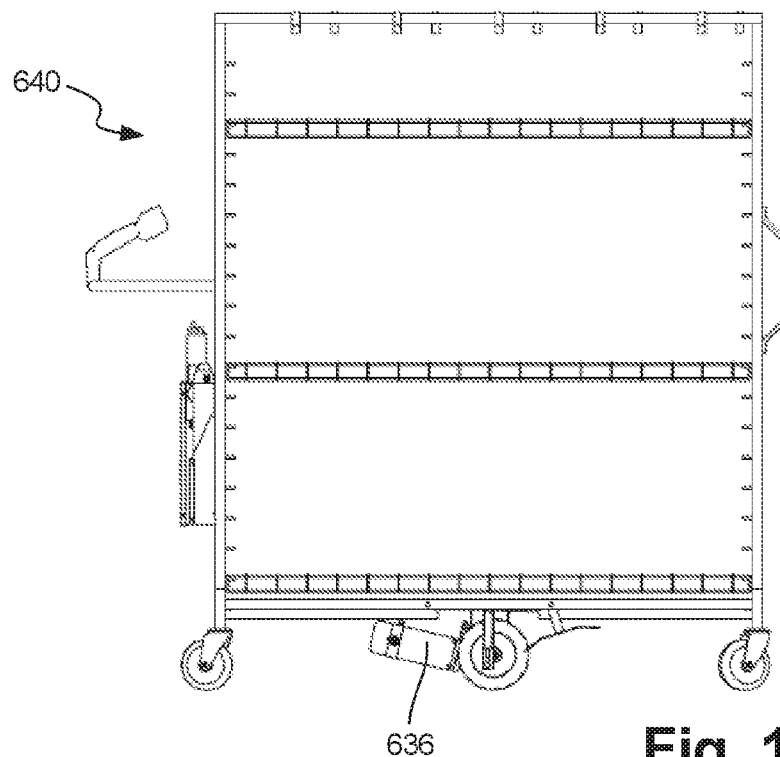
FIG. 16B is a side view of the self-propelled shelf cart of FIG. 16A, according to one embodiment.

One embodiment of a self-powered shelf cart 620 is depicted in FIG. 15, and another implementation of a self-powered shelf cart 640 is depicted in FIGS. 16A and 16B. In these embodiments, no pusher is required, because the cart embodiments 620, 640 are self-propelled. In addition to various components similar to those described above with respect to carts 502 and 560, the shelf cart 620, 640 implementations have a push bar 622, a control handle 624 coupled to the push bar 622, a controller 626, and a battery 628. It is understood that the controller 626 can be similar to the controller 22 described above and have similar components as well. The control handle 624 has a handle support 630, a grip 632, and a throttle 634. The cart 620 has a motor (not shown) that is similar to the motor 636 on the cart 640, as best shown in FIGS. 16A and 16B.

Figure 17:
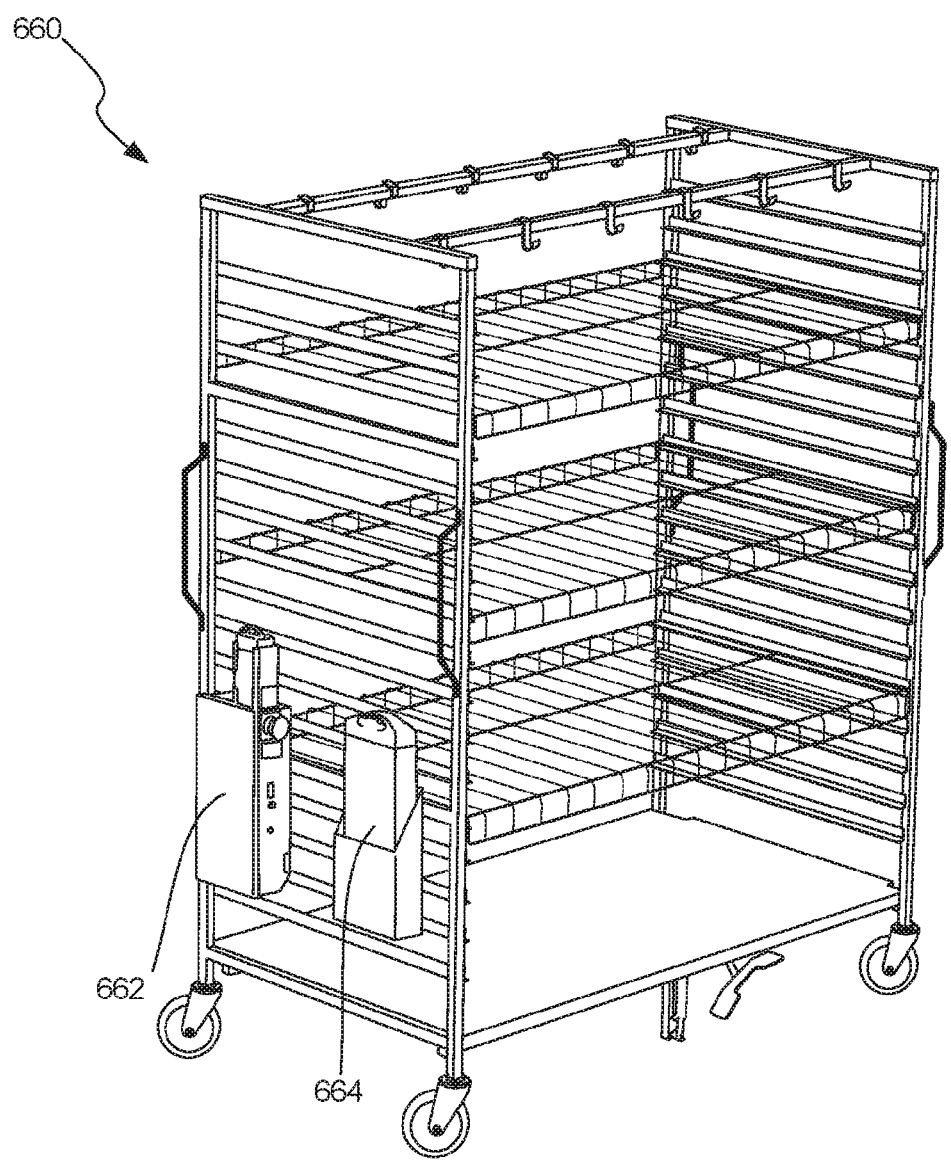
FIG. 17 is a rear perspective view of a self-propelled shelf cart, according to a further embodiment.
Figure 18A:
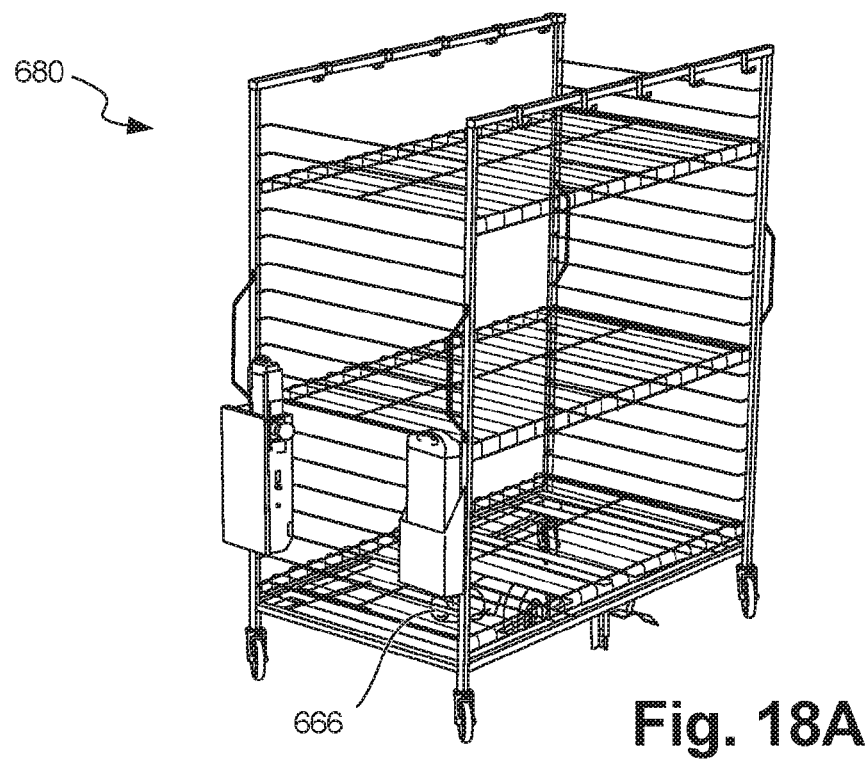
FIG. 18A is a rear perspective view of a self-propelled shelf cart, according to yet another embodiment.
Figure 18B:
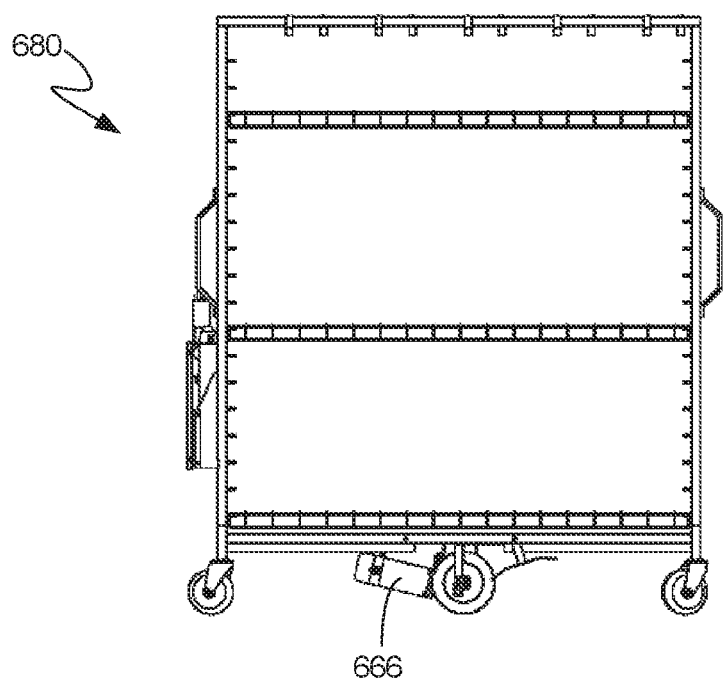
FIG. 18B is a side view of the self-propelled shelf cart of FIG. 18A, according to one embodiment.

Alternatively, certain carts can be self-propelled and wirelessly controlled. For example, one embodiment of a self-powered, wirelessly-controlled shelf cart 660 is depicted in FIG. 17, and another implementation of a self-powered, wirelessly-controlled shelf cart 680 is depicted in FIGS. 18A and 18B. In these embodiments, no pusher is required, because the cart embodiments 660, 680 are self-propelled, and no control handle is required, because the cart embodiments 660, 680 are controlled with a wireless controller (not shown) that is not physically coupled to the cart 660, 680. In addition to various components similar to those described above with respect to carts 502, 560, the shelf cart 660, 680 implementations have a controller 662 and a battery 664. It is understood that the controller 662 can be similar to the controllers 22, 626 described above and have similar components as well. In addition, the controller 662 has a wireless transceiver (not shown) that is configured to communicate with the wireless controller (not shown). The cart 660 has a motor (not shown) that is similar to the motor 666 on the cart 680, as best shown in FIGS. 18A and 18B.

Figure 19A:
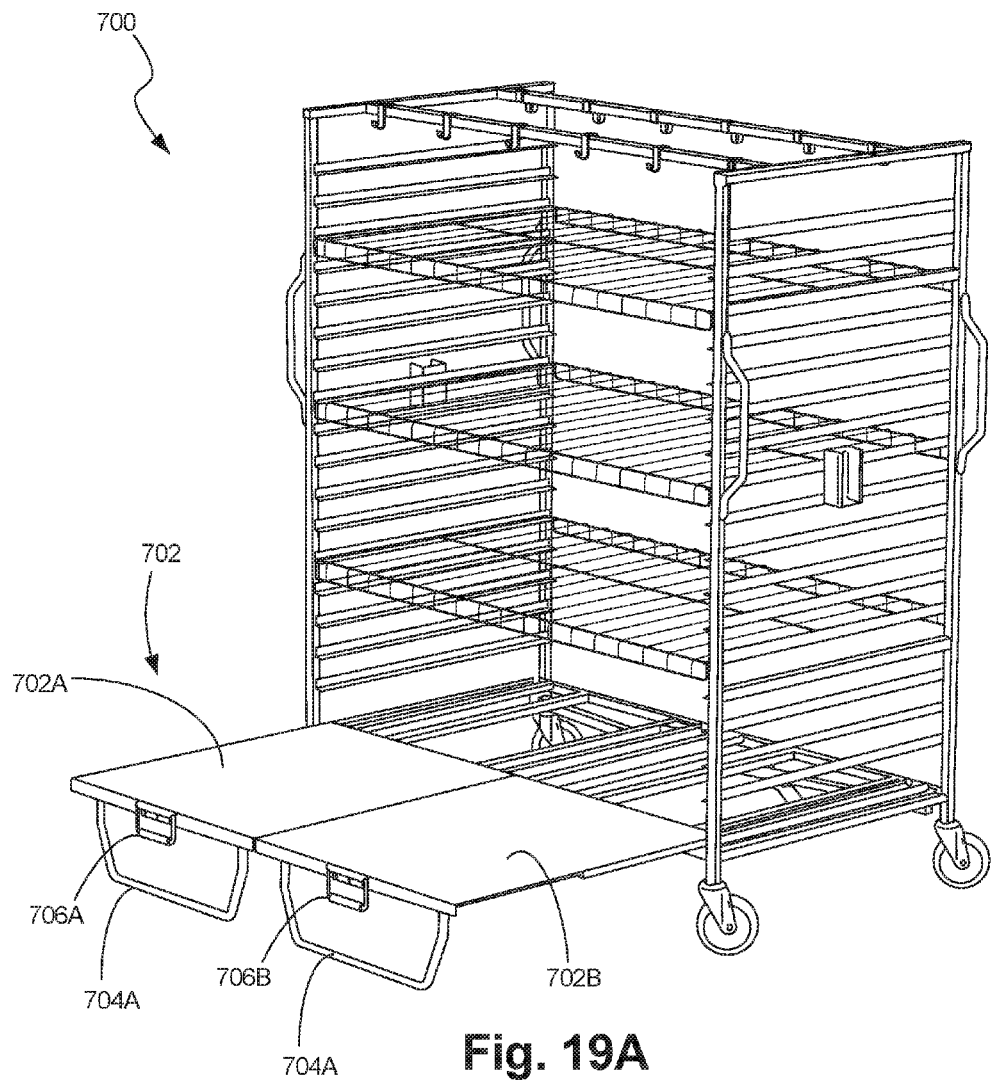
FIG. 19A is a perspective view of a shelf cart with two platform sections deployed, according to one embodiment.
Figure 19B:
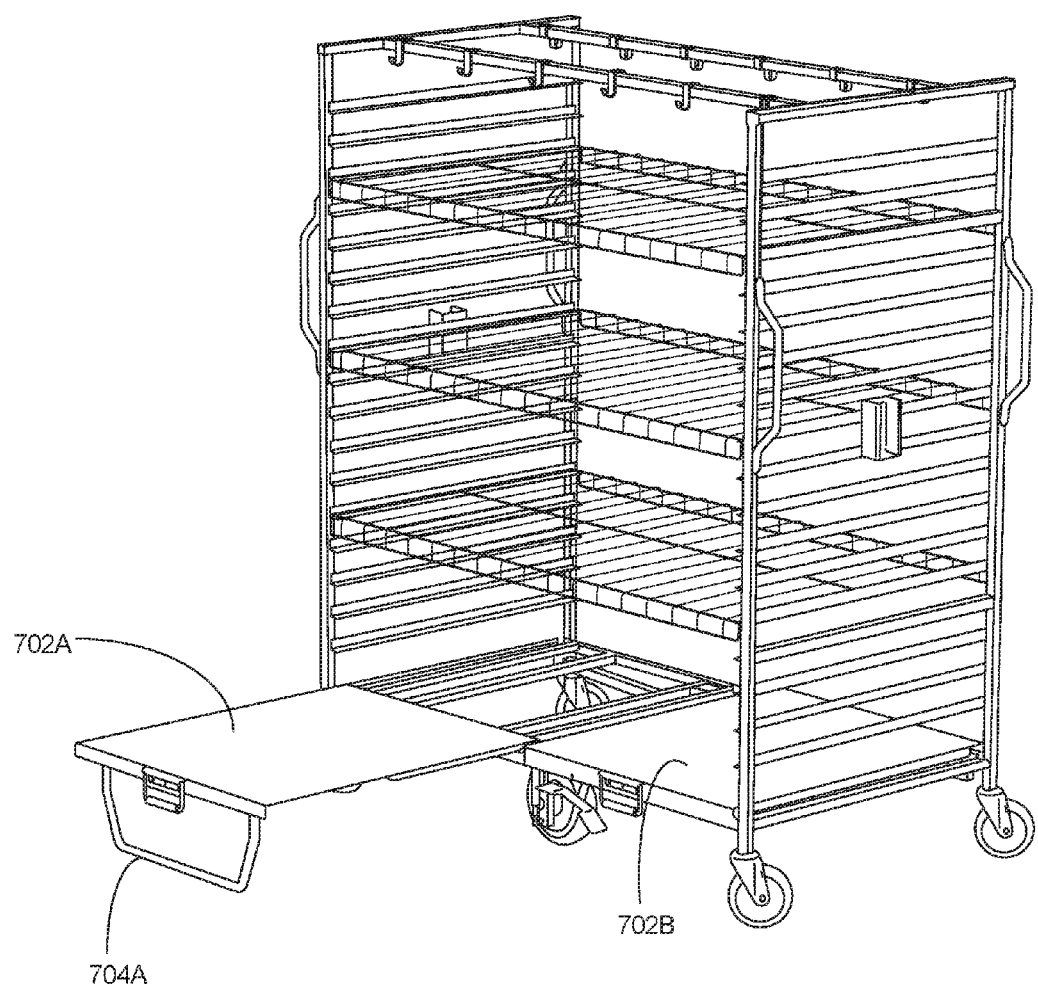
FIG. 19B is a perspective view of the shelf cart of FIG. 19A with one platform section deployed and the other retracted, according to one embodiment.

In accordance with one embodiment, any of the shelf cart implementations disclosed or contemplated herein (including shelf carts 502, 560, 620, 640, 660, and 680) can also include an extendable/retractable shelf platform 702, as shown in the shelf cart embodiment 700 depicted in FIGS. 19A and 19B. The platform 702 is integrated into the cart 700 and configured to be extendable out of the cart 700 and retractable back into the shelf cart 700. In the embodiment as shown, the platform 702 is actually made up of two platform sections 702A, 702B, both of which are independently extendable and retractable as shown in the figures. Alternatively, the platform can incorporated into the shelf or extendably positioned directly underneath the shelf. In a further alternative, the platform can be positioned in or incorporated into the cart 700 in any fashion that allows for the platform to extend outward from the cart 700 in a fashion similar to that shown.

In this embodiment, each platform section 702A, 702B has an extendable leg 704A, 704B that extends down from the section 702A, 702B when the section 702A, 702B is deployed, thereby supporting the section 702A, 702B when it is carrying the weight of any item added and preventing the cart 700 from tipping over under the weight of the item. Each leg 704A, 704B is then moved back into a retracted position beneath or against the underside of the sections 702A, 702B prior to retracting the sections 702A, 702B back into their retracted positions on the cart 700.

Further, each section 702A, 702B also has a handle 706A, 706B coupled to the outer edge of the section 702A, 702B that can be used by the user to more easily extend and retract the section 702A, 702B. More specifically, the user can grasp the appropriate handle 706A, 706B to either extend or retract the appropriate section 702A, 702B.

In use, the platform 702 can be used to position items, including, for example, heavy items or larger boxed items, onto a relatively inaccessible shelf, thereby reducing the amount of physical exertion and risk of injury for the user. That is, rather than a user trying to position an item onto such an inaccessible shelf, the user can actuate the extendable/retractable shelf platform 702 (or in this case, either or both of the sections 702A, 702B) to move into its extended position as shown in FIGS. 19A and 19B. Once the platform 702 (or one section 702A, 702B) is extended, the user can easily place the item on the platform 702 or either section 702A, 702B. Once the item is placed as desired, the platform section 702A, 702B (or both) can be moved back into its retracted position, thereby moving the item into position in the cart 700.

Alternatively, the platform can extend from the shelf and both the platform and shelf can have rollers (not shown) positioned strategically thereon such that once the user places the item on the platform, the user can easily urge the item into position on the shelf over the rollers (not shown).

Figure 20:
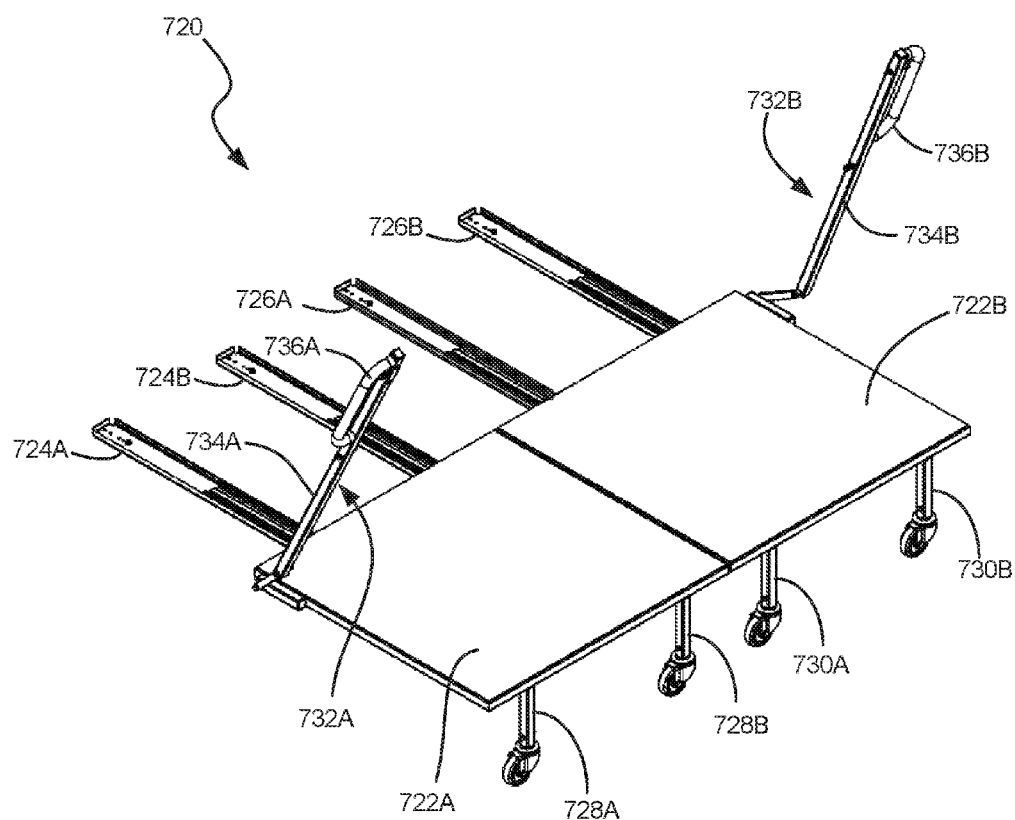
FIG. 20 is a perspective view of two platform sections for a shelf cart, according to another embodiment.

An alternative embodiment of an extendable/retractable shelf platform 720 is depicted in FIG. 20. This embodiment can also be used with any of the shelf cart implementations disclosed or contemplated herein. This platform 720 has two platform sections 722A, 722B, both of which are independently extendable and retractable along the appropriate platform rails 724A, 724B, 726A, 726B as shown in the figure. It is understood that the platform rails 724A, 724B, 726A, 726B are fixedly coupled to the shelf cart (such as the shelf cart 700 depicted in FIGS. 19A and 19B) such that the platform sections 722A, 722B can extend out of the cart (such as cart 700) and be retracted back into the cart on the rails 724A, 724B, 726A, 726B.

In this implementation, each platform section 722A, 722B has two extendable legs with wheels 728A, 728B, 730A, 730B. The wheeled legs 728A, 728B, 730A, 730B extend down from the section 722A, 722B when the section 722A, 722B is deployed, thereby supporting the section 722A, 722B when it is carrying the weight of any item added and preventing the cart (such as cart 700) from tipping over under the weight of the item. In one embodiment, the legs 728A, 728B, 730A, 730B are not retractable. Alternatively, each leg 728A, 728B, 730A, 730B is configured to moved between a retracted position and a deployed position. That is, each leg 728A, 728B, 730A, 730B is in retracted position against the appropriate section 722A, 722B when the section 722A, 722B is retracted. When the section 722A, 722B is deployed, the appropriate legs 728A, 728B, 730A, 730B extend to the deployed position such that the wheels of each of the legs 728A, 728B, 730A, 730B are contacting the ground or floor beneath the cart (such as cart 700). When the section 722A, 722B is retracted, the legs 728A, 728B, 730A, 730B are moved back to their retracted positions beneath or against the underside of the sections 722A, 722B.

The wheels on the legs 728A, 728B, 730A, 730B allow for moving the cart (such as cart 700) while one or both of the sections 722A, 722B are deployed. In addition, the wheels can make it easier to deploy or retract the sections 722A, 722B for use.

Further, each section 722A, 722B also has a handle 732A, 732B coupled to an edge of the section 722A, 722B that can be used by the user to more easily extend and retract the section 722A, 722B. More specifically, the user can grasp the appropriate handle 732A, 732B to either extend or retract the appropriate section 722A, 722B. In this embodiment, each handle 732A, 732B has a support 734A, 734B and a hand grip 736A, 736B positioned at an end of the handle. This configuration allows for the grips 736A, 736B to be more easily accessible by a user, reducing the need for the user to bend over to grasp the handles 732A, 732B.

Another shelf cart 750 embodiment is depicted in FIGS. 21A-21F. As will be explained in further detail below, this shelf cart 750 has a guidance channel 752 that is defined or disposed on the underside of the base 754 of the cart 750, thereby helping to guide or steer a pusher (such as pusher 766 discussed below) under and into connection or coupling with the cart 750 when the pusher and cart 750 are coupled. It is understood that the various embodiments of the guidance channel 752 as described herein can be incorporated into any cart implementation disclosed or contemplated herein that couples with any of the pusher embodiments as disclosed or contemplated herein.

Figure 21A:
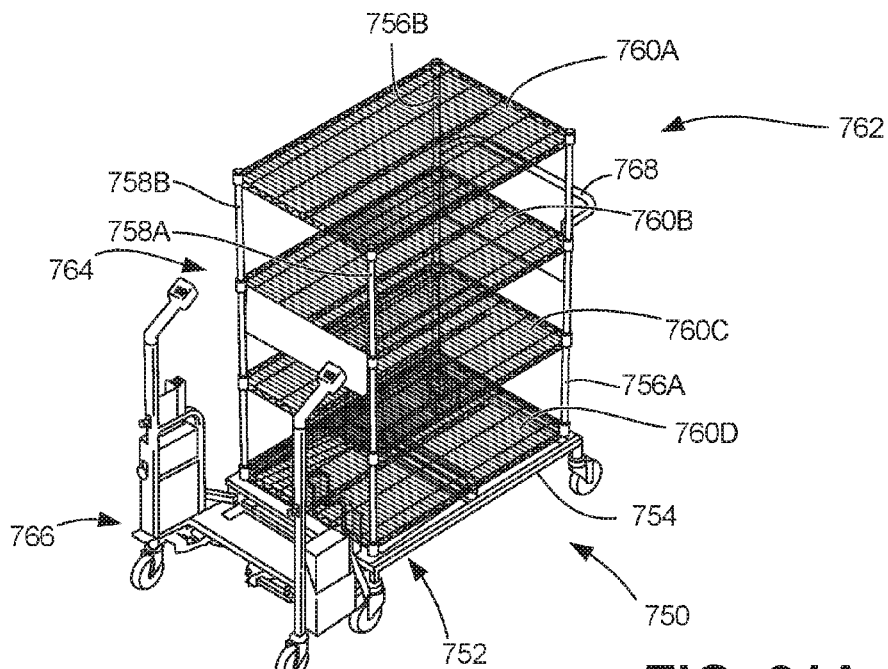
FIG. 21A is a rear perspective view of a pusher coupled to a shelf cart, according to another embodiment.

As shown in FIG. 21A, the pusher 766 mentioned above can be coupled to the shelf cart 750. And as shown not only in FIG. 21A, but in FIGS. 21A-21F, the cart 750 has a base 754, four elongate members (also referred to herein as "rods," "tubes," or "bars") 756A, 756B, 758A, 758B extending upward from the base 754, and four shelves 760A, 760B, 760C, 760D coupled to the elongate members 756A-758B. Alternatively, it is understood that the cart 750 can have two end frames with horizontal bars as discussed above with respect to the cart 500 and depicted in FIGS. 11A-11B. In the instant embodiment, the cart 750 has four removable shelves 760A-760D removably coupled at each corner to the appropriate elongate members 756A-758B. More specifically, the shelves 760A-760D are coupled at the front end 762 of the cart 750 to the elongate members 756A, 756B and at the back end 764 to the elongate members 758A, 758B. It is understood that each of the shelves 760A-760D can be moved from its current position as shown and placed at any vertical position by coupling that shelf at a different appropriate height on the elongate members 756A-758B. It is further understood that any number of shelves can be removably coupled to the cart 750, ranging from no shelves or one shelf to as many shelves as can reasonably fit along the height of the elongate members 756A-758B. Alternatively, the shelves can be non-removable.

Continuing with FIGS. 21A-21F, this particular implementation has a handle 768 affixed to the front end 762 of the cart 750. The handle 768 can be used to manually grasp and move the cart 750 as needed. In addition, the base 754 of the cart 750 has four wheels 770A, 770B, 772A, 772B coupled to the base 754 as shown. According to one embodiment, all four wheels 770A-772B are swivel wheels 770A-772B. Alternatively, in certain implementations, the two rear wheels 772A-772B are fixed wheels. The wheels 770A-772B can each have a separate braking mechanism. Alternatively, only certain of the wheels 770A-772B can have a braking mechanism. In a further alternative, none of the wheels 770A-772B have a braking mechanism.

Further, the cart 750 can have, in accordance with some embodiments, two plates 774, 776 coupled to the ends of the cart 750, with one plate 774 coupled to the front end 762 of the cart 750 and the other plate 776 coupled to the back end 764 of the cart 750. According to one embodiment, the front plate 774 has a remote unit receptacle 778 that is configured to receive and retain a remote unit (not shown) when it is not in user. It is understood that the plates 774, 776 can be any structure coupled at one or both ends of the cart 750—including, for example, the flat structure of the plates 774, 776 depicted herein—that can be used to provide additional stability to the cart 750 and/or to provide support for additional components such as, for example, the receptacle 778 discussed above. In addition, it is understood that the cart 750 can have any of the other components or features as described above with respect to any of the other cart embodiments disclosed or contemplated herein.

Figure 21B:
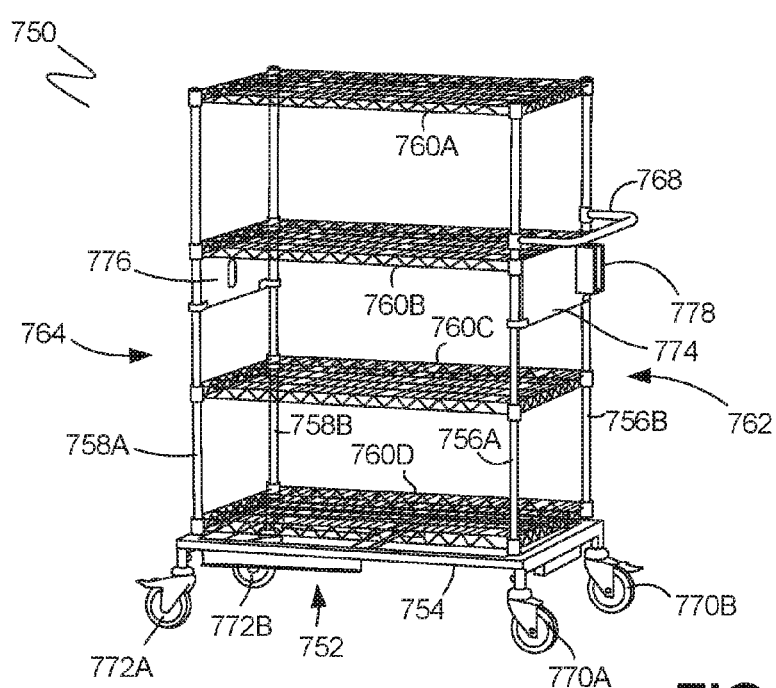
FIG. 21B is a side perspective view of the shelf cart of FIG. 21A, according to one embodiment.
Figure 21C:
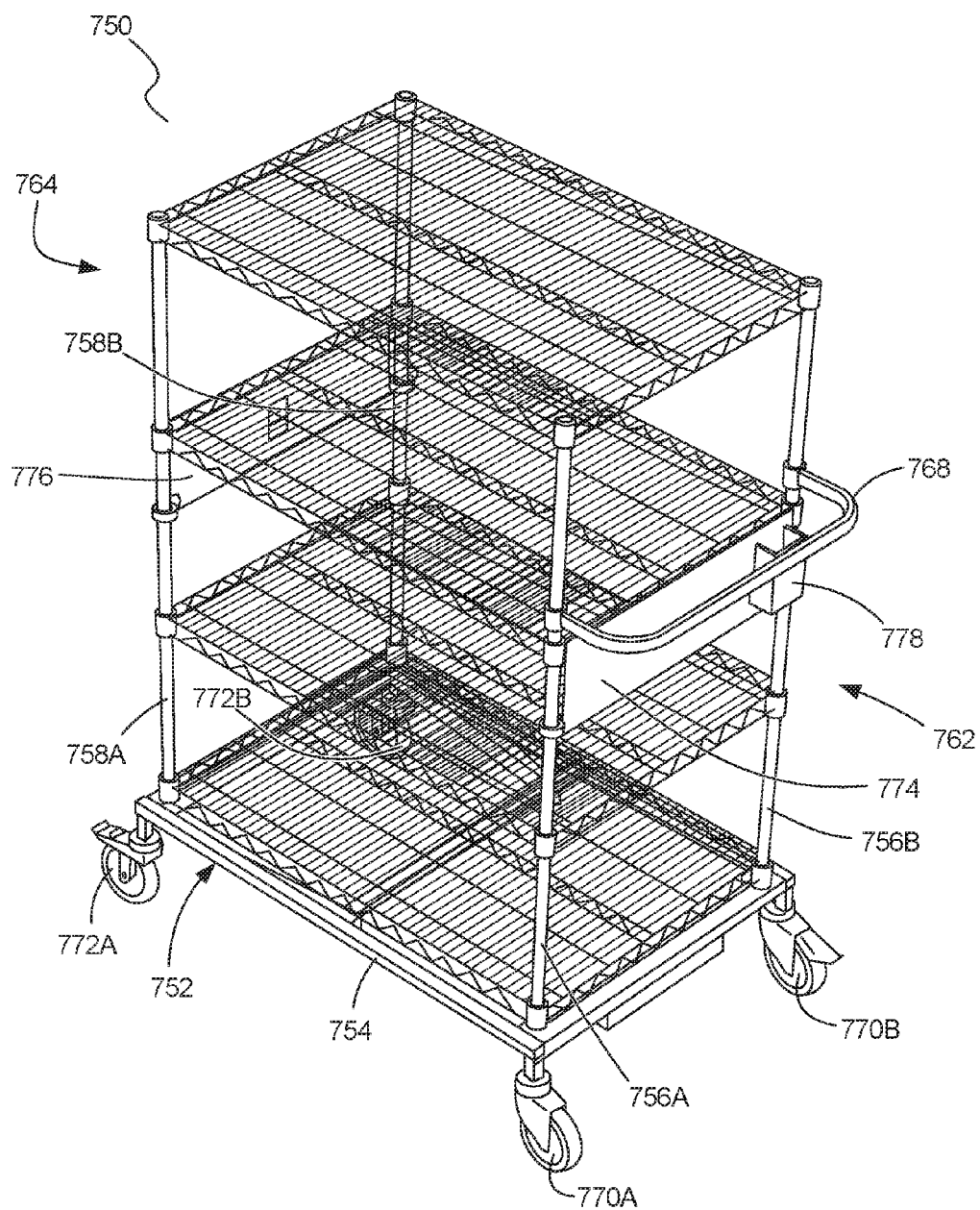
FIG. 21C is a perspective view of the shelf cart of FIG. 21A, according to one embodiment.
Figure 21D:
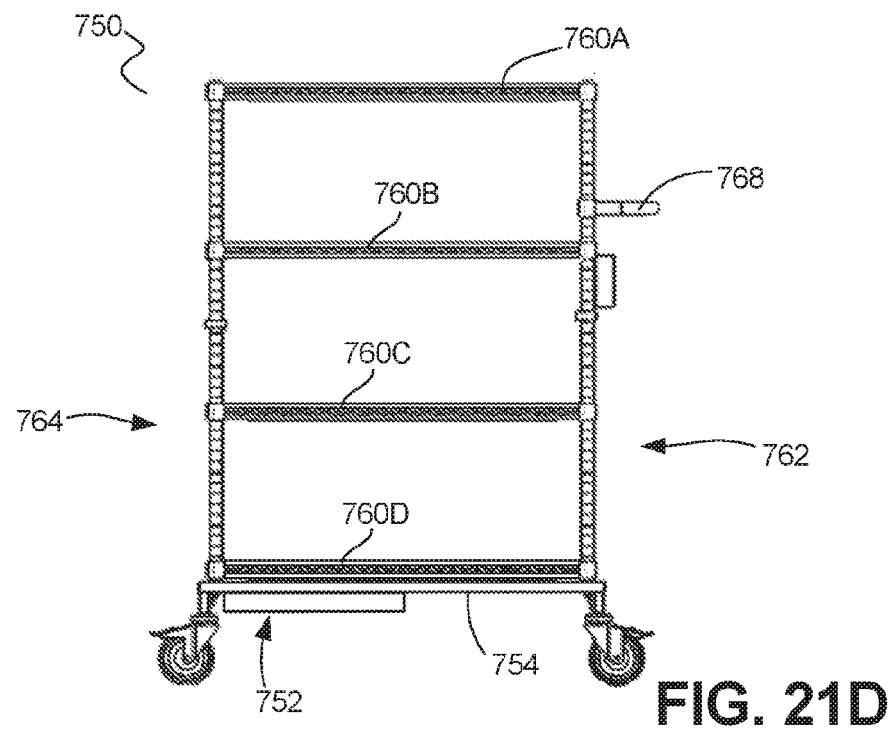
FIG. 21D is a side view of the shelf cart of FIG. 21A, according to one embodiment.
Figure 21E:
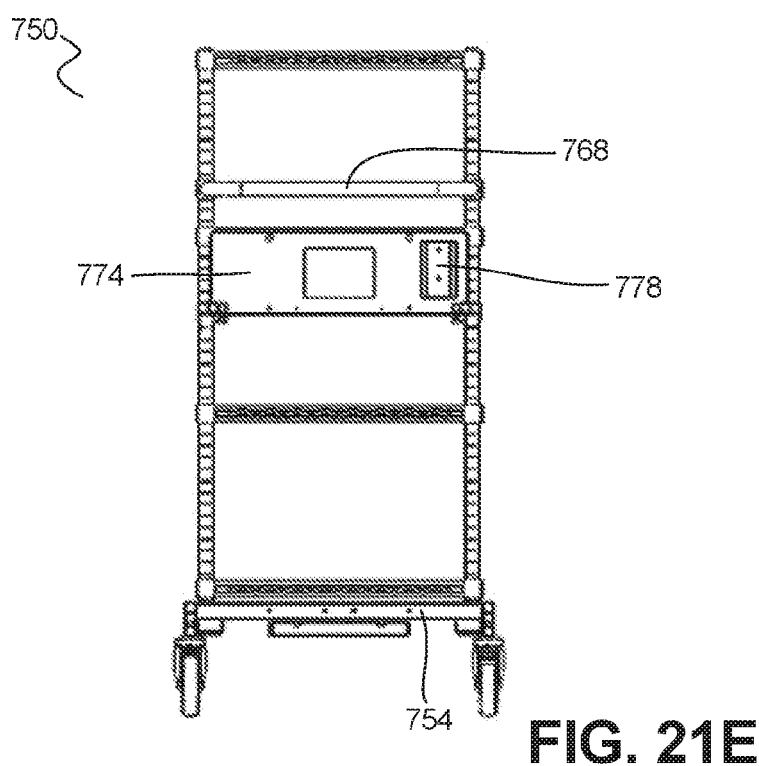
FIG. 21E is a front view of the shelf cart of FIG. 21A, according to one embodiment.
Figure 21F:
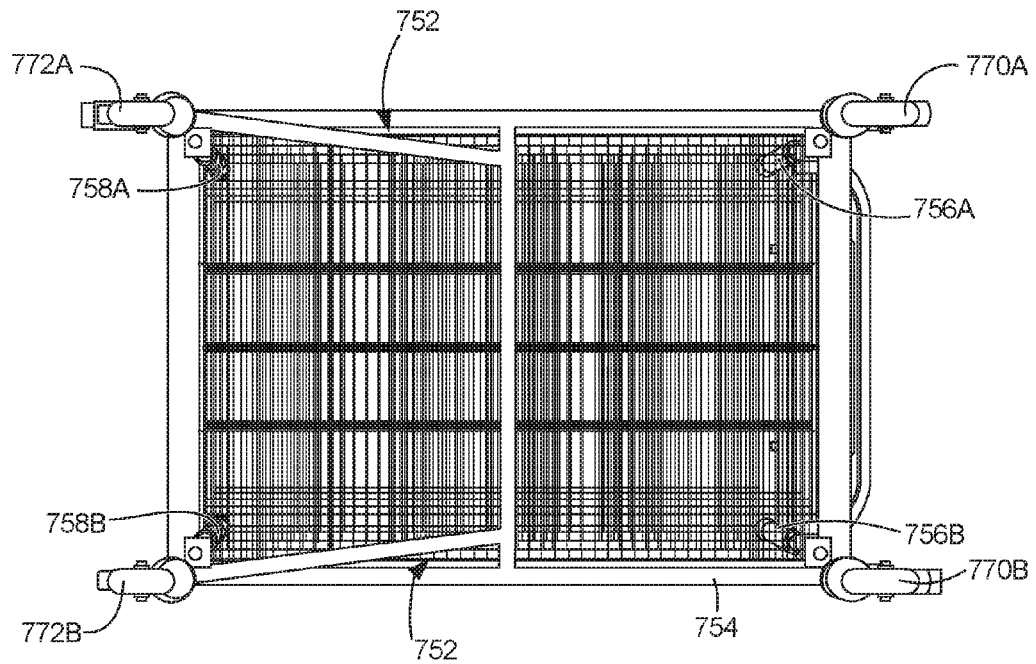
FIG. 21F is an underside view of the shelf cart of FIG. 21A, according to one embodiment.

As mentioned above, the guidance channel 752 is disposed on the underside of the base 754 of the cart 750. As best shown in FIGS. 21A, 21B, and 21D, the channel 752 is positioned at the back end 764 of the cart 750 and on the underside of the base 754 such that it guides the front end of the pusher (such as pusher 766, for example) under the base 754 of the cart 750 as the pusher 766 is urged forward to couple to the cart 750 to ensure a proper coupling of the pusher 766 with the cart 750. More specifically, the guidance channel 752 ensures that the front end of the pusher 766 is directed or guided under the cart 750 such that it is positioned correctly underneath the cart 750. As will be described in further detail below, the correct predetermined positioning of the pusher 766 under the cart 750 ensures that the fixed front wheels of the pusher 766 are positioned underneath the cart such that the pusher 766 and cart 754 can be easily maneuvered, as will be discussed in further detail below.

Figure 22:
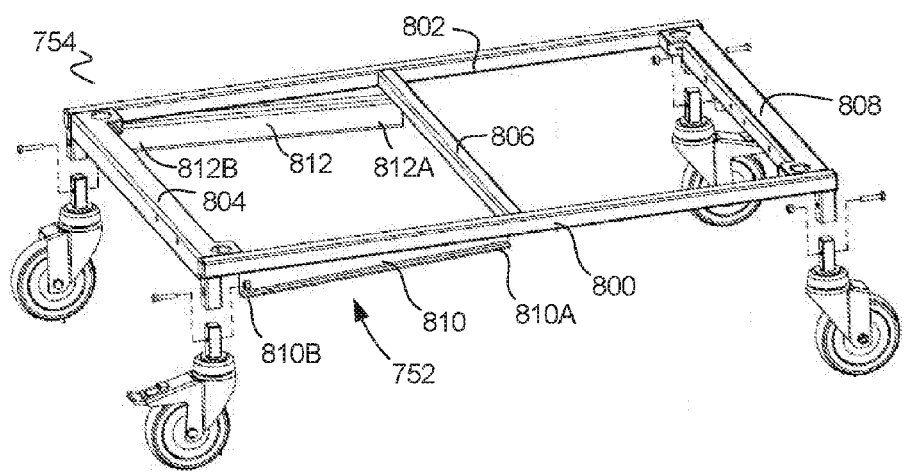
FIG. 22 is a perspective view of a base assembly that forms the base of a cart, according to one embodiment.
Figure 23A:
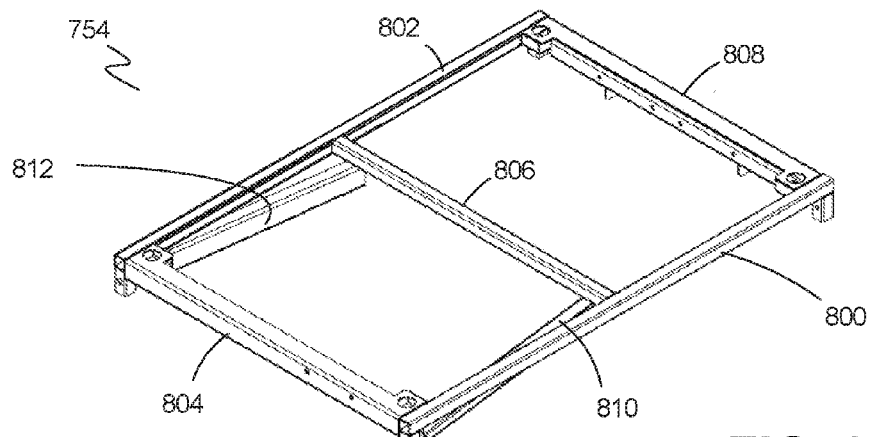
FIG. 23A is a perspective view of the base assembly of FIG. 22 without wheel assemblies, according to one embodiment.
Figure 23B:
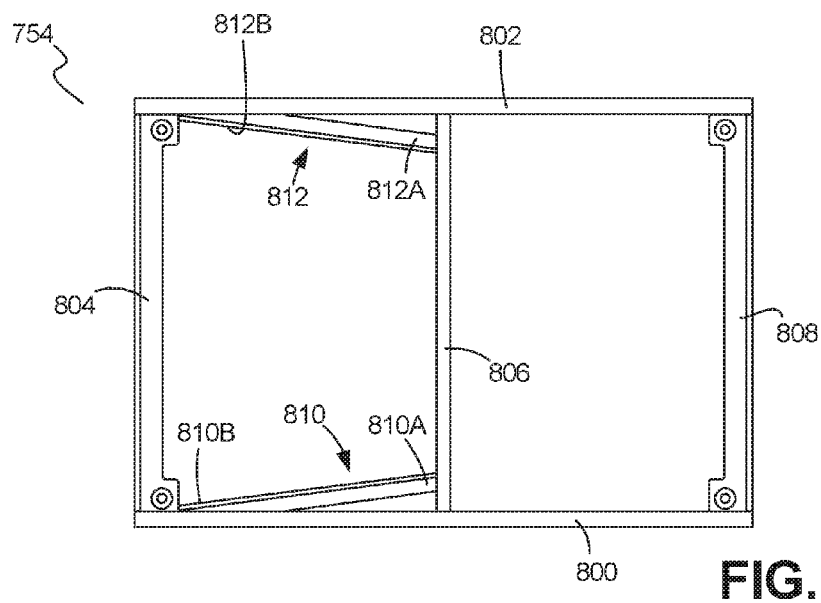
FIG. 23B is a top view of the base assembly of FIG. 23A, according to one embodiment.
Figure 23C:
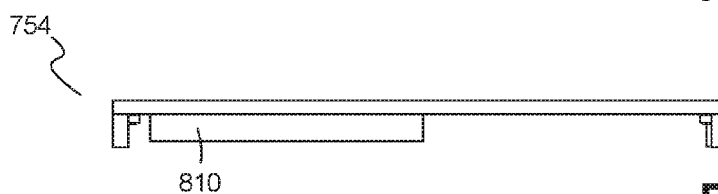
FIG. 23C is a side view of the base assembly of FIG. 23A, according to one embodiment.

FIGS. 22-23C depict the base 754 and the guidance channel 752 in further detail, according to one embodiment. The base 754 as shown has two side members (also referred to as "bars" or "rails") 800, 802, a rear crossmember (also referred to as "crossbar" or "crossrail") 804, a middle crossmember 806, and a front crossmember 808. In this particular implementation, the guidance channel 752 in this implementation has two elongate guidance members (or "bars" or "rails") 810, 812 affixed to the underside of the base 754. More specifically, the guidance bars 810, 812 extend from the back crossbar 804 of the base 754 to the middle crossbar 806 as shown. In this embodiment, the two guidance bars 810, 812 are positioned under the cart 750 such that they are at substantially the same height as the distal end or base of any pusher (such as pusher 766) that might be coupled to the cart 750. As such, the two bars 810, 812 can contact the sides of the pusher base as the base is urged under the cart 750 for coupling.

In this specific implementation, as best shown in FIGS. 22 and 23B, each bar 810, 812 has a front (or "distal") end 810A, 812A that is coupled to the middle crossbar 806. More specifically, according to one embodiment, the distal ends 810A, 812A are disposed at some distance along the middle crossbar 806 from the side bars 800, 802 of the base 754 (or, put another way, they are disposed at some distance from the ends of the middle crossbar 806). Further, in this embodiment, the proximal ends 810B, 812B of the bars 810, 812 are disposed along and attached to the side bars 800, 802 such that the proximal ends 810B, 812B are positioned at substantially the same distance apart from each other as the two side bars 800, 802. Thus, the two guidance bars 810, 812 are closer together at their distal ends 810A, 812A than they are at their proximal ends 810B, 812B, thereby providing a narrowing channel 752 for the pusher (such as pusher 766, for example) to be urged into such that the distal end of the pusher is guided or steered by the bars 810, 812 toward the desired position under the cart 750 in which the fixed front wheels of the pusher 766 are disposed in the correct position under the cart 750 to ensure easy maneuverability of the coupled pusher 766 and cart 750.

In accordance with certain alternatives, the guidance channel 752 need not be two bars 810, 812 as discussed above and depicted in the figures. Instead, it is understood that the channel 752 can have any configuration or constitute any mechanism or device that provides for creating a channel that guides, steers, or directs the coupling of the pusher and the cart such that the pusher is positioned as desired in relation to the cart, as discussed elsewhere herein.

Figure 24A:
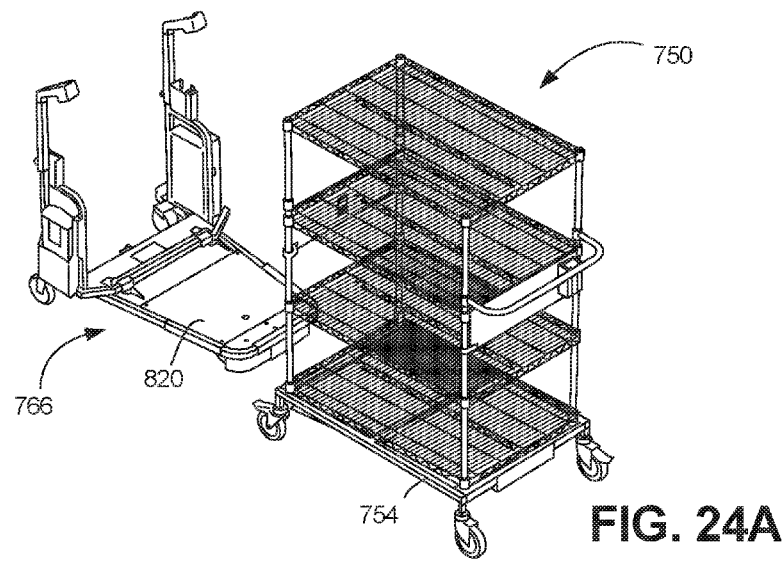
FIG. 24A is a front perspective view of a pusher positioned next to a shelf cart prior to coupling, according to another embodiment.
Figure 24B:
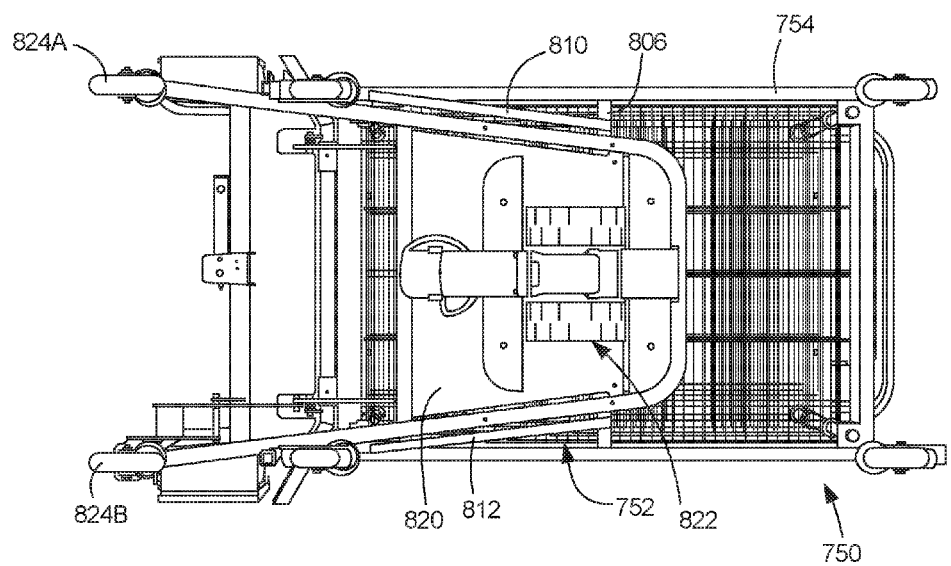
FIG. 24B is an underside view of the pusher coupled to the shelf cart of FIG. 24A, according to one embodiment.

In use, when the cart 750 is to be pushed using the power pusher 766, the pusher 766 is coupled to the cart 750 as best shown in FIGS. 24A and 24B. It is understood that the pusher 766 can be substantially similar to any pusher disclosed or contemplated herein. For example, in one implementation, the pusher 766 can be substantially similar to the pusher 10 discussed above. Alternatively, the pusher can be any known pusher having a base that fits under the base 754 of the cart 750. According to one embodiment, the pusher 766 is coupled to the cart 750 by urging the pusher 766 forward such that the base 820 of the pusher 766 is advanced toward and then under the base 754 of the cart 750 and into the guidance channel 752, as best shown in FIG. 24B. As the pusher 766 is advanced under the cart 750, the two guidance bars 810, 812 serve to guide or steer the pusher 766 when the base 820 of the pusher 766 contacts either or both bars 810, 812, thereby ensuring that the base 820 of the pusher 766 is positioned under the cart 750 as it is coupled thereto such that the fixed front wheels 822 of the pusher 766 are disposed substantially centrally under the base 754 of the cart 750. That is, when the pusher 766 is coupled to the cart 750, the fixed front wheels 822 of the pusher 766 in this specific embodiment are positioned substantially at the middle point of the width of the cart 750 and further are positioned almost at the middle point of the length of the cart 750. More specifically, in this particular embodiment, the two fixed front wheels 822 are disposed just proximally of the middle crossbar 806 of the base 754 of the cart 750 as best shown in FIG. 24B. Alternatively, the guidance channel 752 can guide the pusher 766 to be positioned in any predetermined position under the cart 750 such that the fixed front wheels 822 are at or near the midpoint of the cart 750 with respect to the width and length of the cart 750. In a further alternative, the guidance channel 752 can guide the pusher 766 to be positioned in any predetermined position under the cart 750 such that the fixed front wheels 822 are at or near the midpoint of the width of the cart 750 but can be positioned anywhere along the length of the cart 750.

It is understood that the substantially central positioning of the fixed front wheels 822 under the cart 750 as described above results in easy maneuverability of the combined pusher 766 and cart 750. That is, as discussed above, the assured central positioning of the fixed front wheels 822 by the guidance channel 752 allows for both (1) easily urging the pusher 766 and cart 754 forward or backward in a substantially straight line due to the fixed front wheels 822, and (2) easily rotating the pusher 766 and cart 754 with a substantially zero turning radius around the fixed front wheels 822, due to the fixed front wheels 822 and the fact that the wheels 770A-772B on the cart 750 and the two rear wheels 824A, 824B of the pusher 766 are swivel wheels that allow for such rotation.

According to further embodiments, another optional component that can be used in combination with any of the powered pusher embodiments and any of the mateable cart embodiments disclosed or contemplated herein is a sulky 850 and one or more hitch assemblies 852, 854 as depicted in FIGS. 25A-27B. According to one implementation, the sulky 850 is a detachable wheeled user platform substantially similar to the sulky 130 described above and depicted in FIGS. 6A-6C and thus, other than the hitch assembly discussed below, can have similar or identical components and features to that embodiment. Alternatively, the sulky 850 can be any such detachable wheeled user platform that can be used with any of the pusher embodiment herein. Like the sulky 130 discussed above, this sulky embodiment 850 can be removably coupled to the pusher 856 via any of the mechanisms, devices, or features described above in relation to that sulky 130.

One difference with respect to this sulky 850 is the hitch assembly 852 coupled to a rear portion of the sulky 850. The hitch assembly 852 has an elongate tongue 862 that couples at its distal end to a rear portion of the sulky 850 and couples at its proximal end to a distal portion of the cart 858. More specifically, the tongue 862 is rotatably coupled to a proximal portion of the base 864 of the sulky 850 and fixedly coupled to a distal portion of the base 866 of the cart 858. As such, the tongue 862 can rotate in relation to the sulky 850 when the combination of the pusher 856 and the cart 858 make a turn, but the tongue 862 does not rotate in relation to the cart 858. Alternatively, the tongue 862 can be fixedly coupled to the sulky base 864 and rotatably coupled to the cart base 866.

Figure 25A:
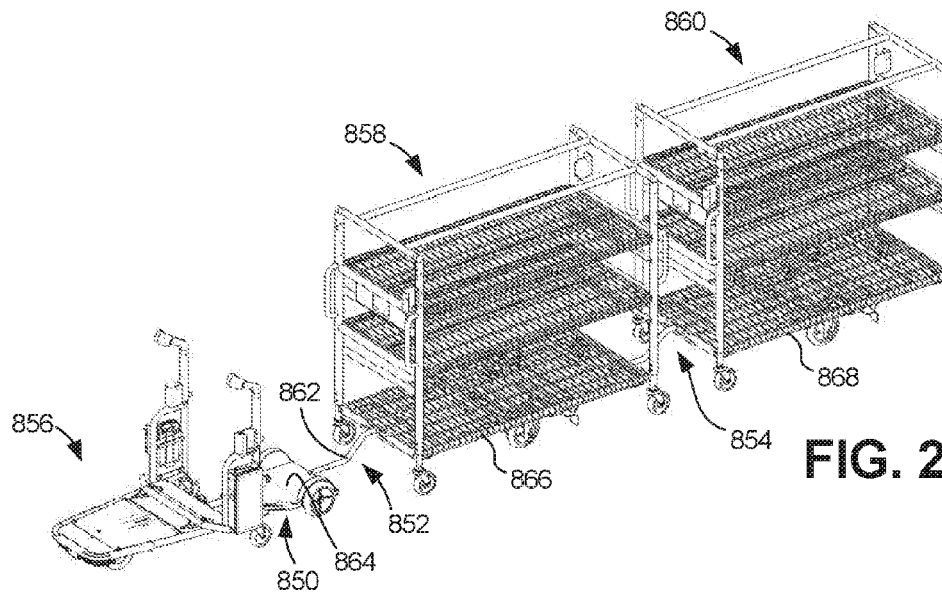
FIG. 25A is a perspective view of a pusher coupled via hitch assemblies to two shelf carts, according to one embodiment.
Figure 25B:
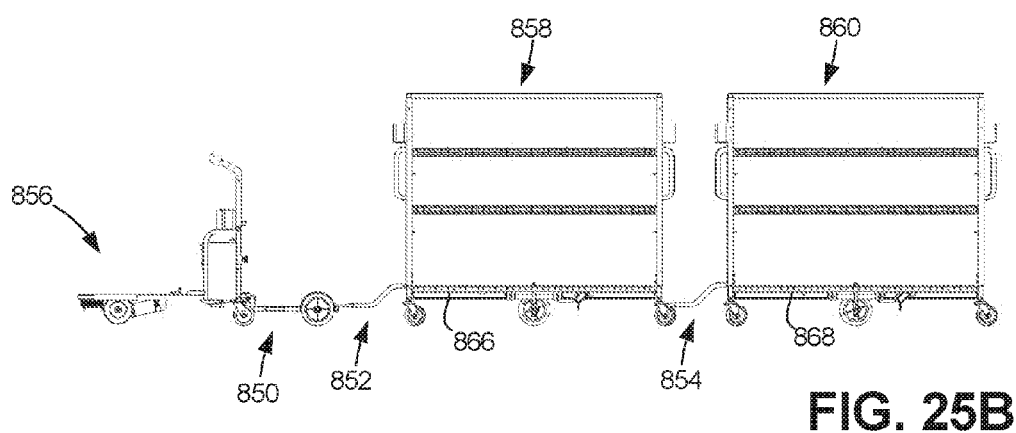
FIG. 25B is a side view of the pusher coupled to the two shelf carts of FIG. 25A, according to one embodiment.
Figure 25C:
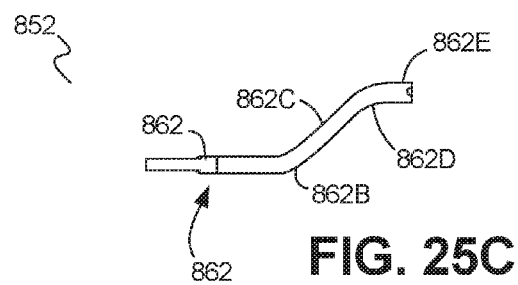
FIG. 25C is a side view of a hitch assembly, according to one embodiment.

It is understood that the tongue 862 is any elongate component, such as a rod or bar or the like, that can be used as a hitch tongue. Note that the specific tongue implementation as shown in FIGS. 25A and 25B has a bent or curved configuration that is utilized due to the differing heights of the sulky 850 and the cart base 864. That is, as best shown in FIG. 25C, the tongue 862 has a distal straight portion 862A, a distal bend 862B, a middle straight portion 862C, a proximal bend 862D, and a proximal straight portion 862E. Alternatively, the tongue 862 can have a distal straight portion, a curved portion, and a proximal straight portion. In a further alternative, the tongue 862 can have any configuration that addresses any different in height between the sulky 850 and the cart 858. In a further alternative, the tongue 862 has no such bent or curved configuration and the coupling points on both the sulky 850 and the cart 858 are substantially the same height.

According to certain implementations, a second hitch assembly 854 is provided that can couple the first cart 858 to a second cart 860. According to one embodiment, the second hitch assembly 854 is substantially similar to the first hitch assembly 852 as depicted in FIGS. 25A-25C and described above. Alternatively, the second hitch assembly 854 can have any of the alternative configurations described above. The second hitch assembly 854 is coupled at its distal end to a proximal portion of the first cart base 866 and is coupled at its proximal end to a distal portion of the second cart base 868 in a fashion similar to the hitch assembly 852 described above.

In accordance with one implementation, the first and second carts 858, 860 can be shelf carts 858, 860 substantially similar (or identical) to the shelf cart 502 with the deployable central guidance wheels 542A, 542B as described above. Alternatively, the two carts 858, 860 can be any of the cart embodiments disclosed or contemplated herein. In a further embodiment, the two carts 858, 860 can be any known carts that can be pulled by a powered pusher or puller unit.

Further, according to certain alternatives, a third hitch assembly (not shown) can be provided and thereby allow for coupling to a third cart (not shown).

In use, according to certain embodiments, a user can be positioned on the sulky 850 and operate the pusher 856 to pull the one, two, or more carts via the configuration described above. In accordance with some implementations, the combination of the hitch assemblies 852, 854 coupled to the pusher 856 and carts 858, 860 as described herein along with the central guidance wheels 542A, 542B provide for a "train" configuration in which the carts 858, 860 follow substantially the same path as the pusher 856 whether the pusher 856 is pulling the carts 858, 860 in a substantially straight line or is turning a corner. As such, the substantially similar path allows the "train" of the pusher 856 and carts 858, 860 to turn fairly tight corners in close quarters without hitting any obstacles.

Figure 26A:
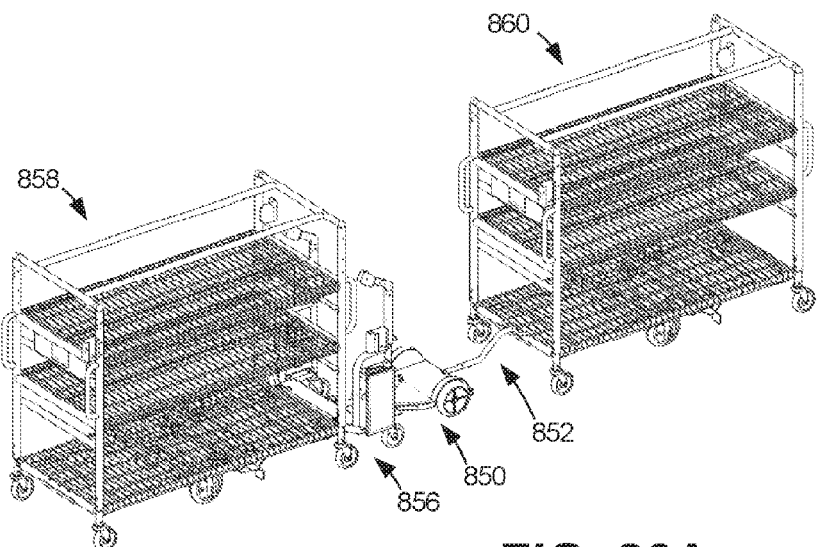
FIG. 26A is a perspective view of a pusher coupled to one shelf cart via the front end of the pusher and coupled to a second shelf cart via a hitch assembly, according to one embodiment.
Figure 26B:
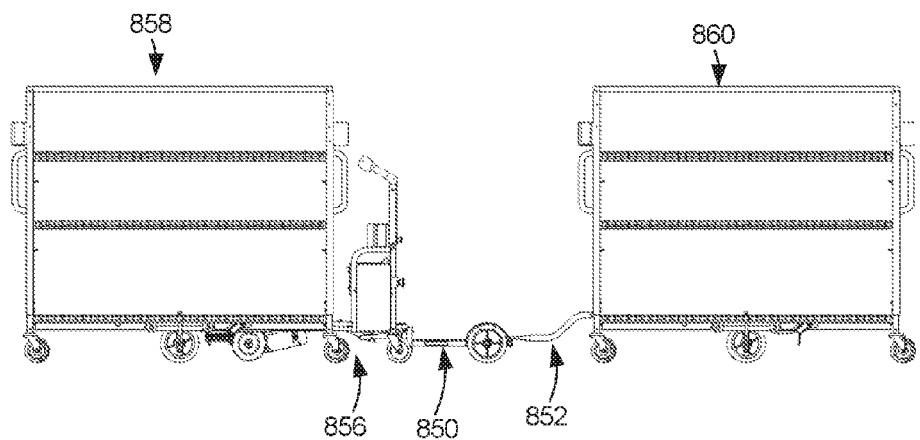
FIG. 26B is a side view of the pusher coupled to the two shelf carts of FIG. 26A, according to one embodiment.

According to another implementation as best shown in FIGS. 26A and 26B, the pusher 856 can move the carts 858, 860 (or any other two carts disclosed or contemplated herein or known to be pushed/pulled by a pusher/puller) by coupling to and pushing the first cart 858 and pulling the second cart 860. That is, the pusher 856 can be coupled to the first cart 858 in the same fashion as described above with respect to the coupling of pusher 500 and cart 502. Alternatively, the pusher 856 can be coupled to the first cart 858 according to any embodiment disclosed or contemplated herein. Further, the pusher 856 can be coupled to the second cart 860 in the same fashion as described above with respect to the coupling of the pusher 856 and the first cart 858 in relation to FIGS. 25A-25C and related description above. In other words, the pusher 856 can be coupled to the sulky 850 which is coupled to the cart 860 via the hitch assembly 852 as discussed above.

In accordance with certain embodiments, a second hitch assembly (not shown) can be provided and thereby allow for coupling to a third cart (not shown). In a further alternative, a third hitch assembly (not shown) can be provided and thereby allow for coupling to a fourth cart (not shown).

Like the prior configuration as shown in FIGS. 25A-25C, in use, according to certain implementations, a user can be positioned on the sulky 850 and operate the pusher 856 to push and/or pull the one, two, or more carts via the configuration described above. Further, the combination of the pusher 856 coupled to the first cart 858 and the hitch assembly 852 coupled to the second cart 860 as described herein along with the central guidance wheels in the second cart 860 provide for a "train" configuration in which the cart 860 follows substantially the same path as the pusher 856 and cart 858 in a fashion similar to that described above, thereby allowing the combination to turn fairly tight corners without hitting any obstacles.

Figure 27A:
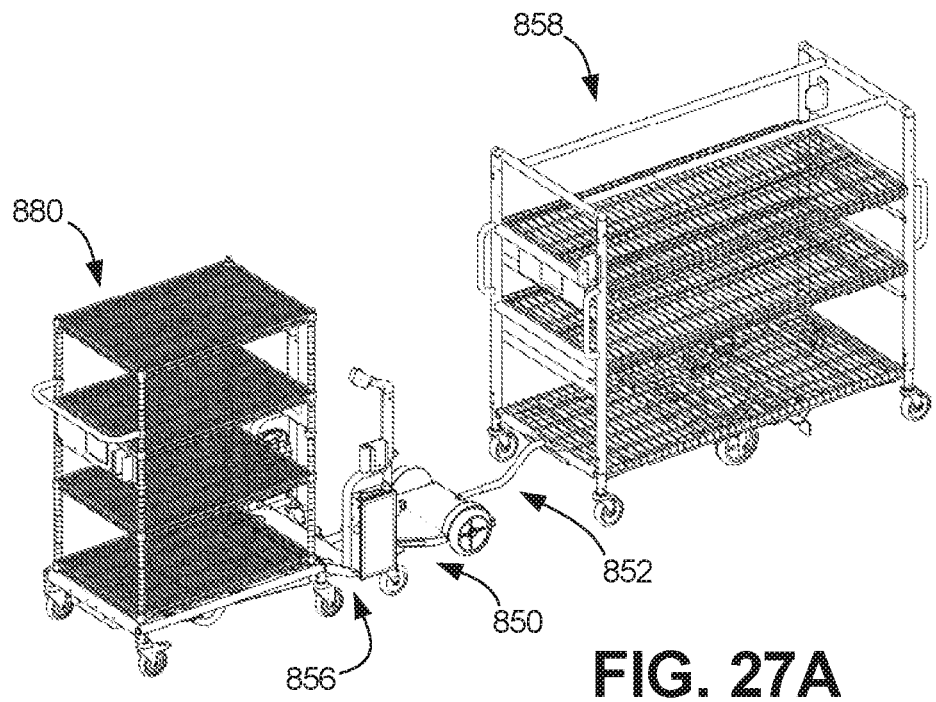
FIG. 27A is a perspective view of a pusher coupled to one shelf cart via the front end of the pusher and coupled to a second, different shelf cart via a hitch assembly, according to another embodiment.
Figure 27B:
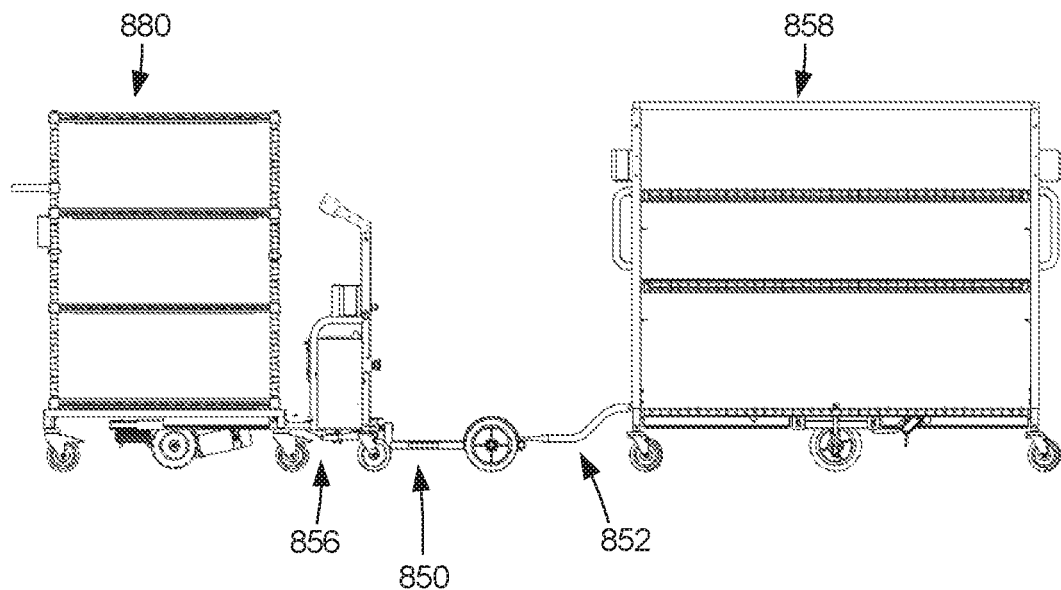
FIG. 27B is a side view of the pusher coupled to the two shelf carts of FIG. 27A, according to one embodiment.

According to another implementation as best shown in FIGS. 27A and 27B, the pusher 856 can move cart 880 and cart 858 (or any other two carts disclosed or contemplated herein or known to be pushed/pulled by a pusher/puller) by coupling to and pushing the cart 880 and pulling the cart 860. In this embodiment, the cart 880 is a shelf cart 880 with a guidance channel similar to the guidance channel 752 provided on cart 750 as discussed above in relation to FIGS. 21A-24B. The pusher 856 can be coupled to the cart 880 in the same fashion as described above with respect to the coupling of pusher 766 and cart 750. Alternatively, the pusher 856 can be coupled to the cart 880 according to any embodiment disclosed or contemplated herein. Further, the pusher 856 can be coupled to the cart 858 in the same fashion as described above with respect to the coupling of the pusher 856 and the first cart 858 in relation to FIGS. 25A-25C and related description above. In other words, the pusher 856 can be coupled to the sulky 850 which is coupled to the cart 860 via the hitch assembly 852 as discussed above.

In accordance with certain embodiments, a second hitch assembly (not shown) can be provided and thereby allow for coupling to a third cart (not shown). In a further alternative, a third hitch assembly (not shown) can be provided and thereby allow for coupling to a fourth cart (not shown).

Like the prior configurations as shown in FIGS. 25A-26B, in use, according to certain implementations, a user can be positioned on the sulky 850 and operate the pusher 856 to push and/or pull the one, two, or more carts via the configuration described above. Further, the combination of the pusher 856 coupled to the cart 880 and the hitch assembly 852 coupled to the cart 858 as described herein along with the central guidance wheels in the cart 858 provide for a "train" configuration in which the cart 858 follows substantially the same path as the pusher 856 and cart 880 in a fashion similar to that described above, thereby allowing the combination to turn fairly tight corners without hitting any obstacles.

Another shelf cart 920 embodiment is depicted in FIGS. 28A-28E. This shelf cart 920 has a deployable set of steps (or "deployable staircase") 922 that can be removably coupled to one end of the cart 920 in the undeployed or stored configuration and can be coupled in a different fashion to that end of the cart 920 in the deployed configuration. The set of steps 922 can be utilized by a user to access an upper shelf of the cart 920 and/or items thereon as will be described in further detail below. It is understood that the various embodiments of the deployable set of steps 922 as described herein can be incorporated into any cart implementation disclosed or contemplated herein that couples with any of the pusher embodiments as disclosed or contemplated herein.

It is understood that the cart 920 can be coupled to a pusher (such as, for example, the pusher 766 mentioned above). It is further understood that the cart 920 can have many or all of the same or similar basic components as the various carts disclosed or contemplated herein, including, for example, the cart 750 discussed in detail above. For example, the cart 920 has a base 924, four elongate members 926A, 926B, 928A, 928B extending upward from the base 924, and three shelves 930A, 930B, 930C coupled to the elongate members 926A-928B. Alternatively, it is understood that the cart 920 can have any configuration and number of shelves and other components as disclosed or contemplated with respect any cart embodiment herein. In addition, it is understood that the base 924 has four wheels 936A, 936B, 936C, 936D coupled to the base 924 as shown. It is understood that these four wheels 936A-936D are similar or identical to similar wheels on other cart embodiments as disclosed or contemplated herein, and can have the same or similar features or functions. Further, as best shown in FIG. 28E, the cart 920 can have deployable central guidance wheels 946 similar or identical to the central guidance wheels depicted in FIGS. 11A and 11B and described in detail above. Alternatively, the cart 920 does not have central guidance wheels.

Continuing with FIGS. 28A-28E, this particular implementation has a top railing 932 attached to the top ends of the elongate members 926A-928B such that the top railing 932 has two end railing segments 932A, 932B and two side railing segments 932C, 932D that form the top railing 932. The top railing 932 is disposed at some height above the top shelf 930A. In this implementation as shown, the front end railing segment 923A is not coupled to the ends of the two side railing segments 932C, 932D, but instead is coupled to those two segments 932C, 932D at some distance from the front ends of those segments 932C, 932D. Alternatively, the front end railing segment 923A can be positioned at the ends of the side railing segments 932C, 932D.

Further, according to certain implementations, the cart 920 also has handrails (also referred to as "cart handrails," "handles," or "railing handrails") 934 attached or disposed at or near one end of the cart 920. In this specific exemplary embodiment, the handrails 934 are attached to the top railing 932 and the elongate members 926A, 926B at the front end of the cart 920. Alternatively, the handrails 934 can be attached at either end of the cart 920 and can be attached in any fashion to any of the components of the cart 920.

As mentioned above, the cart 920 also has a detachable and deployable set of steps 922 removably coupled to one end of the cart 920. In the specific exemplary implementation depicted in FIGS. 28A-28E, the steps set 922 is coupled to the front end. Alternatively, the set of steps 922 can be coupled to either end. In a further alternative, it is understood that the set of steps 922 could be coupled to a side of the cart 920.

Figure 28A:
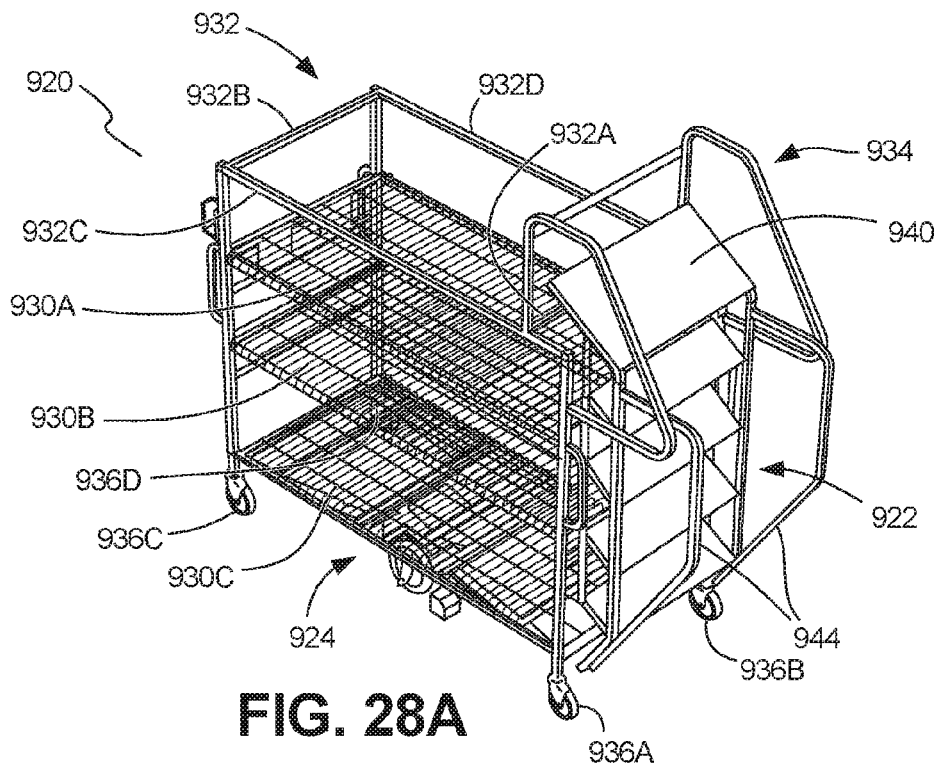
FIG. 28A is a perspective view of a shelf cart with a deployable set of steps, according to one embodiment.
Figure 28B:
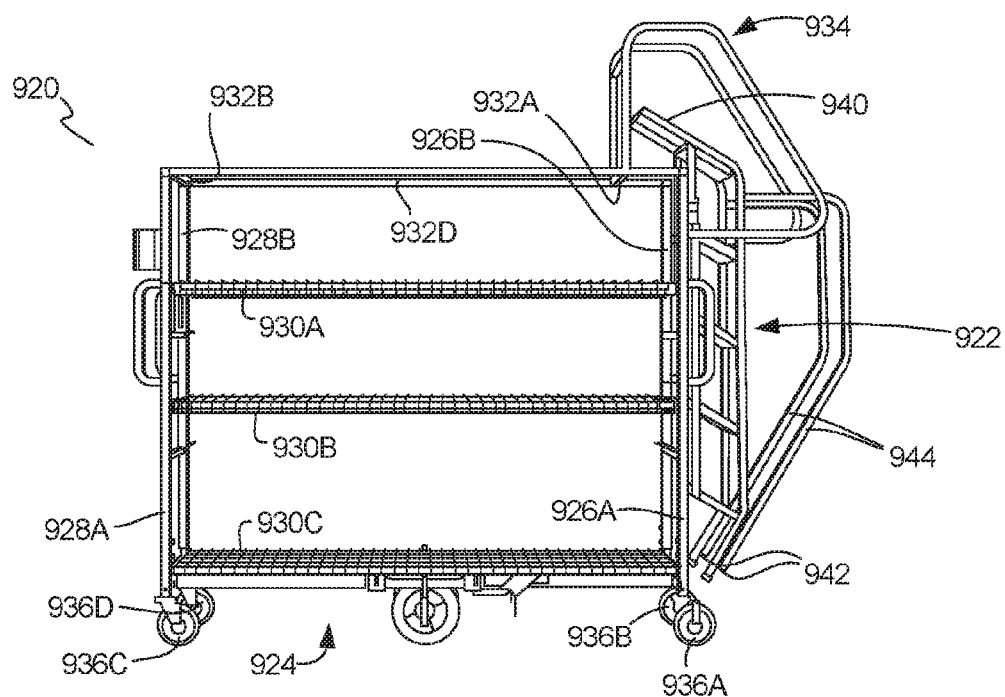
FIG. 28B is a side view of the shelf cart and deployable set of steps of FIG. 28A, according to one embodiment.
Figure 28C:
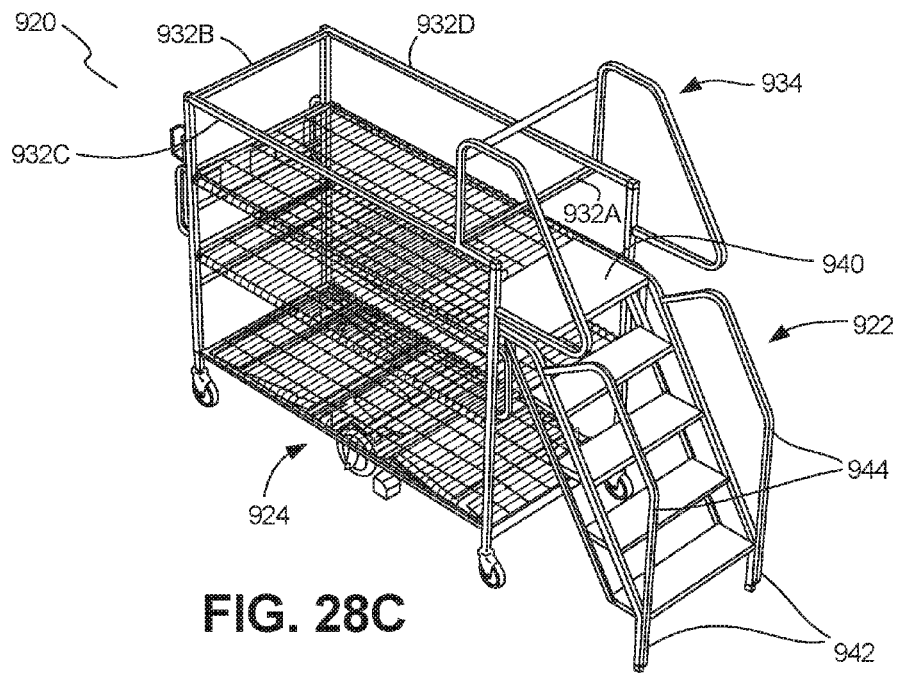
FIG. 28C is a perspective view of the shelf cart FIG. 28A with the set of steps deployed, according to one embodiment.
Figure 28D:
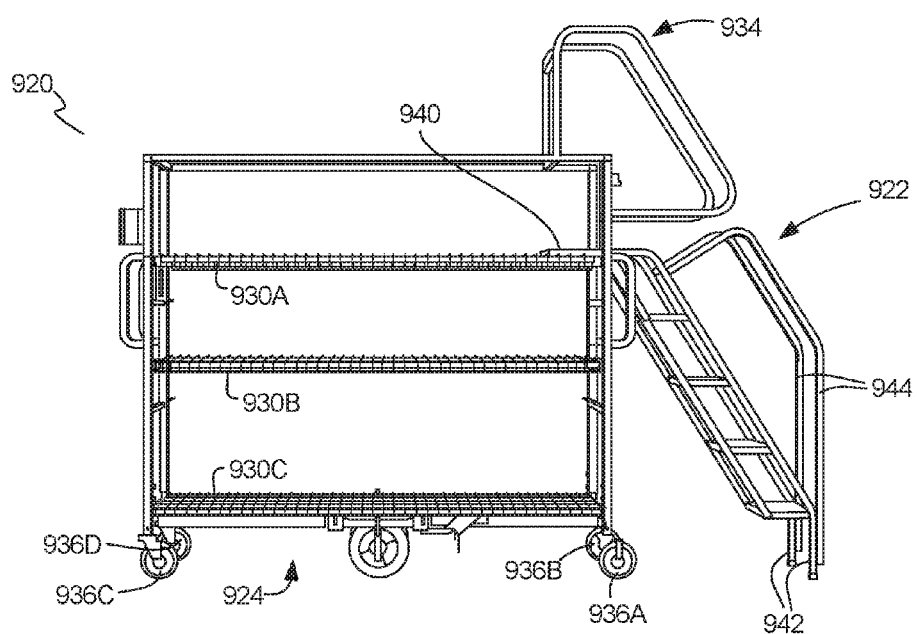
FIG. 28D is a side view of the shelf cart FIG. 28A with the set of steps deployed, according to one embodiment.
Figure 28E:
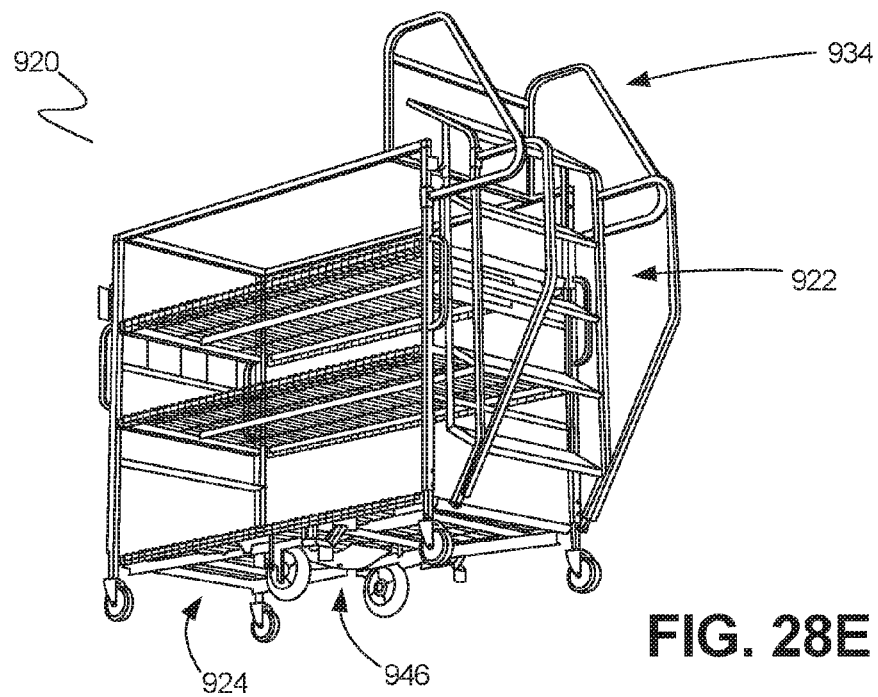
FIG. 28E is an underside perspective view of the shelf cart and deployable set of steps of FIG. 28A, according to one embodiment.

FIGS. 28A, 28B, and 28E depict the set of steps 922 in its stored or undeployed configuration or position on the cart 920. That is, when the set of steps 922 is not in use, it is coupled to the cart 920 such that it can be transported on the cart 920 during use of the cart without hindering the use of the cart 920. As such, in the stored and/or undeployed configuration, the set of steps 922 is coupled to the end of the cart 920—in this specific example, the front end. The set of steps 922 can be removably coupled using any known method or mechanism that allows for the set of steps 922 to be attached to the front end of the cart 920 such that it won't inadvertently detach from the cart 920 during use of the cart 920 but can be easily removed from the cart 920 to move it into its deployed configuration as will be discussed below. For example, in one embodiment, the set of steps 922 can have one or more hooks or brackets that can be coupled with or hung over an appropriate component or feature of the cart 920 such that the set of steps 922 is removably coupled to the cart. Alternatively, any such device or mechanism can be used, including, for example, a hanger, a latch, or any other such component that can removably couple the set of steps 922 to the cart 920.

FIGS. 28C and 28D depict the set of steps 922 in its deployed position such that the top step (or "top end") 940 of the set of steps 922 is disposed or positioned on the top shelf 930A of the cart 920, while the feet 942 of the set of steps 922 are positioned on the surface (ground, floor, etc.) on which the cart 920 is positioned. In one implementation, the top step 940 can be removably attached to the top shelf 930A or elsewhere on the cart 920 with an attachment mechanism of some kind. Alternatively, the top step 940 can simply be positioned or disposed thereon such that gravity maintains the positioning of the set of steps 922 in relation to the cart 920.

The set of steps 922, according to one embodiment, has handrails 944 disposed on both sides of the set of steps 922. Alternatively, the set of steps 922 can have one handrail or no handrails.

In use, the cart 920 and set of steps 922 can be used to assist a user with placing items on the top shelf 930A and retrieving those items therefrom. For example, a user can move the cart 920 (using a pusher or manually) to a location for loading the cart with items. The user can then detach the set of steps 922 from its stored position as depicted in FIGS. 28A and 28B and place it in its deployed position as shown in FIGS. 28C and 28D. The user can then climb the steps to place items on the top shelf 930A (in addition to placing items on the other shelves without using the set of steps 922. When that process is complete, the user can then move the set of steps 922 back to the stored configuration. The user can then push the cart (manually or with a pusher) to the desired location for unloading the items. At that point, the process begins again, with the user move the set of steps 922 to the deployed position, using the steps 922 to retrieve the items from the top shelf 930A, and replacing the set of steps 922 in the stored configuration when the unloading is complete.

Figure 29A:
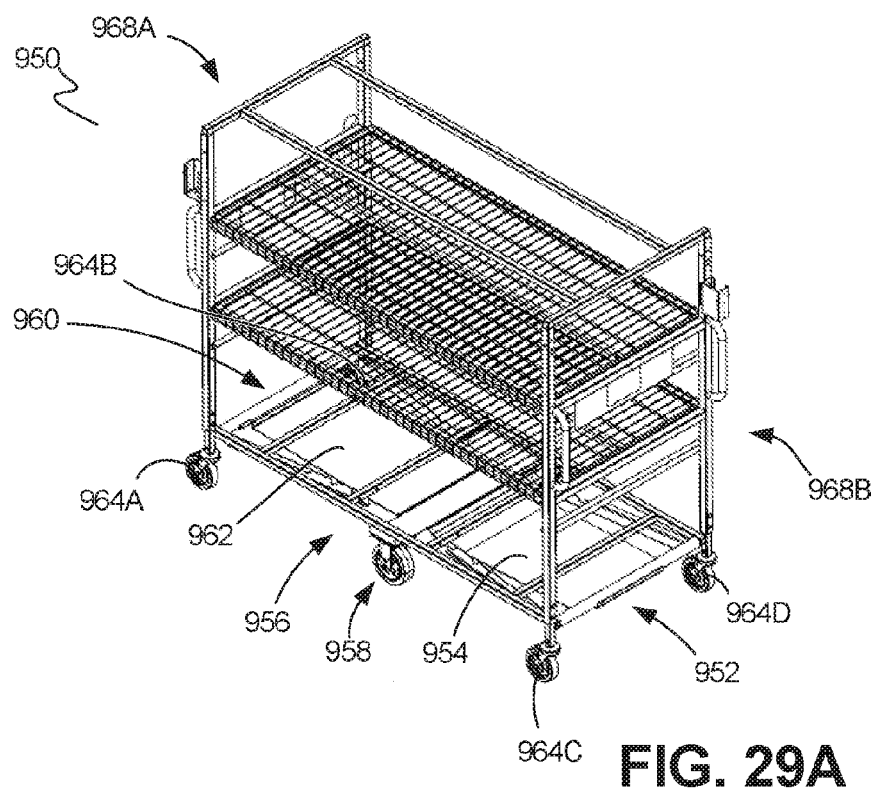
FIG. 29A is a perspective view of a shelf cart with a guidance channel and ramp, according to one embodiment.
Figure 29B:
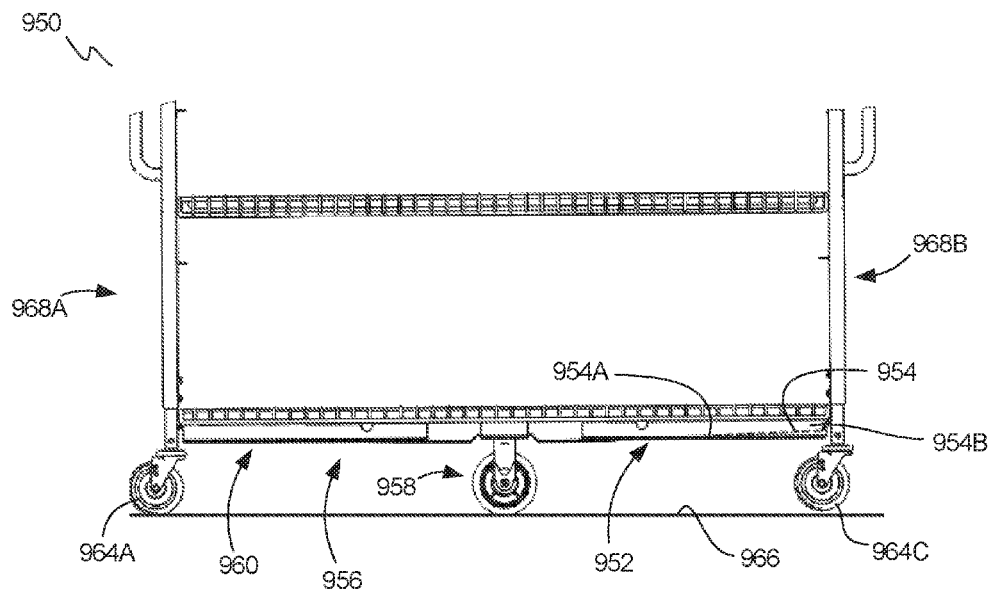
FIG. 29B is a side view of the shelf cart of FIG. 29A, according to one embodiment.
Figure 29C:
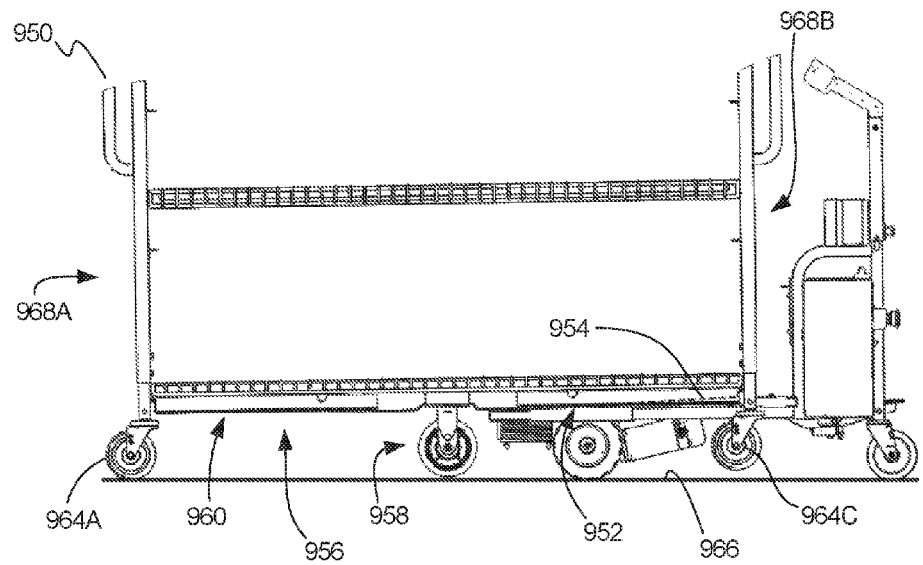
FIG. 29C is a side view of the shelf cart of FIG. 29A coupled to a pusher, according to one embodiment.

Another shelf cart 950 embodiment is depicted in FIGS. 29A-29C. As will be explained in further detail below, this shelf cart 950 has biased central guidance wheels 958 and a guidance channel 952 with a ramp 954 that is defined or disposed on the underside of the base 956 of the cart 950.

The biased central guidance wheels 958 are fixed wheels 958 that are a known cart feature used in certain industries. As best shown in FIG. 29B, the central guidance wheels 958 are coupled to the base 956 of the cart 950 such that the bottom portion of the guidance wheels (the portion of each wheel that is furthest from the base 956) is a greater distance from the base 956 than the bottom portion of the four swivel wheels 964A-964D. This creates what is essentially a "teeter totter" effect. That is, during use, the biased and fixed central guidance wheels 958 are always touching the surface on which the cart 950 is being used, while the cart 950 can tilt either way in relation to the central guidance wheels 958 such that the swivel wheels 964A-964D at each end are not always in contact with that surface. This configuration ensures that the central guidance wheels 958 are always in contact with the ground/floor—thereby ensuring easy use of the cart 950 and easy turning with a zero turning radius as described above with respect to other fixed central guidance wheel embodiments, while the swivel wheels 964A-964D only contact the surface as necessary without interfering with the features of the central guidance wheels 958. Note, for example, the disposition of the wheels 958, 964A-964D of the cart 950 in FIG. 29B. Note that the swivel wheel 964A and the guidance wheels 958 are both contacting the ground/floor 966 while the bottom of swivel wheel 964C is not in contact with the ground/floor 966.

As shown in FIGS. 29A-29C, and as already discussed in part above, the cart 950 has a base 956, biased central guidance wheels 958, and four swivel wheels 964A-964D. In addition, it is understood that the cart 950 can have any configuration of elongate members, shelves, handles, and any other components with any of the features and/or functions as described above with respect to other cart embodiments.

As mentioned above, the guidance channel 952 with the ramp 954 is disposed on the underside of the base 956 of the cart 950, according to one embodiment. The channel 952 is positioned at one end of the cart 950 and on the underside of the base 956 such that it guides the front end of the pusher (such as pusher 766, for example) under the base 956 of the cart 950 as the pusher 766 is urged forward to couple to the cart 950 to ensure a proper coupling of the pusher 766 with the cart 950. It is understood that the channel 952 can have the same or similar components and can have the same features and functions as the guidance channel 752 described above and depicted in FIGS. 21A-24B.

One difference in the instant guidance channel 952 in comparison to the above guidance channel 752 embodiment is the ramp 954. The ramp 954 is disposed at an angle within the guidance channel 952, as best shown in FIGS. 29B and 29C. More specifically, the ramp 954 in this implementation is a plate 954 that is disposed or coupled to the base 956 such that the distal end 954A of the ramp 954 is positioned at a lower height in relation to the base 956 in comparison to the proximal end 954B of the ramp 954, as best shown in FIG. 29B. Thus, the ramp 954 is disposed within the guidance channel 952 to ensure that the front end of the pusher 766 contacting the ramp 954 as the front end of the pusher 766 is urged into the guidance channel 952, thereby causing the back end 968B of the cart 950 to move upward (and the front end 968A to move downward). As the pusher 766 is urged farther into the guidance channel 952, the front end of the pusher 766 moves closer to the distal end 954A of the ramp 954, thereby further urging the back end 968B of the cart 950 upward. Ultimately, when the pusher 766 is positioned fully within the guidance channel 952 such that the pusher 766 is coupled to the cart 950 as shown in FIG. 29C, not only have the rear swivel wheels 964C, 964D (only 964C is visible in FIG. 29C) been urged upward and out of contact with the ground/floor 966, but the central guidance wheels 958 have also been urged upward and out of contact with the ground/floor 966 as well.

As such, in this embodiment, the guidance channel 952 ensures proper positioning of the pusher 766 (and the fixed front wheels of the pusher 766) in relation to the cart 950 in a fashion similar to that described above with respect to other guidance channel embodiments. In addition, the ramp 954 ensures that the central guidance wheels 958 (and the rear swivel wheels 964C, 964D) are not in contact with the ground/floor 966 and thus prevents any of the steering or operational difficulties that would result from both sets of fixed wheels (the fixed front wheels of the pusher 766 and the fixed central guidance wheels 958 of the cart 950) being in contact with the ground/floor 966 at the same time while trying to use the pusher 766 to push the cart 950. It is understood that the substantially central positioning of the fixed front wheels of the pusher 766 under the cart 950 combined with the central guidance wheels 958 being raised off the ground/floor 966 as described above results in easy maneuverability of the combined pusher 766 and cart 950. That is, as discussed above, the assured central positioning of the fixed front wheels of the cart 766 by the guidance channel 952 and the raising of the central guidance wheels 958 off the ground/floor 966 allows for both (1) easily urging the pusher 766 and cart 950 forward or backward in a substantially straight line due to the fixed front wheels of the pusher 766, and (2) easily rotating the pusher 766 and cart 950 with a substantially zero turning radius around the fixed front wheels of the pusher 766, due to the fixed front wheels of the pusher 766 and the fact that central guidance wheels 958 are not in contact with the ground/floor 966 and thus will allow for such rotation.

While the discussion above relates to one guidance channel 952 and ramp 954, it is understood that the other end (referred to herein as the "front end," but also capable of being the "back end") 968A can have a guidance channel 960 disposed under the base 956 and a ramp 962 disposed therein. It is also understood that the various embodiments of the guidance channel 952 and ramp 954 as described herein can be incorporated into any cart implementation disclosed or contemplated herein that couples with any of the pusher embodiments as disclosed or contemplated herein.

According to a further embodiment, an adaptor insert 970 is provided that can be coupled to a pusher according to any embodiment herein to make it possible for the pusher to coupled with a certain subset of known carts. As best shown in FIG. 30A, the insert 970 can be positioned on the pusher 972 such that it is possible for the pusher 972 to couple to the target carts.

As best shown in FIGS. 30B and 30C, the adaptor 970 has a substantially flat top surface 974. Further, the underside 976 of the adaptor 970 has an elongate slot or opening 978 that is configured to fit over the elongate tube 980 on the pusher 972. That is, the slot 978 has an inner semi-circular shape that matches with the outer circular shape of the tube 980, thereby ensuring a substantially tight and uniform fit between the slot 978 and the tube 980 when the slot 978 is positioned thereon.

It is understood that the elongate tube (or "rod") 980 as depicted herein is coupled to or a part of the latch bar 982 and helps to support the two latches 984A, 984B. It is further understood that this configuration of the elongate rod 980, latch bar 982, and two latches 984A, 984B on the pusher 972 is substantially similar or identical to the latch bar 46 and latches 48A, 48B as discussed above with respect to pusher 10. Alternatively, these components can be incorporated into any pusher embodiment disclosed or contemplated herein.

In accordance with one embodiment, the positioning of the adaptor 970 along the rod 980 of the pusher 972 can be accomplished via a coupleable ring or wrap 986 that can be positioned around the rod 980. That is, the adaptor 970 can have a notch 988 (also referred to as a slot or slit) defined therein as shown that can be coupled with the ring 986. More specifically, the ring 986 is first positioned around the rod 980 at the desired location along the rod 980. Once the ring 986 is in place, the adaptor 970 can be positioned over the rod 980 and the ring 986 such that the elongate slot 978 is positioned over the rod 980 and the notch 988 is positioned over the ring 986 such that when the adaptor 970 is urged downward, the slot 978 snaps or others moves into place over the rod 980 such that the rod 980 is disposed within the slot 978 and the notch 988 moves into place over the ring 986 such that the ring is disposed within the notch 988 as shown in FIG. 30B.

In use, the adaptor 970 can be coupled to the pusher 972 as described herein such that the pusher 972 can couple to certain commercially-available carts. For example, in one embodiment, the adaptor 970 can be coupled to the pusher 972 to allow the pusher 972 to couple to the Wanzl 1000™ and Wanzl 1200™ carts.

Although the present invention has been described with reference to preferred embodiments, persons skilled in the art will recognize that changes may be made in form and detail without departing from the spirit and scope of the invention.

What is claimed is:

1. A powered cart moving system, the system comprising:
   (a) a powered pushing device comprising:
      (i) a base;
      (ii) a left control handle coupled to a left portion of the base;
      (iii) a right control handle coupled to a right portion of the base;
      (v) a pair of rear swivel wheels disposed under a proximal portion of the base;
      (vi) a pair of front fixed wheels disposed under the base, wherein the fixed front wheels are disposed proximally from a front end of the base; and
      (vii) a motor operably coupled to the pair of front fixed wheels;
   (b) a wheeled user platform coupleable to the powered pushing device;
   (c) a first hitch assembly comprising a first distal coupling component structured and arranged to be coupleable to the wheeled user platform and a first proximal coupling component structured and arranged to be coupleable to a first wheeled cart; and
   (d) a second hitch assembly comprising a second distal coupling component structured and arranged to be coupleable to the first wheeled cart and a second proximal coupling component structured and arranged to be coupleable to a second wheeled cart.

2. The powered cart moving system of claim 1, further comprising a third hitch assembly comprising a third distal coupling component structured and arranged to be coupleable to the second wheeled cart and a third proximal coupling component structure and arranged to be coupleable to a third wheeled cart.

3. The powered cart moving system of claim 2, wherein the base is structured and arranged to be positionable under and coupleable to a fourth wheeled cart.

4. The powered cart moving system of claim 3, wherein the fourth wheeled cart comprises:
   (a) a wheeled cart base;
   (b) four swivel wheels, wherein each swivel wheel is disposed at a corner of the wheeled cart base; and
   (c) a guidance channel disposed beneath the wheeled cart base and adjacent to an end of the wheeled cart base, wherein the guidance channel comprises a space sized to receive a front end of the base of the powered pushing device.

5. The powered cart moving system of claim 1, wherein the wheeled user platform is coupleable to a proximal portion of the powered pushing device.

6. The powered cart moving system of claim 1, wherein the base is structured and arranged to be positionable under and coupleable to a third wheeled cart.

7. The powered cart moving system of claim 1, wherein at least one of the first and second wheeled carts comprises:
   (a) a wheeled cart base; and
   (b) four swivel wheels, wherein each of the four swivel wheels is disposed at a corner of the wheeled cart base.

8. The powered cart moving system of claim 7, wherein the at least one of the first and second wheeled carts further comprises:
   (a) a shelving frame coupled to the wheeled cart base, wherein the shelving frame comprises at least two shelves; and
   (b) a set of steps removably attached to the shelving frame, wherein the set of steps is constructed and arranged to be positioned in relationship with the wheeled cart such that a user can access an upper shelf of the at least two shelves.

9. A powered cart moving system, the system comprising:
(a) a powered pushing device comprising:
  (i) a base structured and arranged to be positionable under and coupleable to a first wheeled cart;
  (ii) a left control handle coupled to a left portion of the base;
  (iii) a right control handle coupled to a right portion of the base;
  (iv) a pair of rear swivel wheels disposed under a proximal portion of the base;
  (v) a pair of front fixed wheels disposed under the base, wherein the fixed front wheels are disposed proximally from a front end of the base; and
  (vi) a motor operably coupled to the pair of front fixed wheels;
(b) a wheeled user platform coupleable to the powered pushing device;
(c) a first hitch assembly comprising a first distal coupling component structured and arranged to be coupleable to the wheeled user platform and a first proximal coupling component structured and arranged to be coupleable to a second wheeled cart; and
(d) a second hitch assembly comprising a second distal coupling component structured and arranged to be coupleable to the second wheeled cart and a second proximal coupling component structure and arranged to be coupleable to a third wheeled cart.

10. The powered cart moving system of claim 9, wherein the first wheeled cart comprises:
(a) a wheeled cart base;
(b) four swivel wheels, wherein each swivel wheel is disposed at a corner of the wheeled cart base; and
(c) a guidance channel disposed beneath the wheeled cart base and adjacent to an end of the wheeled cart base, wherein the guidance channel comprises a space sized to receive a front end of the base of the powered pushing device.

11. The powered cart moving system of claim 9, wherein the wheeled user platform is coupleable to a proximal portion of the powered pushing device.

12. The powered cart moving system of claim 9, wherein at least one of the first, second, and third wheeled carts comprises:
(a) a wheeled cart base; and
(b) four swivel wheels, wherein each of the four swivel wheels is disposed at a corner of the wheeled cart base.

13. The powered cart moving system of claim 12, wherein the at least one of the first, second, and third wheeled carts further comprises:
(a) a shelving frame coupled to the wheeled cart base, wherein the shelving frame comprises at least two shelves; and
(b) a set of steps removably attached to the shelving frame, wherein the set of steps is constructed and arranged to be positioned in relationship with the wheeled cart such that a user can access an upper shelf of the at least two shelves.

14. A powered cart moving system, the system comprising:
(a) a powered pushing device comprising:
  (i) a base structured and arranged to be positionable under and coupleable to a first wheeled cart, wherein the first wheeled cart comprises:
    (A) a wheeled cart base;
    (B) four swivel wheels, wherein each swivel wheel is disposed at a corner of the wheeled cart base; and
    (C) a guidance channel disposed beneath the wheeled cart base and adjacent to an end of the wheeled cart base, wherein the guidance channel comprises a space sized to receive a front end of the base of the powered pushing device;
  (ii) a left control handle coupled to a left portion of the base;
  (iii) a right control handle coupled to a right portion of the base;
  (iv) a pair of rear swivel wheels disposed under a proximal portion of the base;
  (v) a pair of front fixed wheels disposed under the base, wherein the fixed front wheels are disposed proximally from a front end of the base; and
  (vi) a motor operably coupled to the pair of front fixed wheels;
(b) a wheeled user platform coupleable to the powered pushing device; and
(c) at least one hitch assembly, wherein the at least one hitch assembly comprises a distal coupling component and a proximal coupling component.

15. The powered cart moving system of claim 14, wherein the guidance channel comprises two guidance rails attached to an underside of the wheeled cart base, wherein the two guidance rails define the space sized to receive the front end of the base of the powered pushing device.

16. The powered cart moving system of claim 15, wherein the two guidance rails are angled in relation to each other such that a distal portion of the guidance channel is narrower than a proximal portion of the guidance channel.

17. The powered cart moving system of claim 14, wherein the at least one hitch assembly comprises a first hitch assembly comprising a first distal coupling component structured and arranged to be coupleable to the wheeled user platform and a first proximal coupling component structured and arranged to be coupleable to a second wheeled cart.

18. The powered cart moving system of claim 17, wherein the second wheeled cart comprises:
(a) a wheeled cart base; and
(b) four swivel wheels, wherein each of the four swivel wheels is disposed at a corner of the wheeled cart base.

19. The powered cart moving system of claim 18, wherein the second wheeled cart further comprises:
(a) a shelving frame coupled to the wheeled cart base, wherein the shelving frame comprises at least two shelves; and
(b) a set of steps removably attached to the shelving frame, wherein the set of steps is constructed and arranged to be positioned in relationship with the wheeled cart such that a user can access an upper shelf of the at least two shelves.

20. A powered cart moving system, the system comprising:
(a) a powered pushing device comprising:
  (i) a base;
  (ii) a left control handle coupled to a left portion of the base;
  (iii) a right control handle coupled to a right portion of the base;
  (iv) a pair of rear swivel wheels disposed under a proximal portion of the base;
  (v) a pair of front fixed wheels disposed under the base, wherein the fixed front wheels are disposed proximally from a front end of the base; and (vi) a motor operably coupled to the pair of front fixed wheels;
(b) a wheeled user platform coupleable to the powered pushing device;
(c) at least one hitch assembly, wherein the at least one hitch assembly comprises a distal coupling component and a proximal coupling component; and
(d) a wheeled cart coupleable to the at least one hitch assembly, wherein the wheeled cart comprises:
  (i) a wheeled cart base;
  (ii) four swivel wheels, wherein each swivel wheel is disposed at a corner of the wheeled cart base;
  (iii) a shelving frame coupled to the wheeled cart base, wherein the shelving frame comprises at least two shelves; and
  (iv) a set of steps removably attached to the shelving frame, wherein the set of steps is constructed and arranged to be positioned in relationship with the wheeled cart such that a user can access an upper shelf of the at least two shelves.

* * * * *